(12) United States Patent
Sunada et al.

(10) Patent No.: US 7,392,771 B2
(45) Date of Patent: Jul. 1, 2008

(54) CYLINDER BLOCK AND CYLINDER SLEEVE, METHOD OF PRODUCING CYLINDER BLOCK AND CYLINDER SLEEVE BY FRICTION STIR WELDING, AND FRICTION STIR WELDING METHOD

(75) Inventors: Toshihide Sunada, Utsunomiya (JP); Yasushi Iseda, Tochigi-ken (JP); Masanori Kosugi, Utsunomiya (JP); Kazumi Nagao, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 10/543,680

(22) PCT Filed: Jan. 28, 2004

(86) PCT No.: PCT/JP2004/000745

§ 371 (c)(1),
(2), (4) Date: Jan. 6, 2006

(87) PCT Pub. No.: WO2004/074667

PCT Pub. Date: Sep. 2, 2004

(65) Prior Publication Data

US 2006/0213465 A1    Sep. 28, 2006

(30) Foreign Application Priority Data

| Jan. 28, 2003 | (JP) | 2003-019189 |
|---|---|---|
| Jan. 28, 2003 | (JP) | 2003-019426 |
| Jan. 29, 2003 | (JP) | 2003-021056 |
| Jan. 29, 2003 | (JP) | 2003-021059 |
| Jan. 29, 2003 | (JP) | 2003-021063 |
| May 30, 2003 | (JP) | 2003-154794 |
| May 30, 2003 | (JP) | 2003-154817 |
| May 30, 2003 | (JP) | 2003-154846 |
| May 30, 2003 | (JP) | 2003-154866 |

(51) Int. Cl.
*F02F 1/16* (2006.01)
*B23P 11/00* (2006.01)

(52) U.S. Cl. ............. 123/41.74; 123/41.84; 29/888.061

(58) Field of Classification Search .............. 123/41.84, 123/193.2, 41.72, 41.74, 41.79; 29/888.061; 228/112.1, 2.1
See application file for complete search history.

(56) References Cited

U.S. PATENT DOCUMENTS 5,749,331 A * 5/1998 Pettersson et al. ......... 123/193.2
6,145,488 A * 11/2000 Plechner .................. 123/193.1

FOREIGN PATENT DOCUMENTS

JP          58-074850          5/1983

(Continued)

*Primary Examiner*—Stephen K. Cronin
*Assistant Examiner*—Hyder Ali
(74) *Attorney, Agent, or Firm*—Arent Fox LLP

(57) ABSTRACT

A cylinder sleeve for being inserted in a cylinder bore defined in a block body of a cylinder block for an internal combustion engine. The cylinder bore includes a first annular recess and a second annular recess, and projecting walls. The cylinder sleeve comprises a hollow cylindrical body that is inserted into the cylinder block with at least part of an outer circumferential wall thereof adjacent to an inner circumferential wall of the projecting walls of the cylinder block, a larger-diameter portion projecting diametrally outwardly from an upper end of the outer circumferential wall of the hollow cylindrical body, a step disposed on an outer circumferential wall of said larger-diameter portion, by which the larger-diameter portions of adjacent cylinder sleeves are stacked, and a reduced-diameter portion provided by reducing a diameter of an inner circumferential wall of said hollow cylindrical body. The reduced-diameter portion is located at a position adjacent to the projecting walls of the cylinder block and is removed after the cylinder sleeve inserts into the cylinder bore. A method for inserting the cylinder sleeve into the cylinder bore with a friction stir welding is also disclosed.

32 Claims, 58 Drawing Sheets

FOREIGN PATENT DOCUMENTS

| | | |
|---|---|---|
| JP | 59-003142 | 1/1984 |
| JP | 59-079056 | 5/1984 |
| JP | 60-094230 | 5/1985 |
| JP | 4-30247 | 3/1992 |
| JP | 05-033719 A | 2/1993 |
| JP | 05-060008 | 3/1993 |
| JP | 08-210178 | 8/1996 |
| JP | 9-209824 A | 8/1997 |
| JP | 2000-042759 | 2/2000 |
| JP | 2000-042762 | 2/2000 |
| JP | 2000-176658 | 6/2000 |
| JP | 2000-233285 | 8/2000 |
| JP | 2001-321965 | 11/2001 |
| JP | 2002-035964 A | 2/2002 |
| JP | 2002-079383 A | 3/2002 |
| JP | 2002-180899 A | 6/2002 |
| JP | 2002-219583 | 8/2002 |
| JP | 2002-273580 | 9/2002 |

* cited by examiner

US 7,392,771 B2

CYLINDER BLOCK AND CYLINDER SLEEVE, METHOD OF PRODUCING CYLINDER BLOCK AND CYLINDER SLEEVE BY FRICTION STIR WELDING, AND FRICTION STIR WELDING METHOD

CROSS-REFERENCE TO RELATED APPLICATION

This application is a National Stage entry of International Application No. PCT/JP2004/000745, filed Jan. 28, 2004, the entire specification claims and drawings of which are incorporated herewith by reference.

TECHNICAL FIELD

The present invention relates to a cylinder block for use in an internal combustion engine, a cylinder sleeve for use in a cylinder block, a method of manufacturing a cylinder block and a cylinder sleeve, and a friction stir welding method suitable for use in joining a cylinder sleeve and a cylinder block body.

BACKGROUND ART

One type of cylinder blocks for use in internal combustion engines on automobiles or the like is a closed-deck cylinder block 1 as shown in FIG. 58 of the accompanying drawings. Since the closed-deck cylinder block 1 has a water jacket 2 closed at a gasket surface 3, the closed-deck cylinder block 1 is advantageous in that it is more rigid than open-deck cylinder blocks having a water jacket which is open at a gasket surface.

The closed-deck cylinder block 1 is normally manufactured as follows. First, a cavity is provided by a casting mold, and a collapsible core and highly wear-resistant cylinder sleeves 4 such as FC sleeves, plated sleeves, MMC sleeves, high-silicon-based aluminum sleeves, or the like are placed in the cavity. Then, molten aluminum is poured into the cavity so that it surrounds the collapsible core and the cylinder sleeves 4.

Then, the molten aluminum is cooled and joined in a solid state, producing a block body 5. At this time, the cylinder sleeves 4 are inserted in the block body 5. The cylinder block 1 is now formed wherein the cylinder sleeves 4 are disposed in cylinder bores 6.

The cylinder sleeves 4 and the block body 5 are made of different materials because if the block body 5 is cast of high-silicon-based aluminum, the cylinder bores 6 tends to have defective cavities in their surfaces, often making the cylinder block 1 defective. In addition, since high-silicon-based aluminum is difficult to cut, the cylinder block 1 requires a high machining cost.

Thereafter, the collapsible core is collapsed. A space that is created when the collapsible core is collapsed is used as the water jacket 2. As can be seen from FIG. 58, the water jacket 2 is formed by the removal of a portion of walls between the cylinder bores 6 in the block body 5.

In the closed-deck cylinder block 1 thus manufactured, pistons (not shown) are reciprocally moved in the respective cylinder bores 6. At this time, frictional heat generated by sliding contact between the circumferential side walls of the heads of the pistons and the inner circumferential surfaces of the cylinder sleeves 4 is removed by a coolant that is introduced into the water jacket 2.

In recent years, there have been demands for reducing the amount of fuel, i.e., increasing the mileage of automobiles or the like, for the purpose of preventing global heating. One proposal for meeting such demands is to reduce the weight of internal combustion engines and hence automobiles as final products, as disclosed in Japanese Laid-Open Patent Publication No. 59-3142, Japanese Laid-Open Patent Publication No. 58-74850, Japanese Laid-Open Patent Publication No. 59-79056, and Japanese Laid-Open Patent Publication No. 60-94230.

The weight of the closed-deck cylinder block 1 may be reduced by reducing the volume of the closed-deck cylinder block 1. However, it is difficult to reduce the volume of the closed-deck cylinder block 1 because the wall thickness between the cylinder bores 6 needs to be large enough to accommodate the water jacket 2 between the cylinder bores 6. This drawback manifests itself especially in a multicylinder engine having a plurality of cylinders.

The block body 5 which has a reduced wall thickness may be produced by high-pressure die-casting (HPDC) or precision die-casting. However, the HPDC process makes it difficult to cast the closed-deck cylinder block 1 as it is extremely difficult to employ a core. Therefore the HPDC process is solely used to manufacture open-deck cylinder blocks.

According to the precision die-casting process, if the width of the water jacket 2 is to be reduced, then it is necessary to employ a collapsible core with high-strength and which may be removed easily. However, such a collapsible core is difficult to produce.

In this case, after casting the block body 5, the cylinder sleeves 4 may be inserted into the cylinder bores 6 in the block body 5, and the cylinder sleeves 4 and the block body 5 may be welded to each other. However, this process may cause the block body 5 or the cylinder sleeve 4 to be strained by the heat generated when they are welded to each other. Furthermore, if the block body 5 is manufactured by the HPDC process, then it is difficult to weld the cylinder sleeve 4.

As described above, various difficulties are experienced in manufacturing closed-deck cylinder blocks having small volumes.

DISCLOSURE OF THE INVENTION

It is a general object of the present invention to provide a method of manufacturing a closed-deck cylinder block having a small volume.

A major object of the present invention is to provide a friction stir welding method which is suitable for use in joining a cylinder block and cylinder sleeves.

Another object of the present invention is to provide a cylinder sleeve which can easily be friction-stir-welded to a cylinder block.

According to an embodiment of the present invention, there is provided a cylinder sleeve for being inserted in a cylinder bore defined in a block body of a cylinder block for an internal combustion engine, comprising:

a hollow cylindrical body;

a larger-diameter portion projecting diametrally outwardly from an outer circumferential wall of the hollow cylindrical body; and a step disposed on an outer circumferential wall of the larger-diameter portion;

wherein the larger-diameter portions of the adjacent cylinder sleeves are stacked through the step.

The larger-diameter portion is placed in a larger-diameter-portion placement area in a gasket surface of the block body of the cylinder block.

With the above arrangement, a clearance between the block body and the cylinder sleeve, and if necessary, a clearance between cylinder sleeves, function as a water jacket. Therefore, it is unnecessary to provide a water jacket as a space in the block body. Therefore, the wall thickness between cylinder bores and the wall thickness of ends of the block body can be reduced, resulting in a closed-deck cylinder block which is small in volume and lightweight.

As the step abuts against an inner circumferential wall of the cylinder bore, the cylinder sleeve and the block body are less liable to be spaced away from each other when they are friction-stir-welded. In addition, a softened material is prevented from flowing into the water jacket.

According to a preferred embodiment, the larger-diameter portion closes an end of the water jacket at the gasket surface.

According to another embodiment of the present invention, there is also provided a cylinder sleeve for being inserted in a cylinder bore defined in a block body of a cylinder block for an internal combustion engine, comprising:

a hollow cylindrical body; and a reduced-diameter portion provided by reducing a diameter of an inner circumferential wall of the hollow cylindrical body.

The reduced-diameter portion on the inner circumferential wall of the cylinder sleeve allows a probe of a friction stir welding tool to abut against the reduced-diameter portion, making it easy to perform a friction stir welding process to reliably join an outer circumferential wall of the cylinder sleeve and an inner circumferential wall of the block body to each other. The cylinder block thus constructed is of excellent rigidity.

The cylinder block may be constructed as an open-deck cylinder block.

According to still another embodiment of the present invention, there is also provided a cylinder sleeve for being inserted in a cylinder bore defined in a block body of a cylinder block for an internal combustion engine, comprising:

a hollow cylindrical body;

a reduced-diameter portion provided by reducing a diameter of an inner circumferential wall of the hollow cylindrical body; and a larger-diameter portion projecting diametrally outwardly from an outer circumferential wall of the hollow cylindrical body.

Since the cylinder sleeve has the reduced-diameter portion and the larger-diameter portion, the cylinder sleeve has advantages offered by the reduced-diameter portion and advantages offered by the larger-diameter portion.

The cylinder sleeve should preferably have a step disposed on an outer circumferential wall of the larger-diameter portion. Since the step is held in abutment against an inner circumferential wall of the cylinder bore, the cylinder sleeve and the block body are less liable to be spaced away from each other when they are friction-stir-welded, and a softened material is prevented from flowing into the water jacket.

The reduced-diameter portion should preferably have a tapered surface which is reduced in diameter in a tapered fashion. In this case, if a friction stir welding tool is inclined, then the friction stir welding tool can easily be inserted into the cylinder sleeve out of interference with the block body, etc. The friction stir welding tool which is designed for general-purpose use can be used to easily join the cylinder sleeve and the block body to each other.

According to yet another embodiment of the present invention, there is also provided a friction stir welding method of joining an inner wall of an insertion hole defined in a first member and an outer wall of a hollow second member inserted in the insertion hole, by friction stir welding, comprising the steps of:

providing, on an inner wall of the second member, a reduced-width portion having a tapered surface which is progressively reduced in width away from an open end of the insertion hole;

bringing a probe of a friction stir welding tool into abutment against the tapered surface, and thereafter moving the friction stir welding tool along the tapered surface;

softening and stirring each material of the tapered surface and an outer wall of the second member and the material of an inner wall of the insertion hole in the first member, with friction heat produced when the probe is rotated, thereby friction-stir-welding the materials; and removing the probe from the tapered surface, and thereafter removing the reduced-width portion.

According to the above method, the probe of the friction stir welding tool is held against the tapered surface of the second member to incline the friction stir welding tool. Therefore, the friction stir welding tool is kept out of interference with the first member. When the friction stir welding tool is moved along the tapered surface, it can easily join the material of the inner wall of the insertion hole in the first member and the material of the outer wall of the second member.

As the reduced-width portion is removed, a hollow region in the second member has a uniform width.

Preferably, the probe is removed from the tapered surface after the probe is separated from the inner wall of the insertion hole, and a removal hole formed by removing the probe from the tapered surface is removed together with the reduced-width portion. Since no removal hole remains, the joined region is of excellent appearance and rigidity.

A preferred example of the first member is a block body of a cylinder block for an internal combustion engine. In this case, a cylinder bore is used as the insertion hole. A preferred example of the second member is a cylinder sleeve.

According to yet still another embodiment of the present invention, there is also provided a friction stir welding method comprising the steps of:

embedding a friction stir welding tool which is rotating into a workpiece having an abutting region;

moving at least one of the friction stir welding tool and the workpiece to displace the friction stir welding tool along the abutting region for softening the material of the abutting region with frictional heat and stirring the material of the abutting region with the friction stir welding tool to join the material of the abutting region; and removing the friction stir welding tool from the workpiece after the material of the abutting region is joined;

wherein a removal hole formed by removing at least the friction stir welding tool is machined into a hole.

In as much as the removal hole is machined into a hole, no removal hole remains in the product, which is hence of excellent appearance. Furthermore, as no removal hole remains in the product, the product is of excellent mechanical strength and rigidity.

No filler needs to fill the removal hole. Since the workpiece does not need to be partly cut off, the workpiece does not need to be large in shape. Therefore, the cost is reduced.

A preferred example of the hole is a threaded hole. If the workpiece is a cylinder block for use in an internal combustion engine, then the threaded hole may be a stud bolt hole.

If the workpiece is a cylinder block for use in an internal combustion engine, then the hole may be an oil hole, a knock hole, or a dowel hole.

According to a further embodiment of the present invention, there is also provided a friction stir welding method of friction-stir-welding an abutting region of a block body and a cylinder sleeve inserted in a cylinder bore in the block body, with a friction stir welding tool which is rotating, thereby producing a cylinder block, comprising the steps of:

embedding the friction stir welding tool into at least one of the block body and the cylinder sleeve;

displacing the friction stir welding tool along the abutting region for softening the material of the abutting region with frictional heat and stirring the material of the abutting region with the friction stir welding tool to join the abutting region; and removing the friction stir welding tool from the abutting region or the cylinder sleeve after the abutting region is joined;

wherein the friction stir welding tool is removed from a region in which a water passage is to be formed in communication with a water jacket between the block body and the cylinder sleeve.

As the removal hole is used as a water passage, no removal hole remains in the product. Therefore, it is possible to produce a cylinder block of excellent appearance. As no removal hole remains in the cylinder block, the cylinder block is of excellent mechanical strength and rigidity.

No filler needs to fill the removal hole. Since the block body does not need to be partly cut off, the block body does not need to be large in shape. Therefore, the cost is reduced.

Preferably, the cylinder sleeve has a hollow cylindrical portion and a larger-diameter portion, the larger-diameter portion is placed on a placement area in the block body to allow a clearance formed between the hollow cylindrical portion and the cylinder bore to serve as a water jacket, and a gasket surface of the block body and the larger-diameter portion are friction-stir-welded to provide the water passage in at least the larger-diameter portion. With the water passage provided in the larger-diameter portion of the cylinder sleeve, the water jacket and the water passage can easily be held in communication with each other.

According to a still further embodiment of the present invention, there is also provided a method of manufacturing a cylinder block by friction-stir-welding a block body having a cylinder bore and a cylinder sleeve inserted in the cylinder bore, comprising the steps of:

embedding a friction stir welding tool which is rotating into the cylinder sleeve from an inner circumferential wall thereof until the friction stir welding tool reaches an inner circumferential wall of the cylinder bore;

moving the friction stir welding tool to soften the material of cylinder sleeve and the material of the block body with frictional heat and stir the materials with the friction stir welding tool, thereby joining the cylinder sleeve and the block body to each other; and removing the friction stir welding tool after the cylinder sleeve and the block body are joined to each other;

wherein the friction stir welding tool is removed from the cylinder sleeve at a position below the bottom dead center of a piston ring fitted over a circumferential side wall of a piston inserted in the cylinder bore.

The friction stir welding tool is removed at a position below a chamber in which a mixture of fuel and gasoline is introduced and ignited. Therefore, when an internal combustion engine is in operation, the mixture is prevented from entering into the removal hole. Thus, the mixture ratio is maintained, and the internal combustion engine can operate for its predetermined performance.

Preferably, the friction stir welding tool is removed from the cylinder sleeve at a position below the bottom dead center of a skirt of the piston. The mixture is prevented more easily from entering into the removal hole.

Preferably, the method further comprises the step of friction-stir-welding a gasket surface of the block body and an end face of the cylinder sleeve at the gasket surface. Since the strength with which the block body and the cylinder sleeve are joined to each other is increased, the rigidity of the cylinder block is further increased.

According to a yet further embodiment of the present invention, there is also provided a method of manufacturing a cylinder block by friction-stir-welding a block body having a cylinder bore having a diametrally dented step and a friction stir welding tool removal member mounted on a gasket surface, and a cylinder sleeve inserted in the cylinder bore, comprising the steps of:

embedding a friction stir welding tool which is rotating into the cylinder sleeve from an inner circumferential wall thereof until the friction stir welding tool reaches an inner circumferential wall of the cylinder bore;

moving the friction stir welding tool to soften the material of the cylinder sleeve and the material of the block body with frictional heat and stir the materials with the friction stir welding tool, thereby joining the cylinder sleeve and the block body to each other; and removing the friction stir welding tool after the cylinder sleeve and the block body are joined to each other;

wherein the friction stir welding tool is removed from the friction stir welding tool removal member after the friction stir welding tool is moved from the inner circumferential wall of the cylinder sleeve to the friction stir welding tool removal member.

Because the friction stir welding tool is removed from the friction stir welding tool removal member, no removal hole remains in the cylinder block as a final product. Accordingly, the cylinder block is of excellent appearance. As no removal hole remains in the cylinder block, the cylinder block is of excellent mechanical strength and rigidity.

Furthermore, since no filler needs to fill the removal hole, the cost is reduced.

An end of the cylinder sleeve may project from the cylinder bore when the cylinder sleeve is inserted in the cylinder bore. The projecting end may have its outer circumferential wall held in abutment against an inner wall of the friction stir welding tool removal member.

After the cylinder sleeve and the block body are joined to each other, the friction stir welding tool is moved to the projecting end and removed from the friction stir welding tool removal member through the end. Then, the end from which the friction stir welding tool removal member is removed, to positionally align an upper end face of the cylinder sleeve with the gasket surface. The cylinder block is thus free of removal holes, and has excellent appearance, mechanical strength and rigidity.

Preferably, the method further comprises the step of friction-stir-welding the gasket surface of the block body and an end face of the cylinder sleeve at the gasket surface. Since the strength with which the block body and the cylinder sleeve are joined to each other is increased, the rigidity of the cylinder block is further increased.

According to a yet still further embodiment of the present invention, there is also provided a method of manufacturing a cylinder sleeve for use in a closed-deck cylinder block, the cylinder sleeve having a hollow cylindrical member and a closure member joined to an outer circumferential wall of the hollow cylindrical member, wherein when the cylinder sleeve is inserted into a cylinder bore defined in a block body, the closure member closes an opening of a water jacket in the block body at a gasket surface, comprising the steps of:

using a jig having a first insertion unit to which the hollow cylindrical member is insertable and a second insertion unit into which the closure member is insertable, inserting the hollow cylindrical member into the first insertion unit, and inserting the closure member into the second insertion unit; and joining the hollow cylindrical member and inserting the closure member by friction stir welding.

The cylinder sleeve for use in a closed-deck cylinder block can easily be manufactured by a simple process of joining the hollow cylindrical member and the closure member to each other by friction stir welding.

Preferably, the hollow cylindrical member has a support step on an outer circumferential wall thereof, the support step is exposed when the hollow cylindrical member is inserted into the first insertion unit of the jig, the closure member is placed on the support step, and the hollow cylindrical member and the closure member are friction-stir-welded. When the hollow cylindrical member and the closure member are friction-stir-welded, therefore, the closure member is rigidly supported by the support step, allowing the hollow cylindrical member and the closure member to be reliably joined.

According to another embodiment of the present invention, there is also provided a method of manufacturing a closed-deck cylinder block having a block body, a hollow cylindrical member inserted in a cylinder bore defined in the block body, a water jacket provided between the block body and the hollow cylindrical member, and a closure member closing an end of the water jacket at a gasket surface of the block body, comprising the steps of:

joining the hollow cylindrical member and the closure member to each other by friction stir welding; and joining the block body and the closure member to each other by friction stir welding.

In this embodiment, the block body and the hollow cylindrical member are joined to each other through the closure member. Consequently, the opening of the water jacket, which is provided between the block body and the hollow cylindrical member, at the gasket surface is closed by the closure member, and the block body and the closure member, and the hollow cylindrical member and the closure member are easily joined by friction stir welding.

The wall thickness between cylinder bores can be reduced, and the HPDC process can be employed to produce a cylinder block of small wall thickness. Therefore, it is possible to manufacture a closed-deck cylinder block which is small in size and lightweight.

The hollow cylindrical member and the closure member can be friction-stir-welded by using a jig having a first insertion unit into which the hollow cylindrical member is insertable and a second insertion unit into which the closure member is insertable.

Specifically, the hollow cylindrical member is inserted into the first insertion unit, the closure member is inserted into the second insertion unit, and thereafter an inner circumferential edge of the closure member and an upper end of an outer circumferential wall of the hollow cylindrical member are joined by fiction stir welding. After the hollow cylindrical member to which the closure member is joined is inserted into the cylinder bore in the block body, the block body and the closure member are friction-stir-welded.

Preferably, the hollow cylindrical member has a support step on an outer circumferential wall thereof, the support step is exposed when the hollow cylindrical member is inserted into the first insertion unit of the jig. When the closure member is placed on the support step, and the hollow cylindrical member and the closure member are friction-stir-welded, since the closure member is firmly supported by the support step, the hollow cylindrical member and the closure member are reliably joined.

Alternatively, at least one of the block body and an outer circumferential wall of the hollow cylindrical member may have a support step, the closure member may be placed on the support step, the hollow cylindrical member and the closure member may be friction-stir-welded, and the block body and the closure member may be friction-stir-welded.

The hollow cylindrical member and the closure member may be friction-stir-welded first, or the block body and the closure member may be friction-stir-welded first.

According to still another embodiment of the present invention, there is also provided a method of manufacturing a cylinder sleeve for use in a closed-deck cylinder block, the cylinder sleeve having a hollow cylindrical member and a closure member joined to an outer circumferential wall of the hollow cylindrical member, wherein when the cylinder sleeve is inserted into a cylinder bore defined in a block body, the closure member closes an opening of a water jacket in the block body at a gasket surface, comprising the steps of:

using a jig having a first insertion unit, a second insertion unit, and a third insertion unit, inserting the hollow cylindrical member into the first insertion unit, inserting the closure member into the second insertion unit, inserting a friction stir welding tool removal member into the third insertion unit, and thereafter joining the hollow cylindrical member and the closure member by friction stir welding; and removing a friction stir welding tool from the friction stir welding tool removal member after the friction stir welding is finished.

In this embodiment, the cylinder sleeve for use in a closed-deck cylinder block can easily be manufactured by a simple process of joining the closure member and the hollow cylindrical member to each other by friction stir welding.

Since the jig has the third insertion unit, and after the hollow cylindrical member and the closure member are friction-stir-welded, the friction stir welding tool is removed from the friction stir welding tool removal member inserted in the third insertion unit, it is possible to produce a cylinder sleeve for use in a closed-deck cylinder block, which is free of a removal hole which would be formed when the friction stir welding tool is removed. The cylinder sleeve for use in a closed-deck cylinder block, which is free of a removal hole, exhibits excellent rigidity.

The hollow cylindrical member may have a support step on an outer circumferential wall thereof, the support step may be exposed when the hollow cylindrical member is inserted into the first insertion unit of the jig, the closure member may be placed on the support step, and the hollow cylindrical member and the closure member may be friction-stir-welded. When the hollow cylindrical member and the closure member are friction-stir-welded, since the closure member is firmly supported by the support step, the cylinder sleeve and the closure member are reliably joined.

If a cylinder sleeve for use in a multicylinder closed-deck cylinder block is to be manufactured, then a plurality of the hollow cylindrical members may be joined in advance.

According to yet another embodiment of the present invention, there is also provided a method of manufacturing a closed-deck cylinder block in which a water jacket is formed in a clearance between a block body and a cylinder sleeve, and an end of the water jacket at a gasket surface is closed, comprising the steps of:

producing a block body having a cylinder bore having a diametrally dented step and a placement area for placing an end face of the cylinder sleeve thereon;

inserting the cylinder sleeve into the cylinder bore, placing the end face of the cylinder sleeve on the placement area, and forming the water jacket between an outer circumferential wall of the cylinder sleeve and the step; and friction-stir-welding the cylinder sleeve and an inner circumferential wall of the cylinder bore to produce a cylinder block.

Specifically, the cylinder bore into which the cylinder sleeve is inserted has the step whose diameter is increased concentrically, and a clearance between the step and the cylinder sleeve serves as the water jacket. Since no space needs to be provided in the block body for use as a water jacket as with a conventional cylinder block, the block body does not require a region in which the cylinder sleeve would be inserted when the block body is cast.

The amount by which the cylinder sleeve and the block body are cut off is greatly reduced. As a result, the cost of the material of the closed-deck cylinder block and hence the manufacturing cost thereof are lowered.

According to the present invention, furthermore, a space which would serve as a water jacket does not need to be provided in the block body. Therefore, it is possible to produce a closed-deck cylinder block which has a small wall thickness and which is lightweight.

Moreover, as the block body and the cylinder sleeve are joined by friction stir welding, they are strongly joined to each other even if they are made of different metals. As a result, the produced closed-deck cylinder block is of excellent mechanical strength and rigidity.

Preferably, an end face of the cylinder sleeve inserted in the cylinder bore at the gasket surface of the block body and the gasket surface should preferably be friction-stir-welded. Since the strength with which the block body and the cylinder sleeve are joined to each other is increased, the rigidity of the closed-deck cylinder block is further increased.

If the closed-deck cylinder block is a multicylinder cylinder block, then the cylinder sleeve preferably has a flat surface on the outer circumferential surface thereof, and adjacent ones of the cylinder sleeve are preferably held in abutment against each other through the flat surface in the cylinder bore. As the distance between adjacent ones of the cylinder sleeve is reduced, it is possible to produce a closed-deck cylinder block which has a smaller wall thickness and which is more lightweight.

A recess which is dented diametrally of the cylinder sleeve and functions as the water jacket may be formed in the flat surface. With this arrangement, the cooling efficiency of a closed-deck cylinder block can be increased without the need for increasing the distance between adjacent ones of the cylinder sleeve, i.e., without the need for increasing the wall thickness.

BEST MODE FOR CARRYING OUT THE INVENTION

Preferred embodiments of cylinder sleeves according to the present invention, with respect to closed-deck cylinder blocks that are manufactured when the cylinder sleeves are joined to a block body and a friction stir welding method used to join the cylinder sleeves to the block body, will be described in detail below with reference to the accompanying drawings.

First, a first embodiment will be described below.

Figure 1:
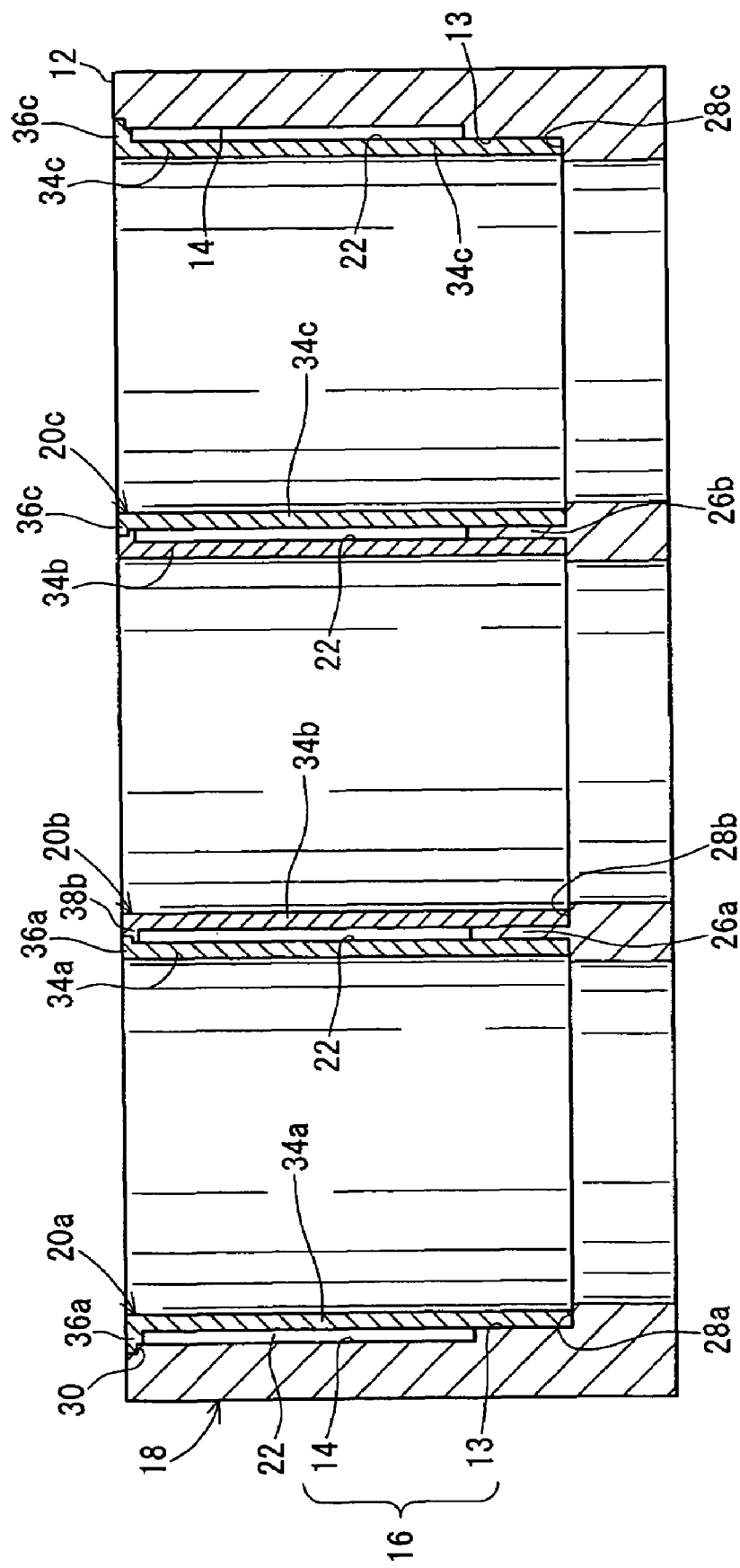
FIG. 1 is a vertical cross-sectional view of a cylinder block having cylinder sleeves according to a first embodiment of the present invention.
Figure 2:
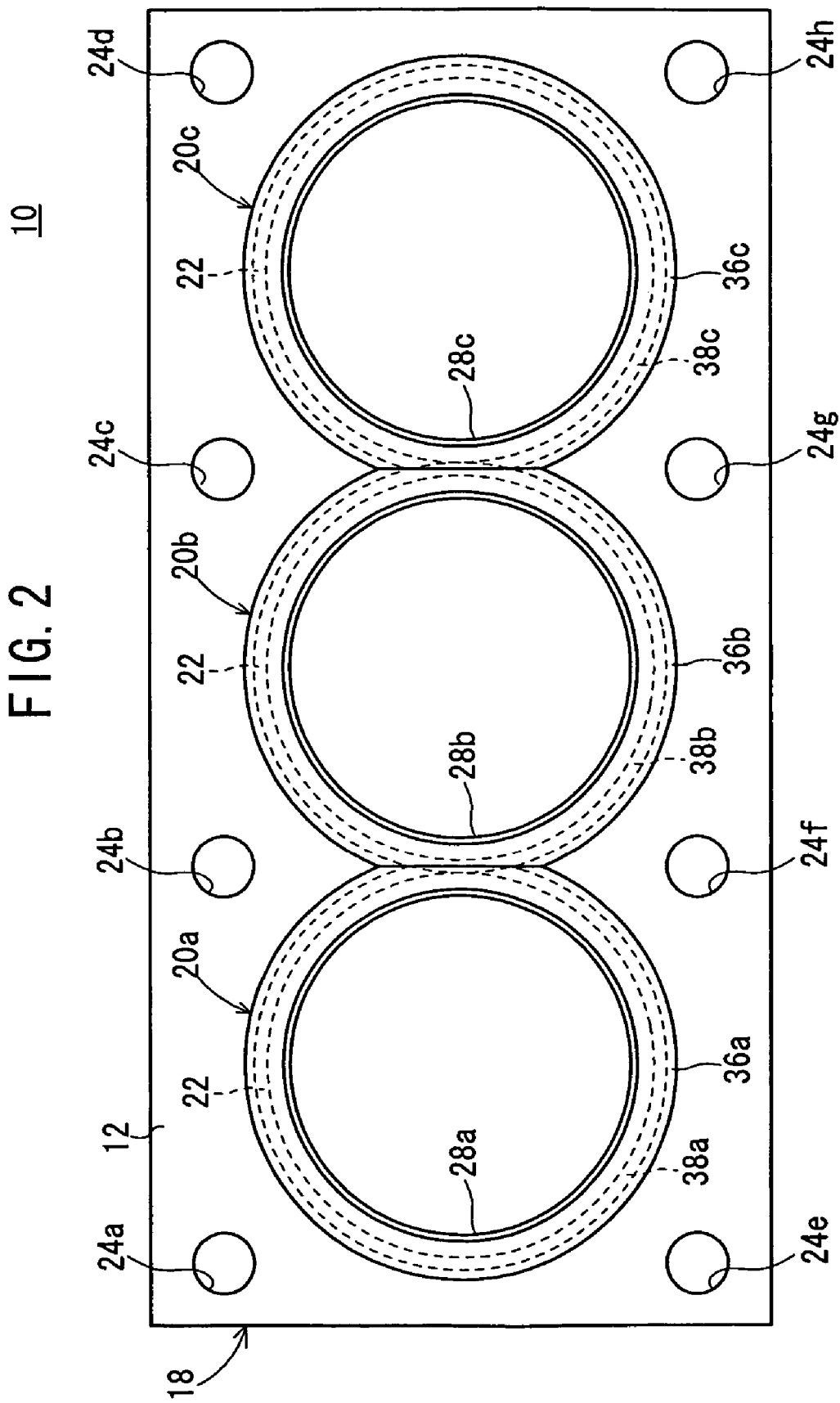
FIG. 2 is a plan view of the cylinder block shown in FIG. 1 as viewed from a gasket surface thereof.

FIG. 1 is a vertical cross-sectional view of a cylinder block 10 according to the first embodiment, and FIG. 2 is a plan view of the cylinder block 10 as viewed from a gasket surface 12 which is an upper end face thereof. The cylinder block 10 comprises a block body 18 made of aluminum which has a communication hole (cylinder bore) 16 including a first annular recess 13 and a second annular recess 14, cylinder sleeves 20a through 20c inserted in the communication hole 16 and joined to the block body 18, and a water jacket 22 which is supplied with a coolant for cooling the cylinder sleeves 20a through 20c. In FIG. 2, reference characters 24a through 24h represent stud bolt holes for passage therethrough of bolts to be used for combining the cylinder block 10 with other components to make up an internal combustion engine.

As shown in FIG. 1, walls 26a, 26b projecting toward the gasket surface 12 are joined to an inner circumferential wall of the communication hole 16. The inner circumferential wall of the communication hole 16 and the walls 26a, 26b have annular steps 28a through 28c, and the cylinder sleeves 20a through 20c have respective lower ends placed on the annular steps 28a through 28c. The cylinder sleeves 20a through 20c are supported in position with their respective lower ends placed on the annular steps 28a through 28c.

The opening of the communication hole 16 at the gasket surface 12 of the block body 18 has a recess 30 in the shape of three annular steps successively connected at their outer circumferential edges.

The cylinder sleeves 20a through 20c are made of high-silicon-based aluminum, and have respective hollow cylindrical portions 34a through 34c and respective larger-diameter portions 36a through 36c disposed on the upper ends of the hollow cylindrical portions 34a through 34c, respectively. The cylinder sleeves 20a through 20c have respective lower ends placed respectively on the annular steps 28a through 28c. As described later, the hollow cylindrical portions 34a through 34c are joined to the inner circumferential wall of the first annular recess 13.

As shown in FIG. 1, the larger-diameter portions 36a through 36c are disposed in the recess 30, thereby closing the end of the water jacket 22 at the gasket surface 12 with the larger-diameter portions 36a through 36c. Therefore, the cylinder block 10 is a closed-deck cylinder block.

The larger-diameter portions 36a through 36c of the cylinder sleeves 20a through 20c have circumferential side walls partly removed in their lower portions, providing respective annular steps 38a through 38c. The annular steps 38a through 38c have respective circumferential side walls held in abutment against the inner circumferential wall of the second annular recess 14 of the communication hole 16.

The larger-diameter portion 36b of the cylinder sleeve 20b is partly removed linearly, exposing the annular step 38b. The larger-diameter portions 36a, 36c of the cylinder sleeves 20a, 20c are placed on the exposed annular step 38b. Meanwhile, the annular steps 38a, 38c are also partly removed linearly to avoid interference between the annular steps 38a, 38c and the annular step 38b.

The hollow cylindrical portions 34a through 34c of the cylinder sleeves 20a through 20c have respective outer circumferential walls joined to the inner circumferential wall of the first annular recess 13 and the walls 26a, 26b. The larger-diameter portions 36a through 36c of the cylinder sleeves 20a through 20c which are placed in the recess 30 have outer edges joined to the gasket surface 12 of the block body 18. The larger-diameter portion 36b of the cylinder sleeve 20b is joined to the larger-diameter portions 36a, 36c of the cylinder sleeves 20a, 20c that are placed on the annular step 38b of the larger-diameter portion 36b. The walls and the larger-diameter portions referred to above are joined by friction-stir-welding, as described later.

In FIGS. 1 and 2, the block body 18 and the larger-diameter portions 36a through 36c of the cylinder sleeves 20a through 20c are shown as being clearly separated by boundary lines. Actually, however, these members 18, 36a through 36c are seamlessly joined by friction-stir-welding. Therefore, the members 18, 36a through 36c are integrally joined with no visible boundary lines existing therebetween. This is applicable throughout the description.

The cylinder block 10 can be manufactured as follows.

Figure 3:
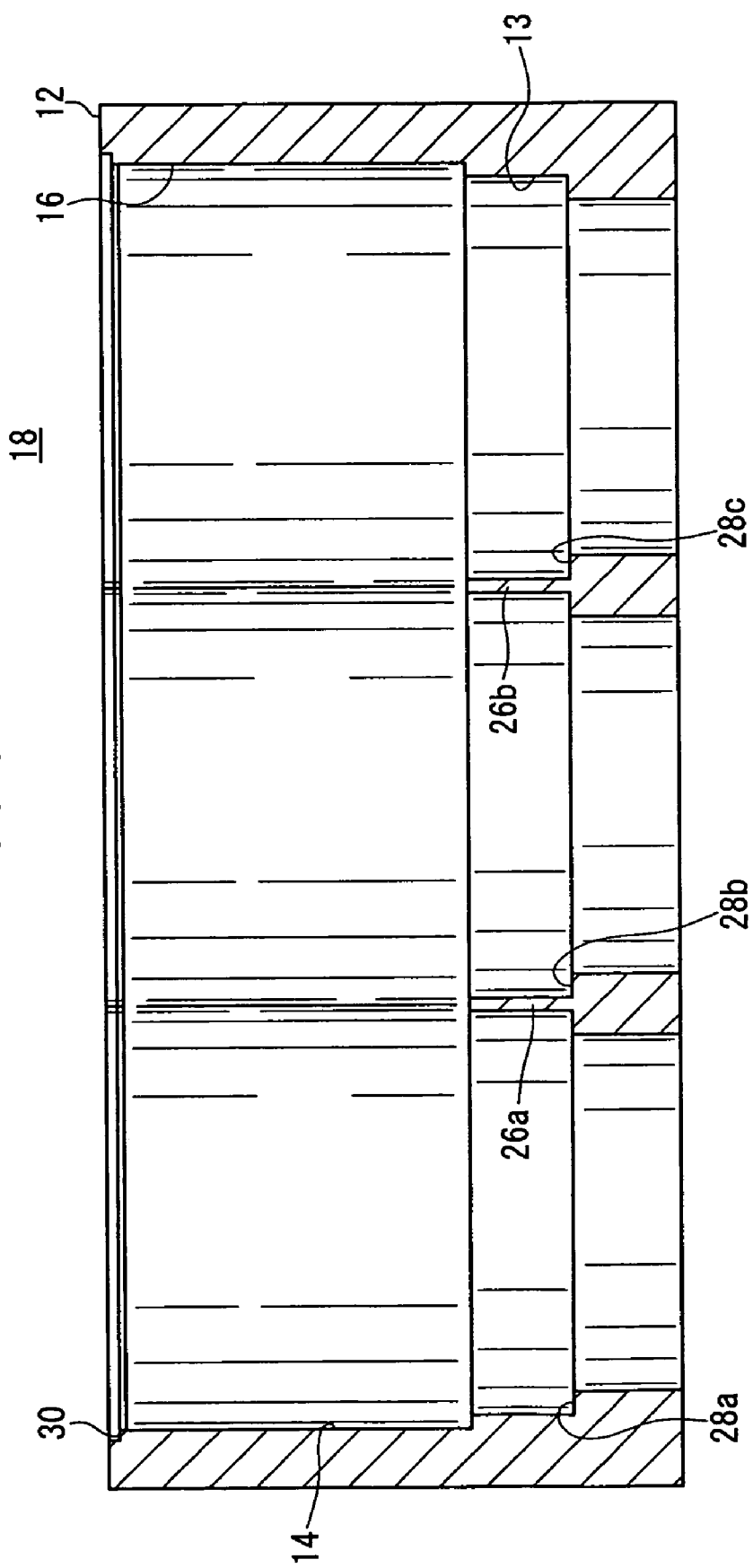
FIG. 3 is a vertical cross-sectional view of a block body of the cylinder block shown in FIG. 1.
Figure 4:
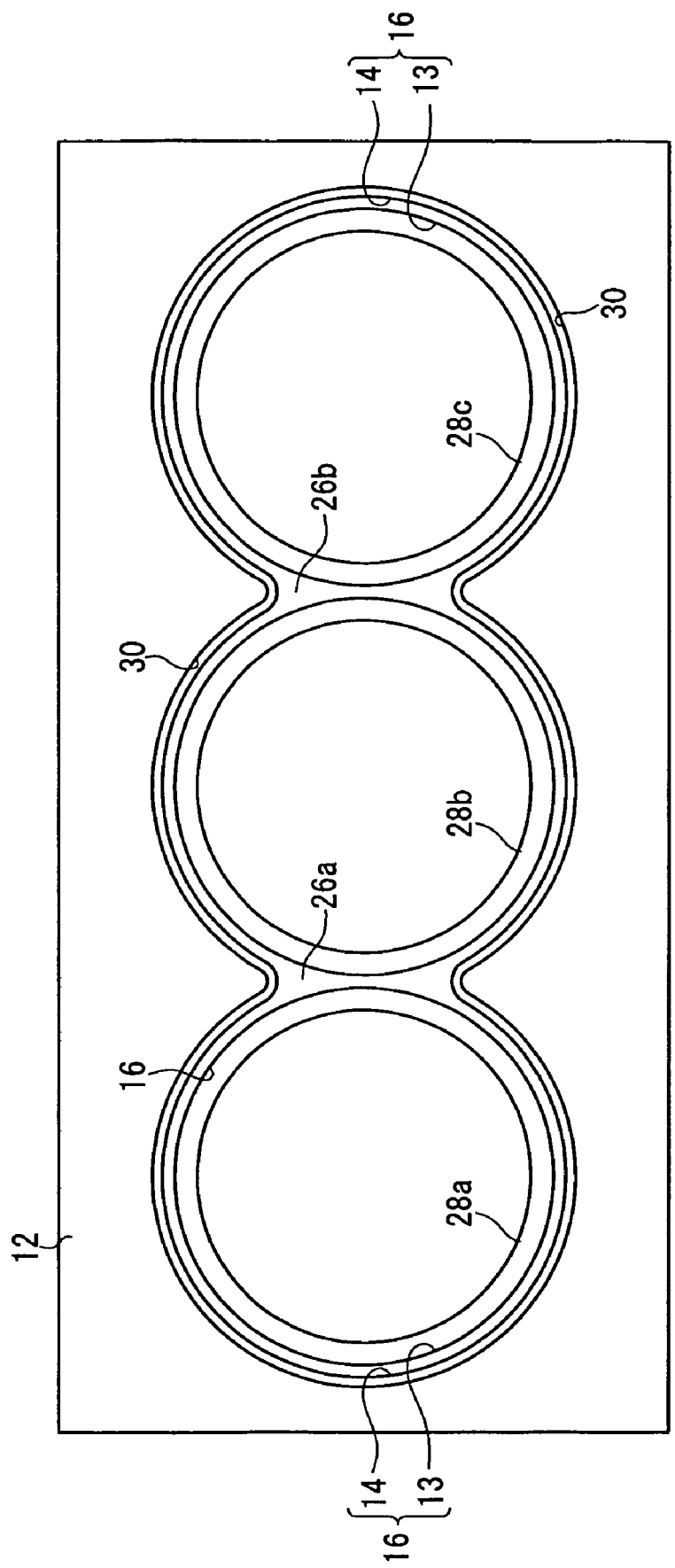
FIG. 4 is a plan view of the block body shown in FIG. 3 as viewed from a gasket surface thereof.

First, the block body 18 shown in FIGS. 3 and 4 is cast by a casting process. The block body 18 has the communication hole 16 and the water jacket 22 which are held in communication with each other, the communication hole 16 having the first annular recess 13 and the second annular recess 14, and the walls 26a, 26b projecting into the communication hole 16. The inner circumferential wall of the communication hole 16 and the walls 26a, 26b have the annular steps 28a through 28c, and the opening of the communication hole 16 at the gasket surface 12 has the recess 30.

As can be seen from FIG. 4, no stud bolt holes 24a through 24h are provided in the block body 18 immediately after the block body 18 is cast.

Figure 5:
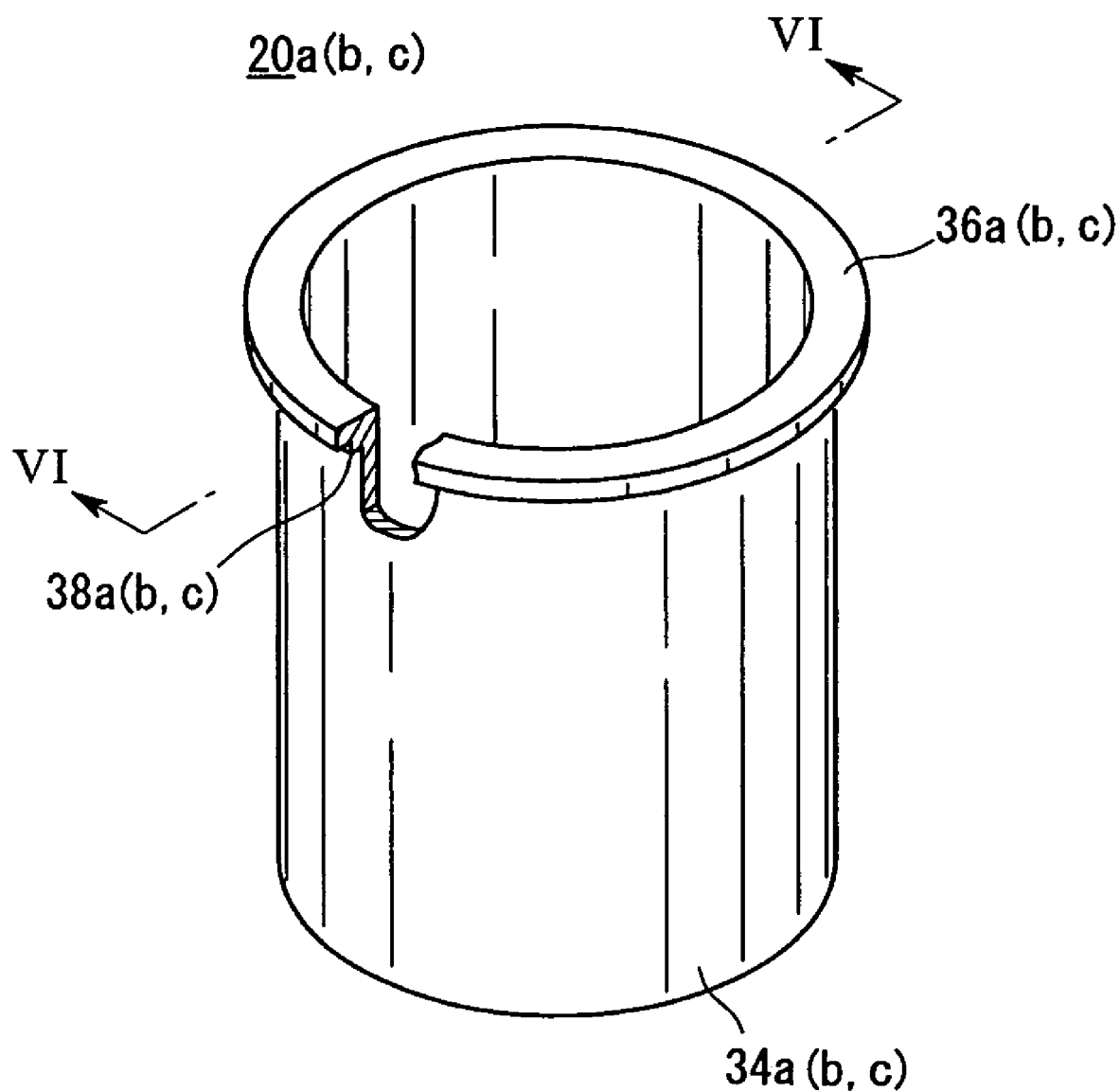
FIG. 5 is a perspective view of a cylinder sleeve according to the first embodiment.
Figure 6:
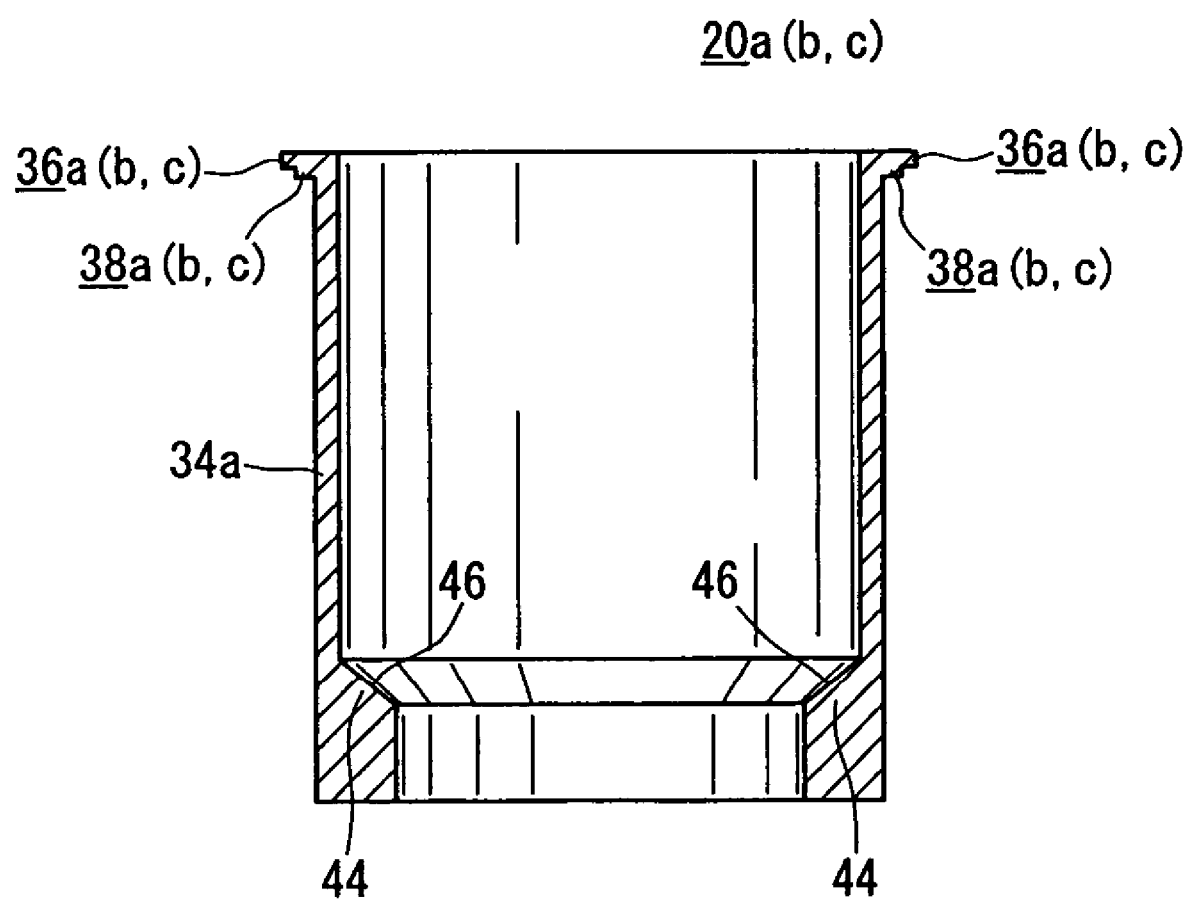
FIG. 6 is a cross-sectional view taken along line VI-VI of FIG. 5.

As shown in FIGS. 5 and 6, the cylinder sleeves 20a through 20c are manufactured. The cylinder sleeves 20a through 20c have the hollow cylindrical portions 34a through 34c, each having a reduced-diameter portion 44 provided by a tapered reduced-diameter inner circumferential wall near the lower end, and the larger-diameter portions 36a through 36c on one end of the hollow cylindrical portions 34a through 34c. The reduced-diameter portion 44 has a tapered surface 46 whose diameter is progressively smaller in a direction away from the larger-diameter portions 36a through 36c along the inner circumferential wall of the cylinder sleeves 20a through 20c.

The cylinder sleeves 20a through 20c thus shaped can be manufactured by a known process such as an extrusion molding process, a casting process, or the like.

The lower portions of the circumferential side walls of the larger-diameter portions 36a through 36c are circumferentially cut off by a machining process, providing the annular steps 38a through 38c beneath the larger-diameter portions 36a through 36c. Thereafter, the larger-diameter portion 36b is partly linearly removed to expose the annular step 38b. The annular steps 38a, 38c are also partly removed linearly.

Then, the cylinder sleeves 20a through 20c are inserted into the communication hole 16 in the block body 18. The inserted cylinder sleeves 20a through 20c have their respective lower ends placed on the annular steps 28a through 28c, and their larger-diameter portions 36a through 36c placed in the recess 30, with the larger-diameter portions 36b, 36c placed on the annular step 38b. Since the annular steps 38a, 38c are partly removed, the annular steps 38a, 38c do not interfere with the annular step 38b. The annular steps 38a through 38c have their circumferential side walls held against the inner circumferential wall of the second annular recess 14.

As the cylinder sleeves 20a through 20c are inserted into the communication hole 16, a clearance is created between the inner circumferential wall of the second annular recess 14 and the cylinder sleeves 20a through 20c. The clearance communicates with a clearance defined between the cylinder sleeves 20a, 20b and a clearance defined between the cylinder sleeves 20b, 20c, thereby providing the water jacket 22.

According to the first embodiment, therefore, the water jacket 22 is formed when the cylinder sleeves 20a through 20c are inserted into the communication hole 16. It is thus not necessary to provide a water jacket in the block body 18 separately from the communication hole 16.

Therefore, a collapsible core does not need to be placed in the cavity of a casting mold for casting the block body 18. According to the present embodiment, any time-consuming process of producing a collapsible core is dispensed with, and the manufacturing cost of a collapsible core is eliminated. The manufacturing cost of the cylinder block 10 is therefore reduced.

Then, the inner circumferential wall of the communication hole 16 and the walls 26a, 26b, and the outer circumferential walls of the cylinder sleeves 20a through 20c are joined to each other by friction stir welding.

Figure 7:
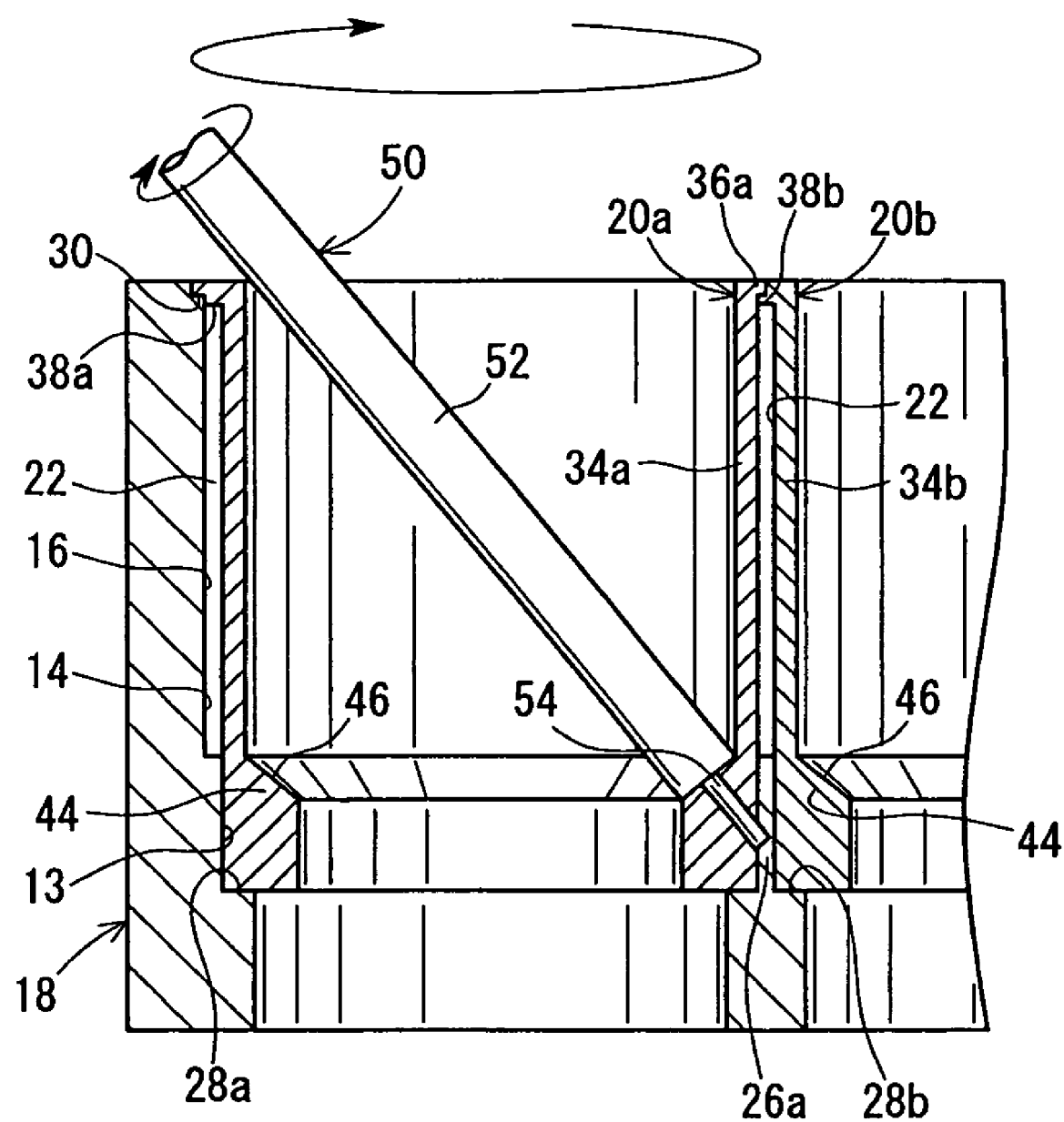
FIG. 7 is a fragmentary vertical cross-sectional view showing the manner in which an outer circumferential wall of the cylinder sleeve shown in FIG. 5 is friction-stir-welded to an inner circumferential wall of a cylinder bore.

As shown in FIG. 7, a friction stir welding tool 50 comprises a cylindrical rotor 52 and a probe 54 which is smaller in diameter than the rotor 52 and has a conical tip end. The friction stir welding tool 50 is inserted into the cylinder sleeve 20a obliquely to the longitudinal axis of the cylinder sleeve 20a until the probe 54 is brought into abutment against the tapered surface 46.

Then, the rotor 52 is rotated to cause the probe 54 to slide against the tapered surface 46, generating frictional heat to soften the region of the tapered surface 46 which is contacted by the probe 54. As a result, the tip end of the probe 54 reaches the region where the cylinder sleeve 20a abuts against the inner circumferential wall of the communication hole 16. In that region, the outer circumferential wall of the cylinder sleeve 20a and the inner circumferential wall of the communication hole 16 are softened by frictional heat.

When the friction stir welding tool 50 is turned along the tapered surface 46, the softened material is stirred by the probe 54 and plastically flows. The softened material is then joined in a solid state when the probe 54 is removed therefrom. The above phenomenon is sequentially repeated as the friction stir welding tool 50 is turned until the outer circumferential wall of the cylinder sleeve 20a and the inner circumferential wall of the first annular recess 13 or the wall 26a are integrally joined to each other.

Figure 8:
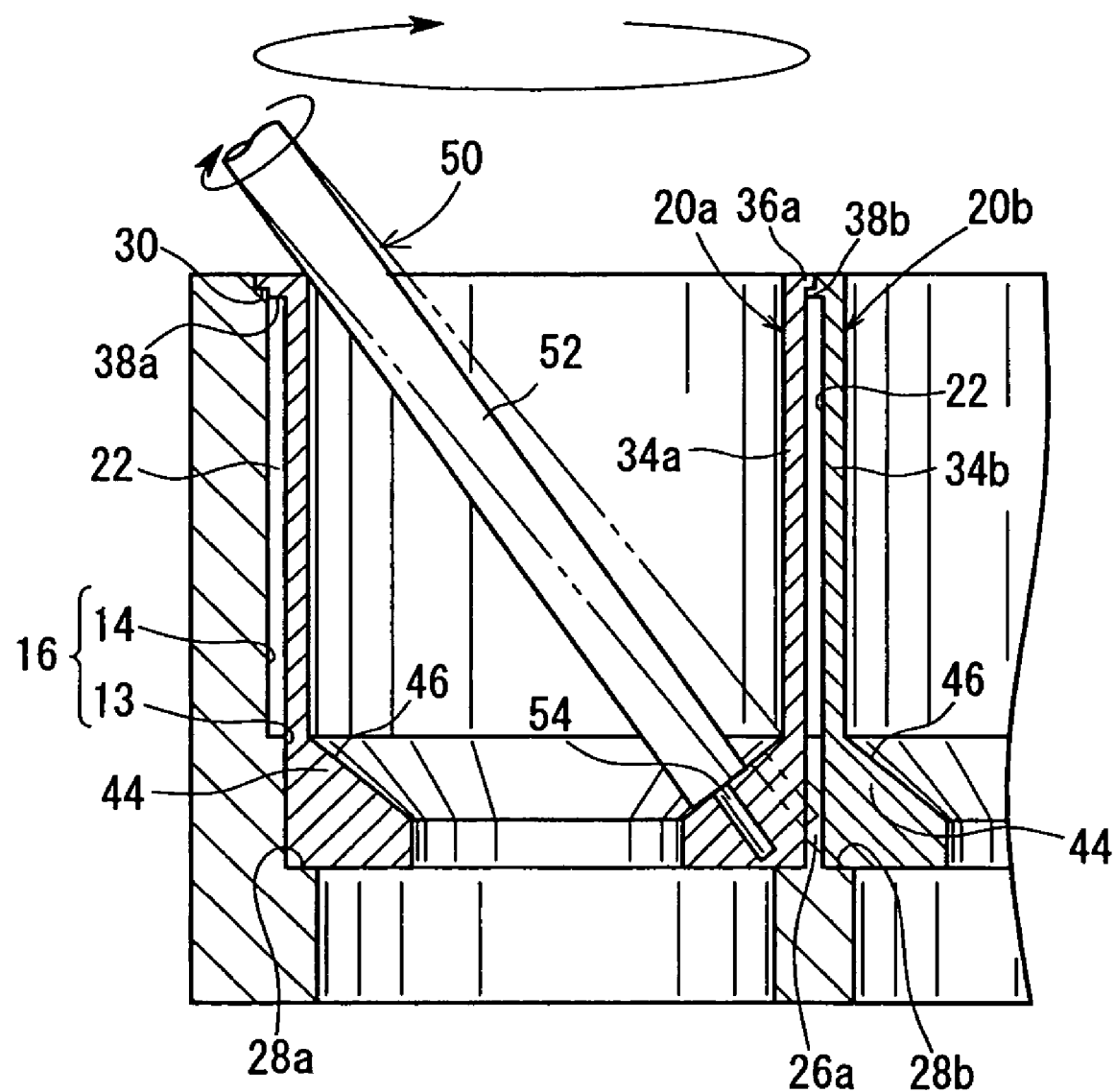
FIG. 8 is a fragmentary vertical cross-sectional view showing the manner in which a probe of a friction stir welding tool is displaced away from an inner circumferential wall of a communication hole.

Thereafter, as shown in FIG. 8, the probe 54 is displaced away from the inner circumferential wall of the first annular recess 13, and then the friction stir welding tool 50 is removed from the reduced-diameter portion 44. When the friction stir welding tool 50 is removed from the reduced-diameter portion 44, it leaves a removal hole in the reduced-diameter portion 44.

The same process as described above is performed on the remaining cylinder sleeves 20b, 20c.

The reduced-diameter portion 44 provided on each of the inner circumferential walls of the cylinder sleeves 20a through 20c allows the probe 54 of the friction stir welding tool 50 to abut against the tapered surface 46 of the reduced-diameter portion 44. Therefore, the friction stir welding process can easily be performed.

Figure 9:
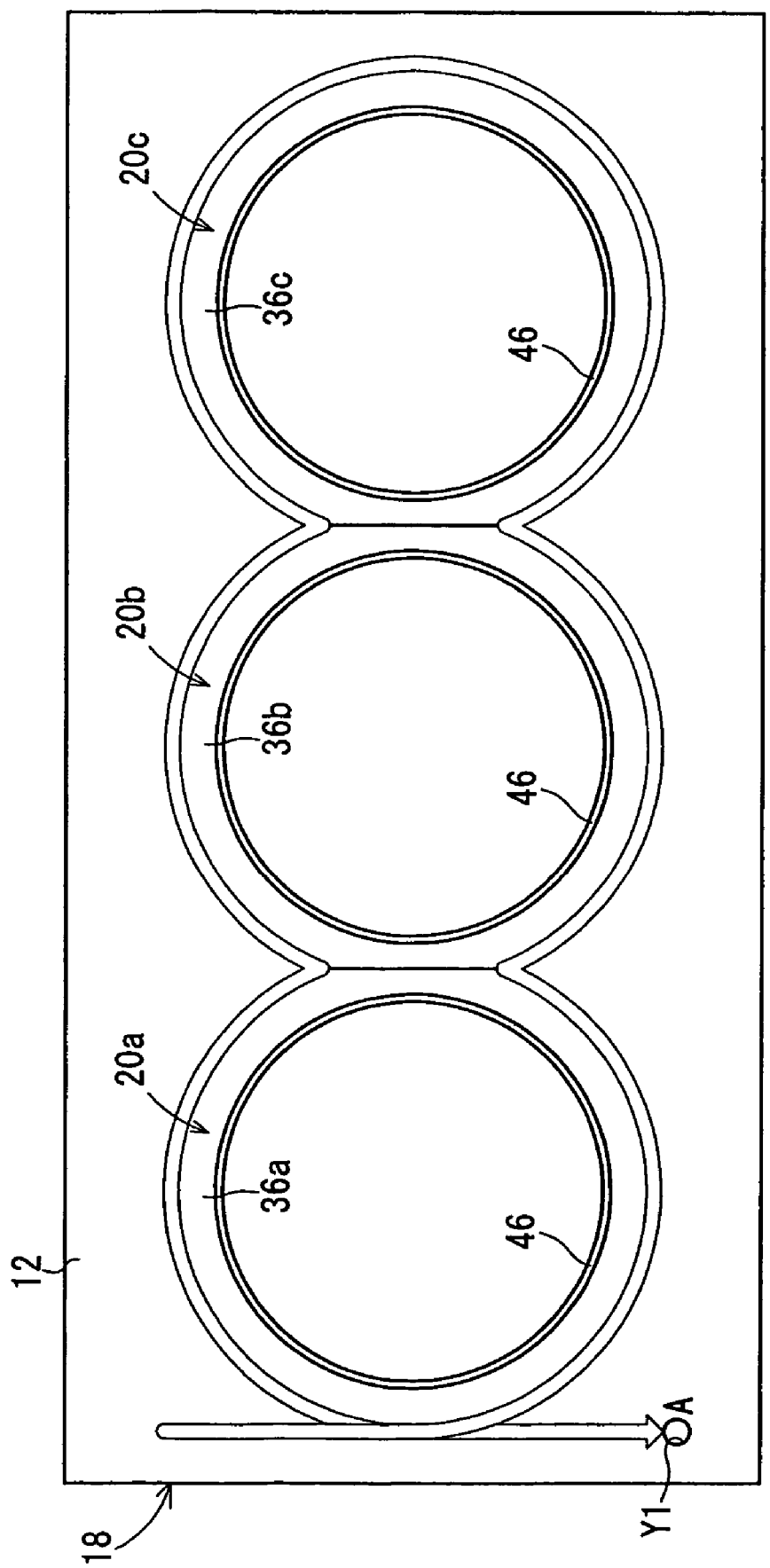
FIG. 9 is a plan view of the block body as viewed from the gasket surface, illustrating the direction in which the friction stir welding tool is displaced to join a larger-diameter portion to the block body.

Then, the larger-diameter portions 36a through 36c of the cylinder sleeves 20a through 20c and the gasket surface 12 of the block body 18 are joined to each other also by friction stir welding. Specifically, the rotor 52 of the friction stir welding tool 50 is rotated to keep the probe 54 in sliding contact with the larger-diameter portions 36a through 36c and the gasket surface 12 to friction-stir-weld the material of the larger-diameter portions 36a through 36c and the material of the block body 18. At this time, the friction stir welding tool 50 is displaced in the direction indicated by the arrow A shown in FIG. 9 to join the larger-diameter portions 36a through 36c and the gasket surface 12 (block body 18) to each other.

Figure 10:
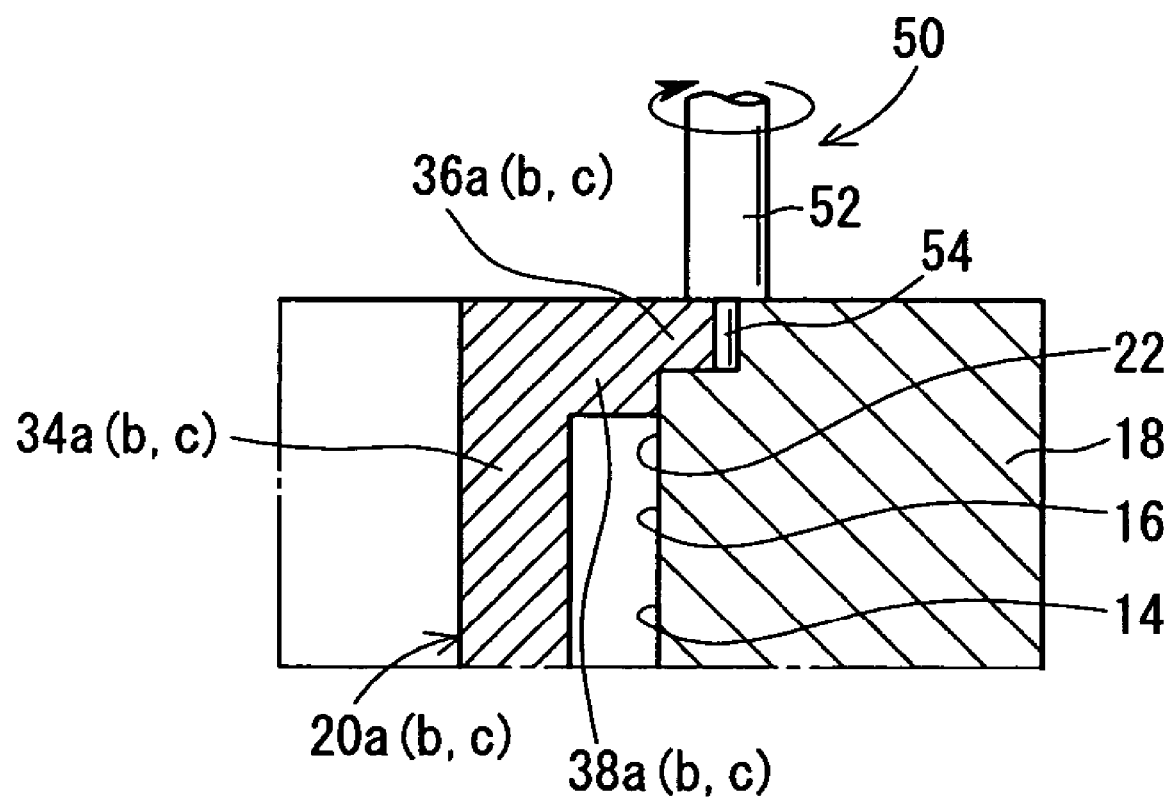
FIG. 10 is an enlarged fragmentary vertical cross-sectional view showing the manner in which the larger-diameter portion and the block body are friction-stir-welded to each other.

As shown at an enlarged scale in FIG. 10, the larger-diameter portions 36a through 36c are rigidly supported by being placed in the recess 30. Since the circumferential side walls of the annular steps 38a through 38c are held against the inner circumferential wall of the communication hole 16, the larger-diameter portions 36a through 36c are less liable to be removed from the block body 18 due to a wedging action of the annular steps 38a through 38c. Consequently, the friction stir welding process can easily be performed without the need for a clamping jig for preventing the block body 18 and the larger-diameter portions 36a through 36c from being separated from each other.

In as much as the larger-diameter portions 36a through 36c which closes the water jacket 22 are not softened, no softened material flows into the water jacket 22.

Figure 11:
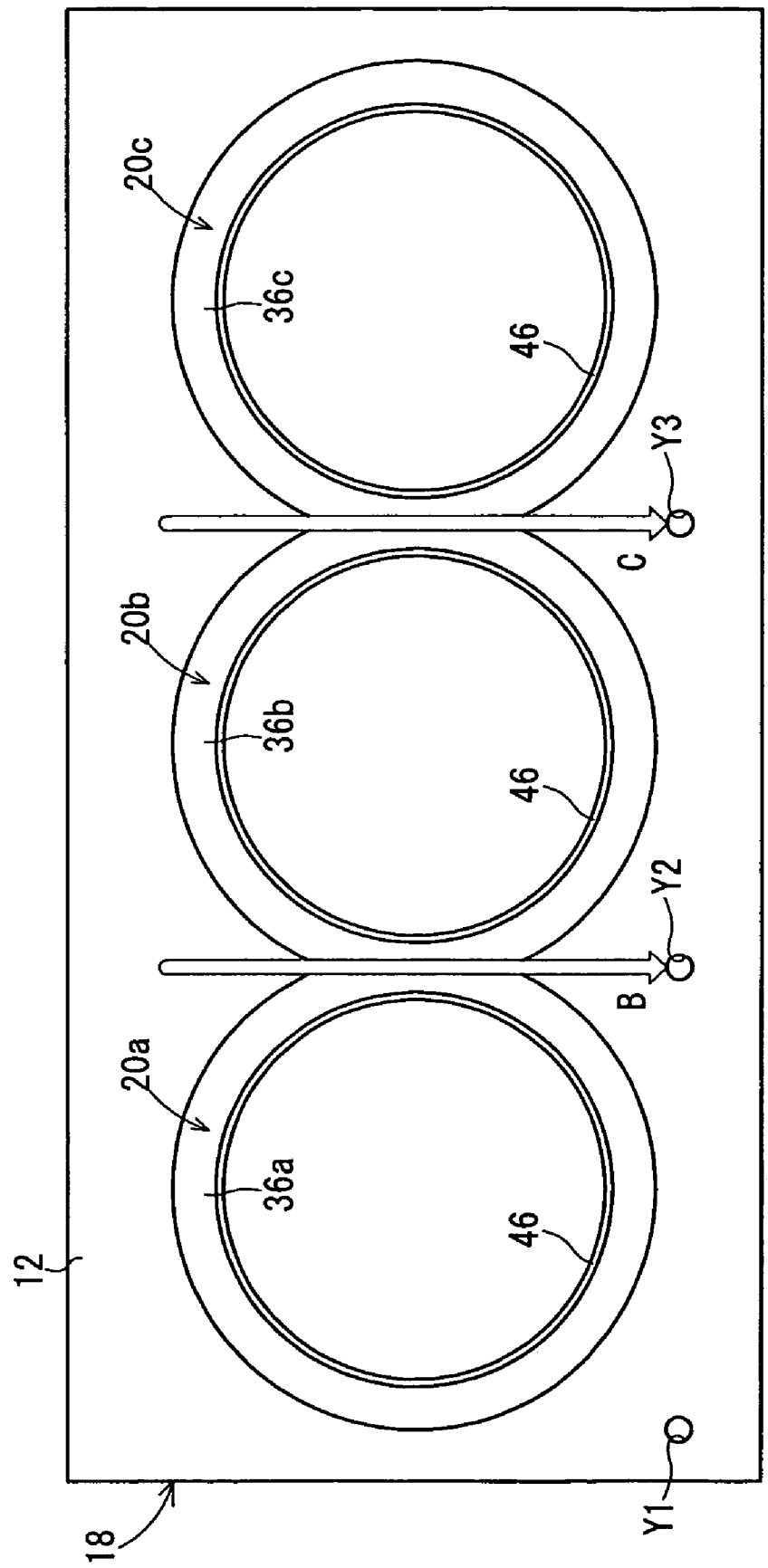
FIG. 11 is a plan view of the block body as viewed from the gasket surface, illustrating the direction in which the friction stir welding tool is displaced to join larger-diameter portions to each other.

Then, the larger-diameter portions 36a, 36b are friction-stir-welded to each other, and the larger-diameter portions 36b, 36c are friction-stir-welded to each other. At this time, the friction stir welding tool 50 is displaced in the directions indicated by the arrows B, C in FIG. 11. The friction stir welding process can also easily be performed as the larger-diameter portions 36a, 36b of the cylinder sleeves 20a, 20c are placed on the annular step 38b of the cylinder sleeve 20b.

The cylinder sleeves 20a through 20c and the block body 18 are integrally joined to each other and the cylinder sleeves 20a through 20c are also integrally joined to each other by the above operation.

Then, the reduced-diameter portions 44 of the cylinder sleeves 20a through 20c are removed. Specifically, the inner circumferential surfaces of the cylinder sleeves 20a through 20c are ground by a drill or the like so as to be equalized in diameter. Pistons can now be moved reciprocally in the cylinder sleeves 20a through 20c.

When the reduced-diameter portions 44 are removed, the regions of the reduced-diameter portions 44 which include the removal holes from which the probe 54 was removed are also removed. Therefore, the removal holes do not remain in the inner circumferential walls of the hollow cylindrical portions 34a through 34c.

When the cylinder sleeves 20a through 20c and the block body 18 are friction-stir-welded to each other and the cylinder sleeves 20a through 20c are also friction-stir-welded to each other, the members 18, 20a through 20c are integrally joined to each other. The cylinder block 10 thus constructed is of excellent rigidity.

The friction stir welding process allows members to be joined to each other relatively easily even if the members are made of material that is difficult to weld. For example, even if the block body 18 is produced by HPDC, the cylinder sleeves 20a through 20c can easily be joined to the block body 18. Accordingly, the cylinder block 10 having a reduced wall thickness can be constructed.

A removal hole which is formed when the probe 54 is removed may be machined into either one of the stud bolt holes 24a through 24h. For example, a removal hole Y1 (see FIG. 9) produced after the larger-diameter portions 36a through 36c and the block body 18 are friction-stir-welded to each other may be machined into the stud bolt hole 24e (see FIG. 2). A removal hole Y2 (see FIG. 11) produced after the larger-diameter portions 36a, 36b are friction-stir-welded to each other may be machined into the stud bolt hole 24f (see FIG. 2), and a removal hole Y3 (see FIG. 11) produced after the larger-diameter portions 36b, 36c are friction-stir-welded to each other may be machined into the stud bolt hole 24g (see FIG. 2). In this manner, removal holes produced after the probe 54 is removed are prevented from remaining.

Holes for use in other applications, rather than stud bolt holes, may be formed. For example, such holes may be oil holes, knock holes for passing therethrough positioning jigs for positioning the cylinder block 10 when the cylinder block 10 is machined, or dowel pin holes for passing therethrough pins for positioning the cylinder block 10 in alignment with a cylinder head. Of course, holes functioning as both stud bolt holes and dowel pin holes may be formed.

With the cylinder block 10, as can be seen from FIG. 1, the clearance between the annular recess 28 and the cylinder sleeves 20a through 20c and the clearances between adjacent ones of the cylinder sleeves 20a through 20c serve as the water jacket 22. Therefore, the coolant flowing through the water jacket 22 is held in direct contact with the cylinder sleeves 20a through 20c.

Figure 58:
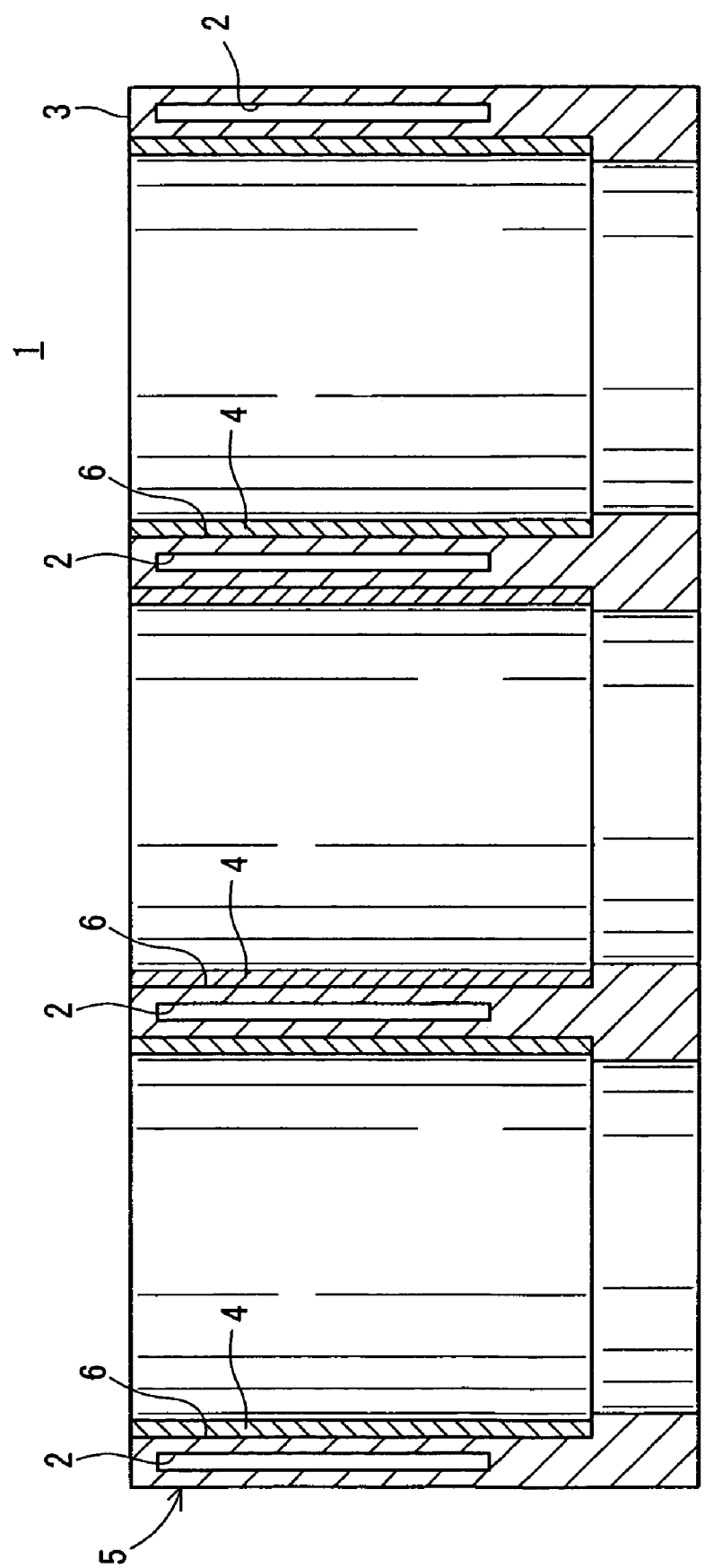
FIG. 58 is a vertical cross-sectional view of a general multicylinder closed-deck cylinder block.

Stated otherwise, it is not necessary to provide the water jacket 2 as a space in the block body 5 in the general closed-deck cylinder block 1 (see FIG. 58). Since the wall thickness of the block body 18 can be reduced, the volume of the cylinder block 10 can be reduced. Therefore, the cylinder block 10 can be reduced in size and volume.

As the coolant flowing through the water jacket 22 is held in direct contact with the cylinder sleeves 20a through 20c, the cylinder sleeves 20a through 20c can efficiently be cooled. When an internal combustion engine incorporating the cylinder block 10 is in operation, the temperature of the cylinder sleeves 20a through 20c is prevented from excessively rising due to the heat generated by the internal combustion engine.

Because the cylinder sleeves 20a through 20c are made of highly wear-resistant high-silicon-based aluminum, the cylinder block 10 is durable. Since the block body 18 is made of inexpensive aluminum, the manufacturing cost of the cylinder block 10 is not increased.

Figure 12:
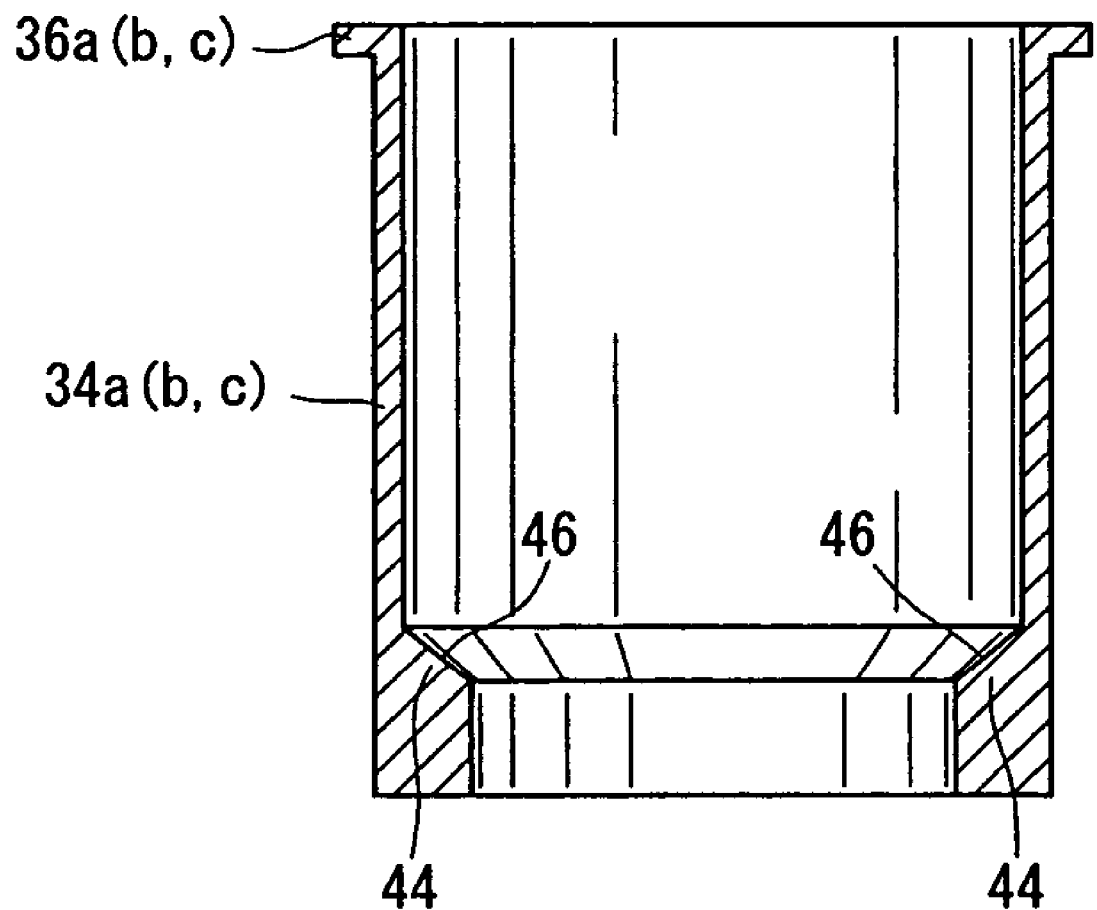
FIG. 12 is a vertical cross-sectional view of a cylinder sleeve having another shape.
Figure 13:
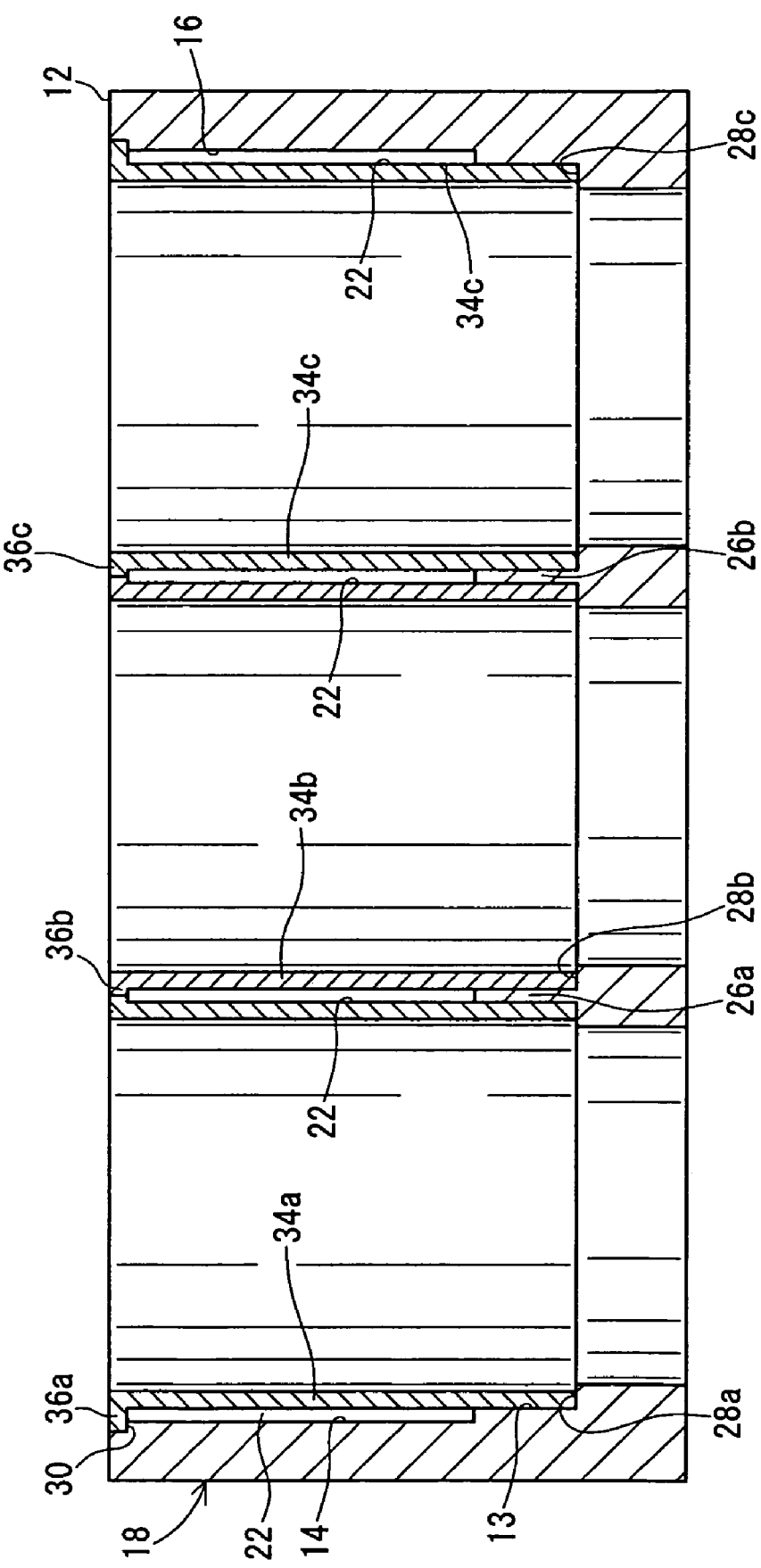
FIG. 13 is a vertical cross-sectional view of a cylinder block having cylinder sleeves shown in FIG. 12.
Figure 14:
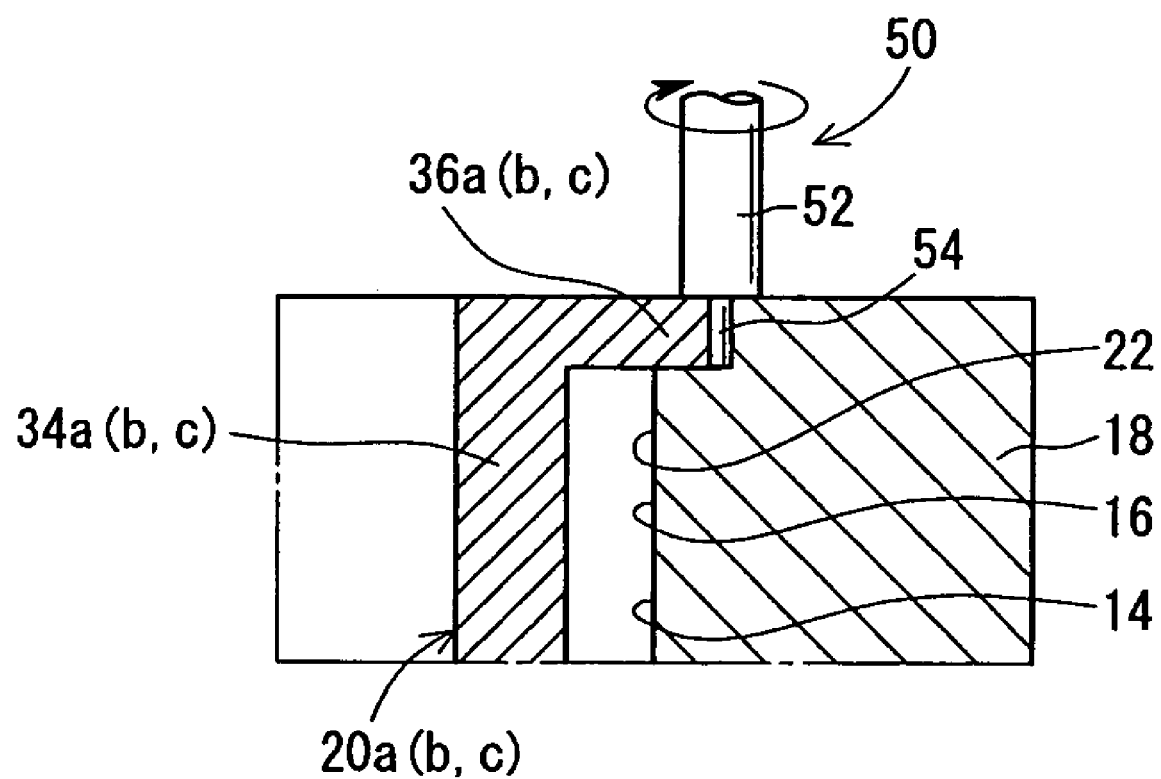
FIG. 14 is an enlarged fragmentary vertical cross-sectional view showing the manner in which a larger-diameter portion and a block body are friction-stir-welded to each other in the cylinder block shown in FIG. 13.

In the present embodiment, the cylinder sleeves 20a through 20c have the annular steps 38a through 38c and the annular step 38b of the cylinder sleeve 20b is partly exposed. However, as shown in FIG. 12, the cylinder sleeves 20a through 20c may have only the larger-diameter portions 36a through 36c and the reduced-diameter portions 44. In this case, as shown in FIG. 13, the circumferential side walls of the larger-diameter portions 36a through 36c may be held in abutment against each other. In FIG. 13, the reduced-diameter portions 44 of the cylinder sleeves 20a through 20c have already been removed. As shown at an enlarged scale in FIG. 14, since the larger-diameter portions 36a through 36c are placed and supported in the recess 30 in the block body 18, the friction stir welding process can easily be performed.

Figure 15:
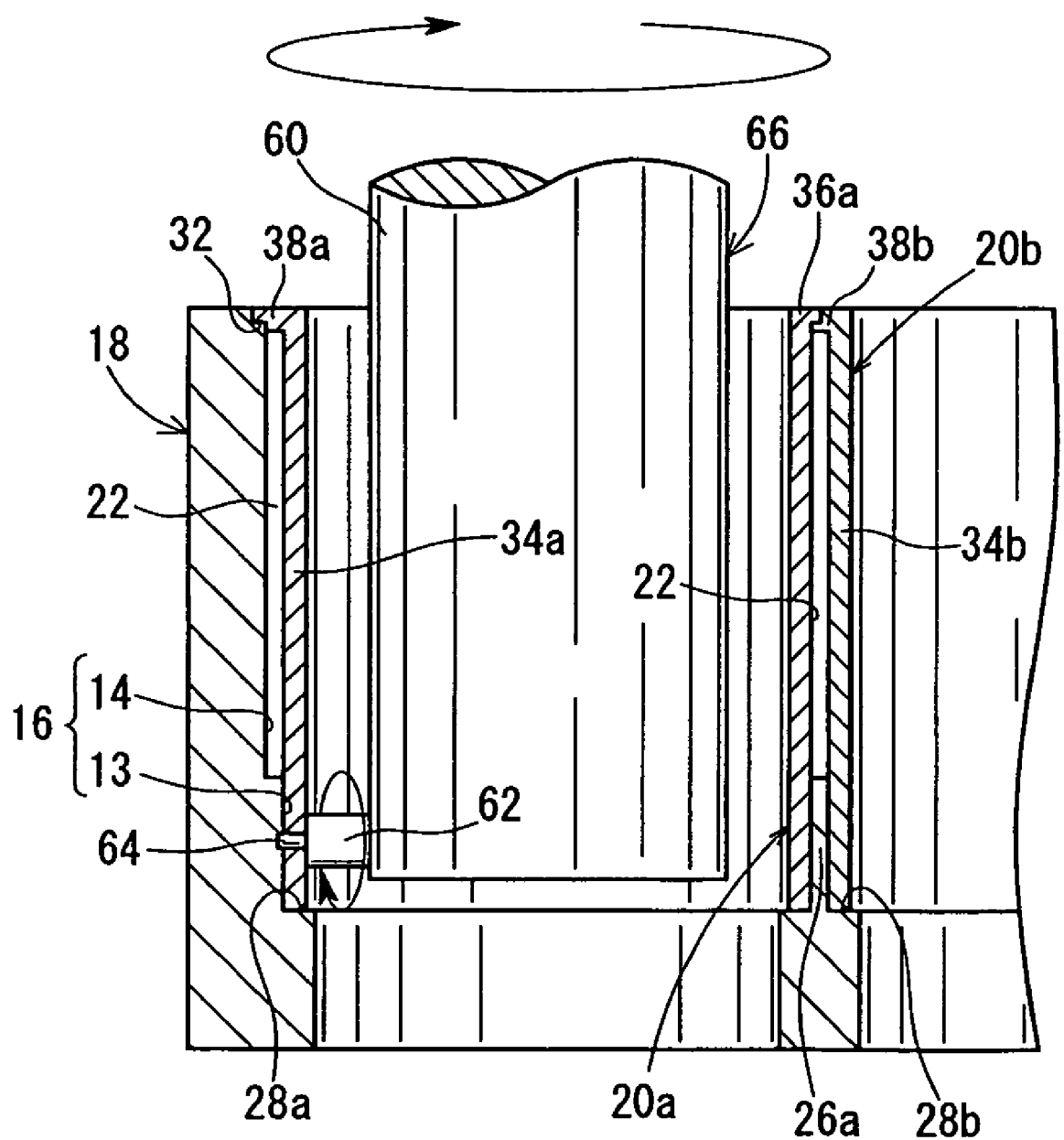
FIG. 15 is a fragmentary vertical cross-sectional view showing the manner in which an outer circumferential wall of a cylinder sleeve which is free of a reduced-diameter portion is friction-stir-welded to an inner circumferential wall of a cylinder bore.

As shown in FIG. 15, the cylinder sleeves 20a through 20c may have only the larger-diameter portions 36a through 36c and the annular steps 38a through 38c. In this case, a friction stir welding tool 66 may be used which comprises a first rotor 60, a second rotor 62 mounted on a circumferential side wall of the first rotor 60 and rotatable independently of the first rotor 60, and a probe 64 mounted on the distal end of the second rotor 62. When the first rotor 60 and the second rotor 62 are simultaneously rotated, the outer circumferential walls of the cylinder sleeves 20a through 20c and the inner circumferential wall of the communication hole 16 are joined to each other. The cylinder sleeves 20a through 20c may be constructed free of the annular steps 38a through 38c.

In this case, the probe 64 is held in abutment against the inner circumferential wall of a cylinder sleeve at a region below the bottom dead center of a skirt 82 of a piston 80 shown in FIG. 16, and thereafter the first rotor 60 (see FIG. 15) is rotated to join the outer circumferential walls of the cylinder sleeves 20a through 20c and the inner circumferential wall of the communication hole 16 to each other.

After the friction stir welding process, the probe 64 is removed from the inner circumferential wall of the cylinder sleeve, leaving a removal hole Z1 (see FIG. 16) in the inner circumferential wall.

Figure 16:
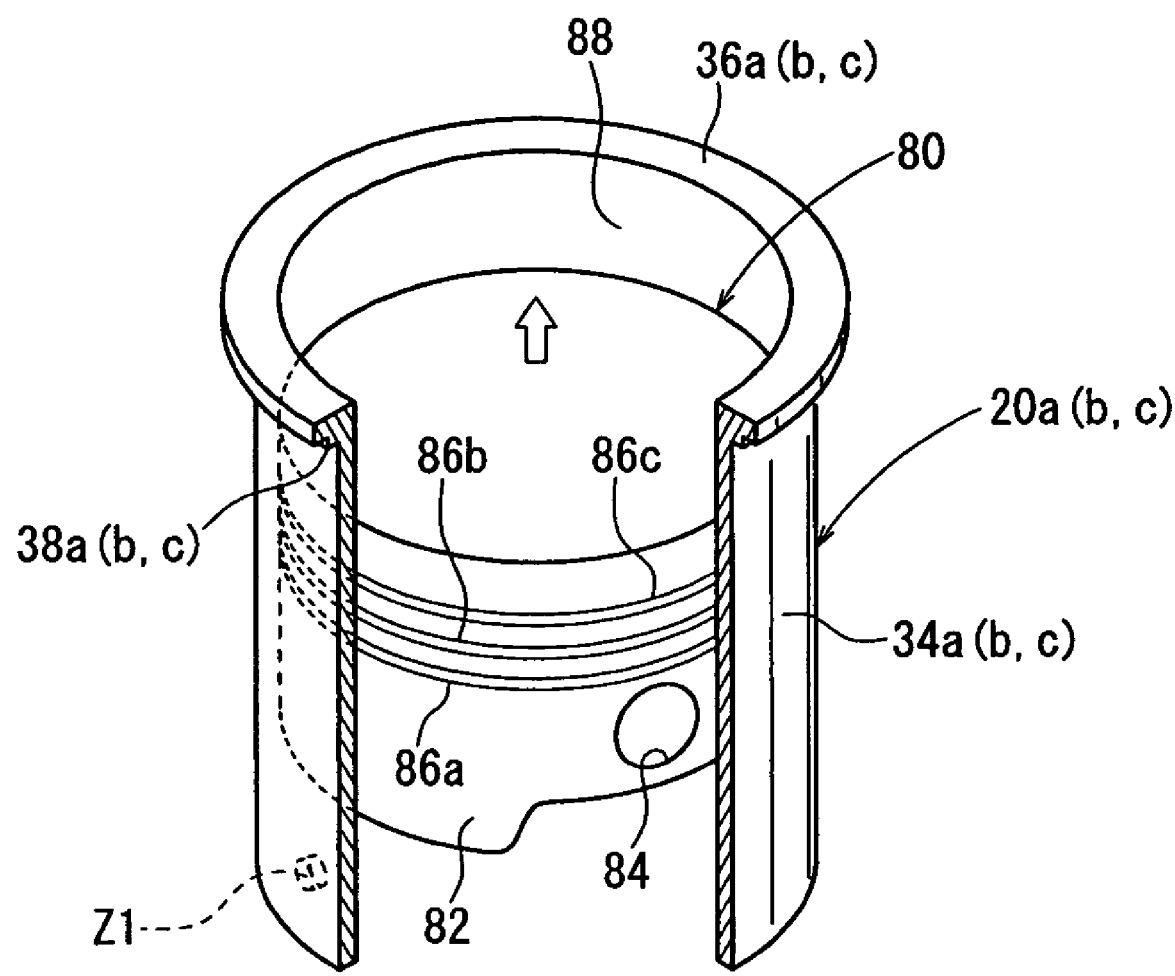
FIG. 16 is a perspective view, partly cut away, showing the positional relationship between a removal hole in the cylinder sleeve from which a probe of a friction stir welding tool is removed and a skirt of a piston that is positioned in the bottom dead center.

The cylinder block thus manufactured is combined with certain members such as the pistons 80 shown in FIG. 16, providing an internal combustion engine (not shown). Each of the pistons 80 that are inserted respectively in the cylinder sleeves 20a through 20c has a skirt 82 on its lower end, the skirt 82 being slightly long as compared with other portions thereof. The piston 80 also has a pin hole 84 defined in a circumferential side wall thereof and three piston rings 86a through 86c fitted over a portion of the piston 80 above the pin hole 84. In FIG. 16, the piston 80 is shown as being positioned at the bottom dead center.

When the internal combustion engine is in operation, a mixture of air and fuel is introduced into a chamber 88 which is formed between the upper end face of the piston 80 positioned at the bottom dead center and the inner circumferential surface of each of the cylinder sleeves 20a through 20c. The piston 80 ascends to compress the air-fuel mixture, after which the air-fuel mixture is ignited. The air-fuel mixture is expanded, lowering the piston 80. Therefore, the pistons 80 are vertically moved reciprocally in the respective cylinder sleeves 20a through 20c, and the skirts 82 of the pistons 80 are held in sliding contact with the inner circumferential walls of the cylinder sleeves 20a through 20c.

As shown in FIG. 16, even when the skirt 82 of the piston 80 is positioned at the bottom dead center, the removal hole Z1 is positioned below the bottom dead center. The air-fuel mixture is prevented from leaking from the chamber 88 by the piston rings 86a through 86c fitted over the circumferential wall of the piston 80. Therefore, the air-fuel mixture does not enter into the removal hole Z1.

Since the probe 64 of the friction stir welding tool 66 is removed below the bottom dead center of the skirt 82 of the piston 80, though the removal hole Z1 remains, the air-fuel mixture is prevented from entering into the removal hole Z1. As the ratio of air and fuel in the chamber 88 is kept within an appropriate range, the internal combustion engine can operate for its predetermined performance.

Figure 17:
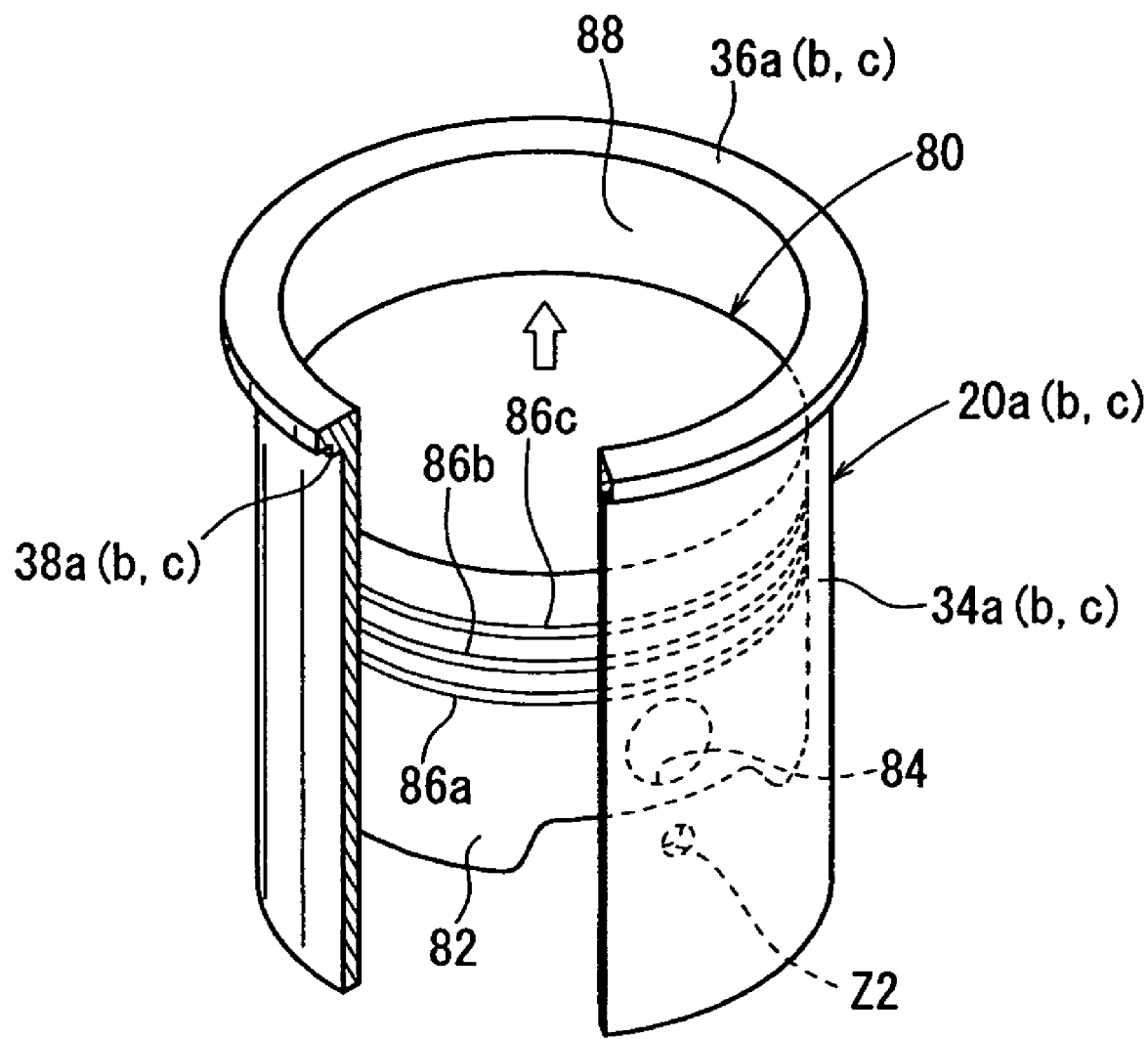
FIG. 17 is a perspective view, partly cut away, showing the positional relationship between a removal hole in the cylinder sleeve from which a probe of a friction stir welding tool is removed and piston rings that are positioned in the bottom dead center.

The probe 64 may be removed from a position above the bottom dead center of the skirt 82 insofar as it is below the bottom dead center of the lowermost piston ring 86a. In this case, as shown in FIG. 17, the skirt 82 may be held in sliding contact with a portion of the cylinder sleeve which is free of a removal hole Z2. To prevent the space on the inner circumferential walls of the cylinder sleeves 20a through 20c and the water jacket 22 from communicating with each other, the outer circumferential walls of the cylinder sleeves 20a through 20c and the first annular recess 13 are friction-stir-welded. The probe 54 is removed through the first annular recess 13 and the cylinder sleeves 20a through 20c.

Figure 18:
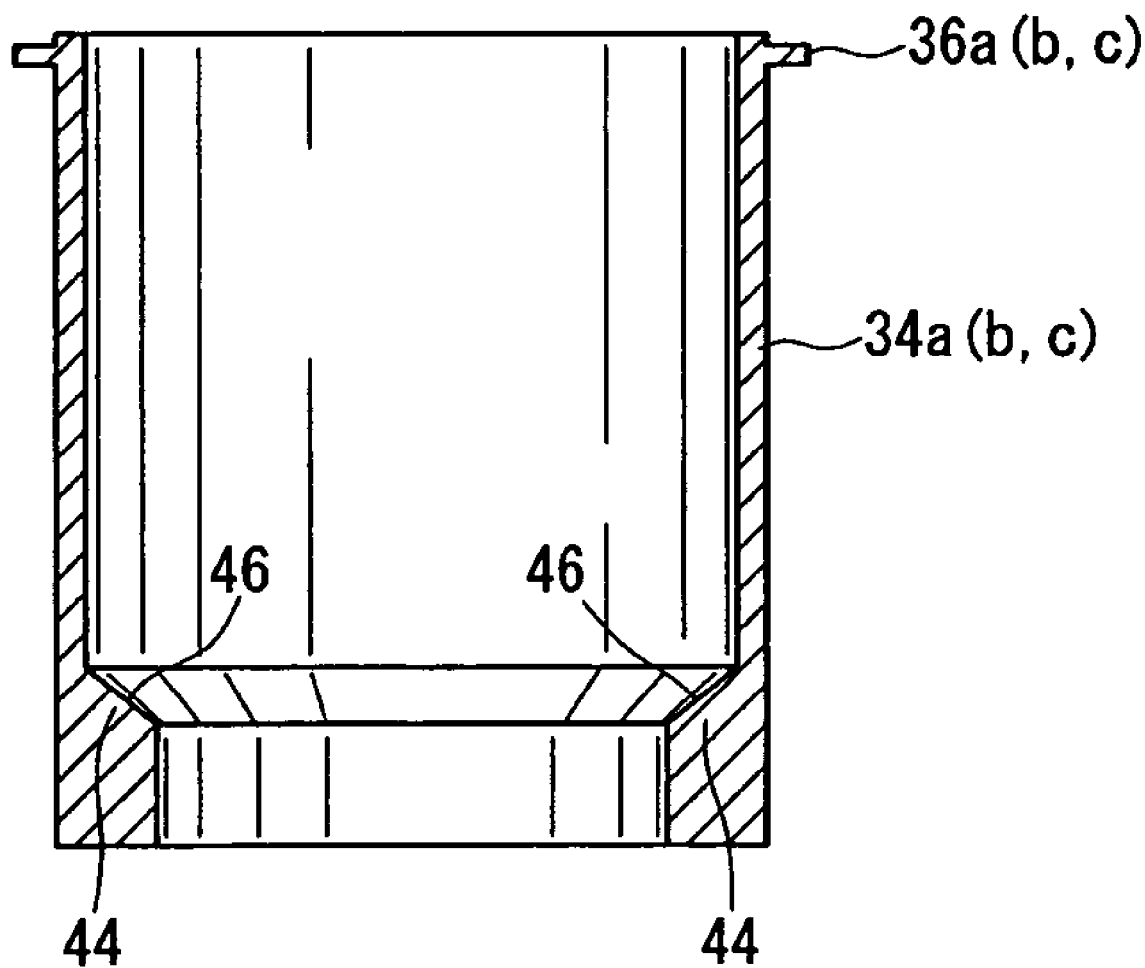
FIG. 18 is a vertical cross-sectional view of a cylinder sleeve having another shape.

The larger-diameter portions 36a through 36c do not necessarily need to be provided on the distal ends of the cylinder sleeves 20a through 20c. As shown in FIG. 18, for example, the larger-diameter portions 36a through 36c may be displaced from the distal ends slightly toward the reduced-diameter portions 44. In this case, it is not necessary to provide the reduced-diameter portions 44.

Figure 19:
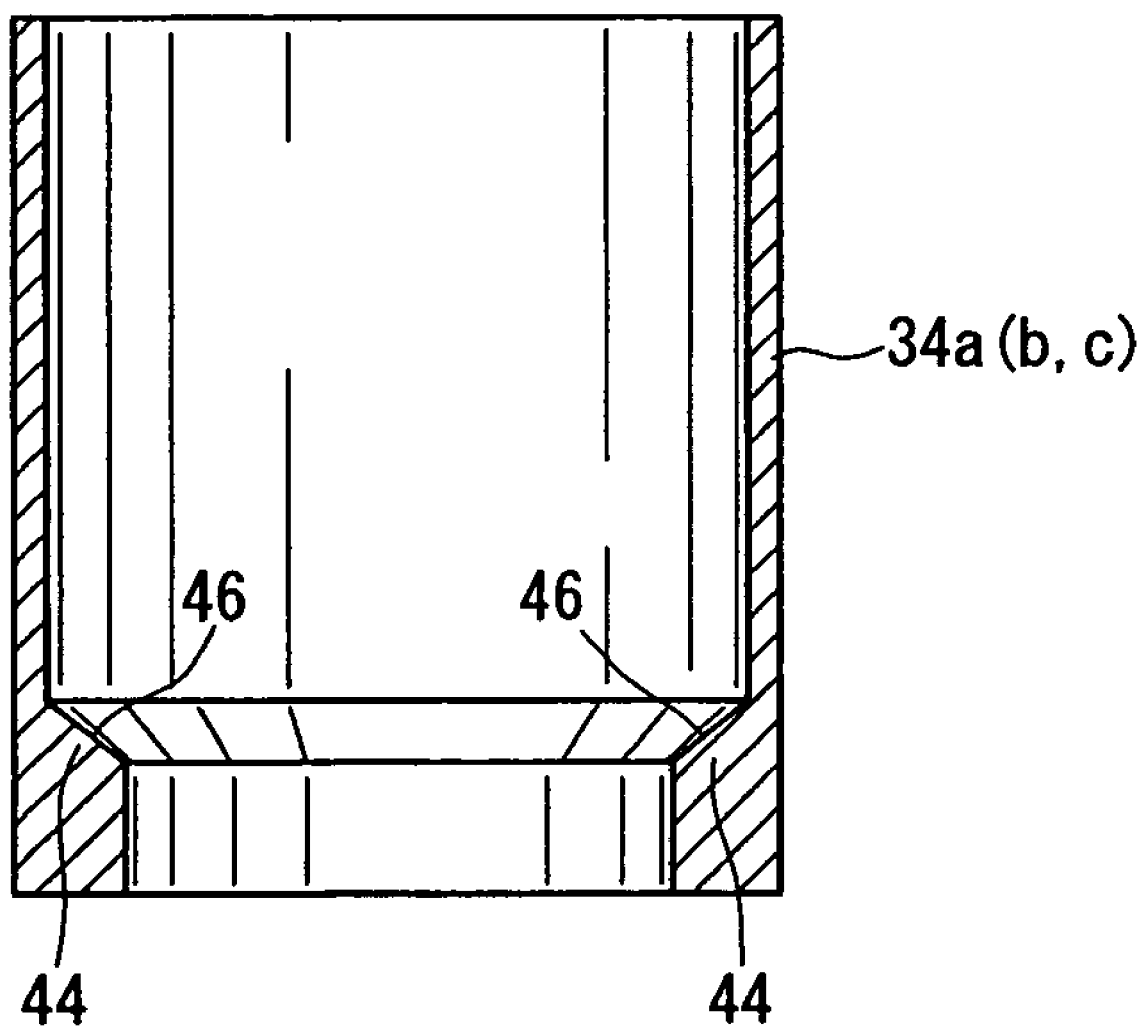
FIG. 19 is a vertical cross-sectional view of a cylinder sleeve having still another shape.

As shown in FIG. 19, the cylinder sleeves 20a through 20c may have only the reduced-diameter portions 44. In this case, an open-deck cylinder block may be manufactured wherein the end of the water jacket 22 at the gasket surface 12 is not closed. The reduced-diameter portions 44 are removed after the cylinder sleeves 20a through 20c are friction-stir-welded to the block body 18.

Removal holes from which the probe 54 is removed may be used as water passages connected to the water jacket 22.

Specifically, as described above, after the cylinder sleeves 20a through 20c are inserted into the communication hole 16 in the block body 18, the outer circumferential walls of the hollow cylindrical portions 34a through 34c of the cylinder sleeves 20a through 20c are integrally joined to the inner circumferential wall of the communication hole 16 through the reduced-diameter portions 44 (see FIG. 7).

Then, the larger-diameter portions 36a through 36c of the cylinder sleeves 20a through 20c and the gasket surface 12 of the block body 18 are friction-stir-welded to each other. At this time, the probe 54 of the friction stir welding tool 50 is displaced in the direction indicated by the arrow A in FIG. 20 along a region where the larger-diameter portion 36a and the gasket surface 12 abut against each other, a region where the larger-diameter portions 36a, 36b abut against each other, a region where the larger-diameter portion 36b and the gasket surface 12 abut against each other, a region where the larger-diameter portions 36b, 36c abut against each other, a region where the larger-diameter portion 36c and the gasket surface 12 abut against each other, a region where the larger-diameter portions 36c, 36b abut against each other, a region where the larger-diameter portion 36b and the gasket surface 12 abut against each other, a region where the larger-diameter portions 36b, 36a abut against each other, and a region where the larger-diameter portion 36a and the gasket surface 12 abut against each other. As the probe 54 is thus displaced, the material of the larger-diameter portions 36a through 36c and the material of the gasket surface 12 of the block body 18 are softened by frictional heat, and are stirred by the probe 54. As a result, these materials are joined in a solid state, integrally joining the cylinder sleeves 20a through 20c and the block body 18 to each other and also the cylinder sleeves 20a through 20c to each other.

Figure 20:
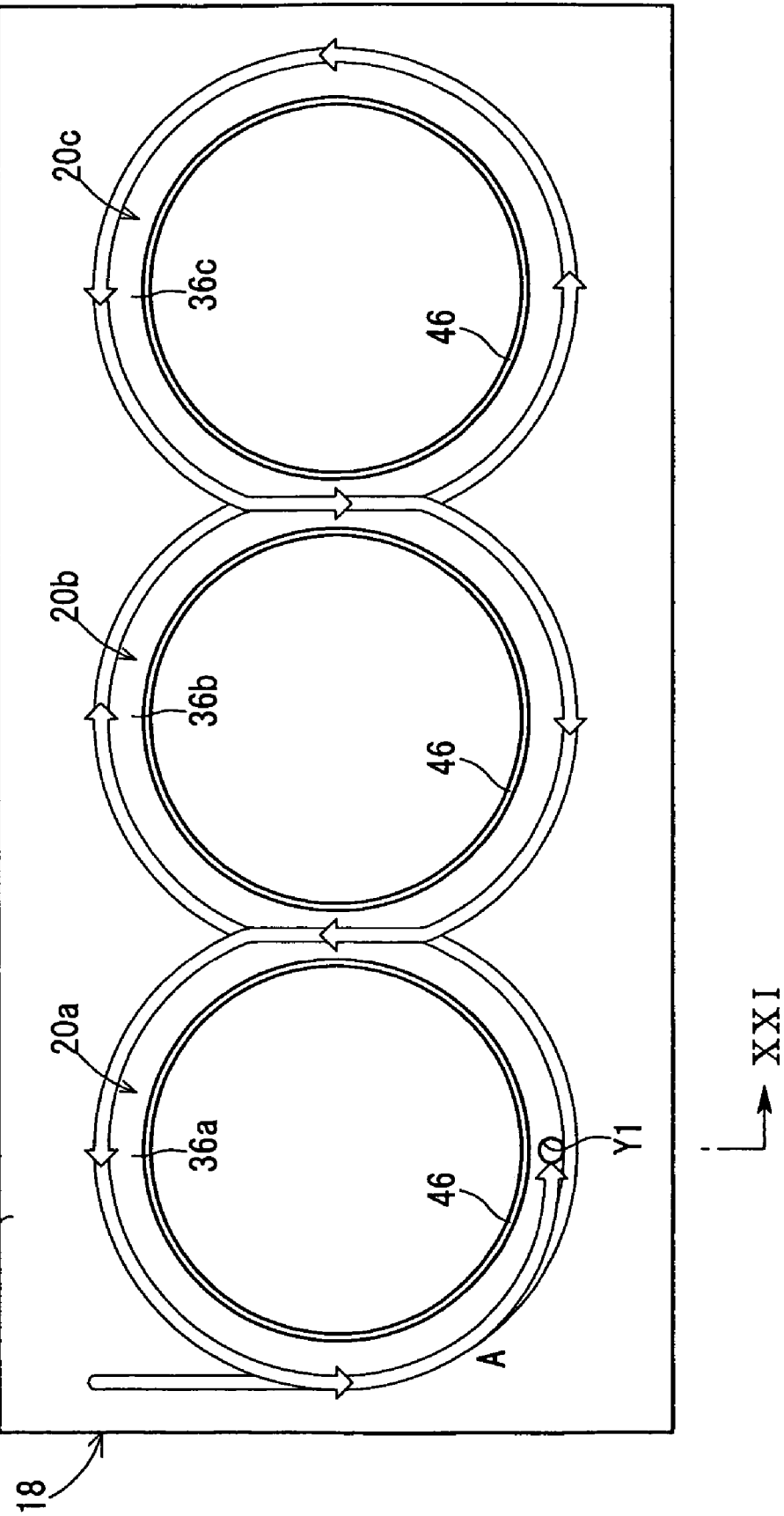
FIG. 20 is a plan view of a block body as viewed from a gasket surface, illustrating the direction in which a friction stir welding tool is displaced to join a larger-diameter portion to the block body.
Figure 21:
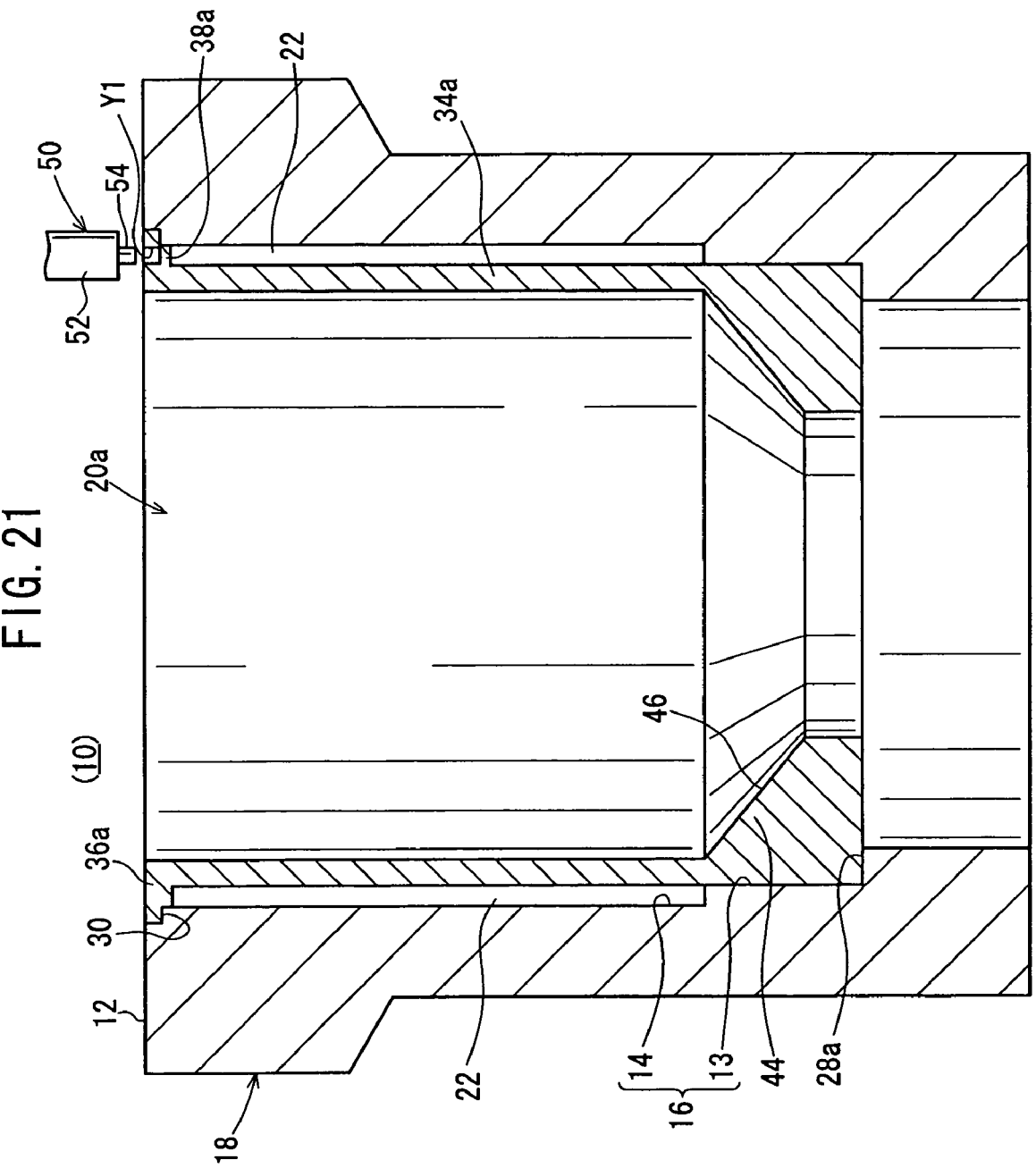
FIG. 21 is a cross-sectional view taken along line XXI-XXI of FIG. 20.

Thereafter, as shown in FIGS. 20 and 21, the probe 54 is removed from a region of the larger-diameter portion 36a where a water passage is to be formed, leaving a removal hole Y1 in the block body 18.

Figure 22:
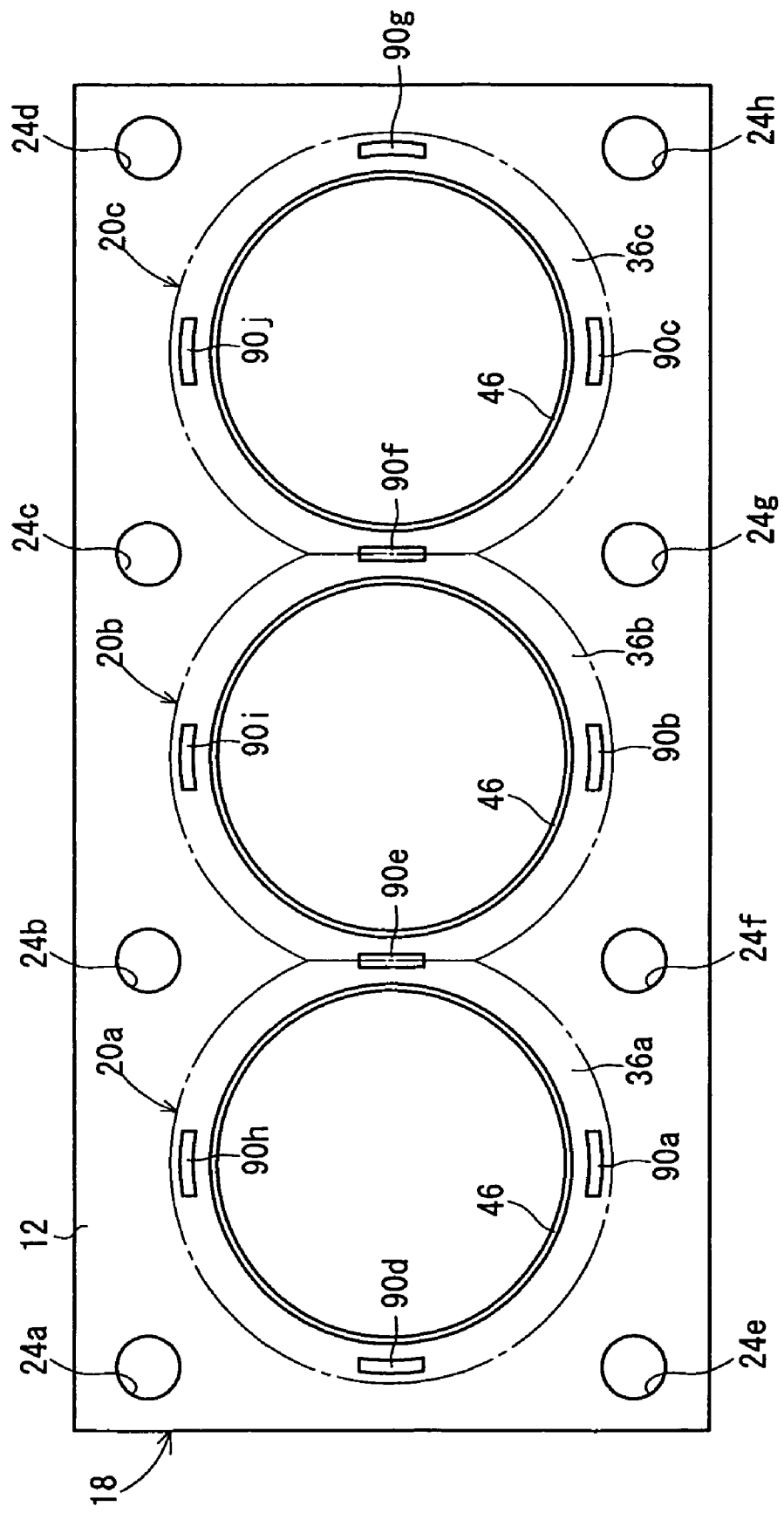
FIG. 22 is a plan view of a block body as viewed from a gasket surface, the cylinder block being manufactured when the block body and cylinder sleeves are friction-stir-welded.
Figure 23:
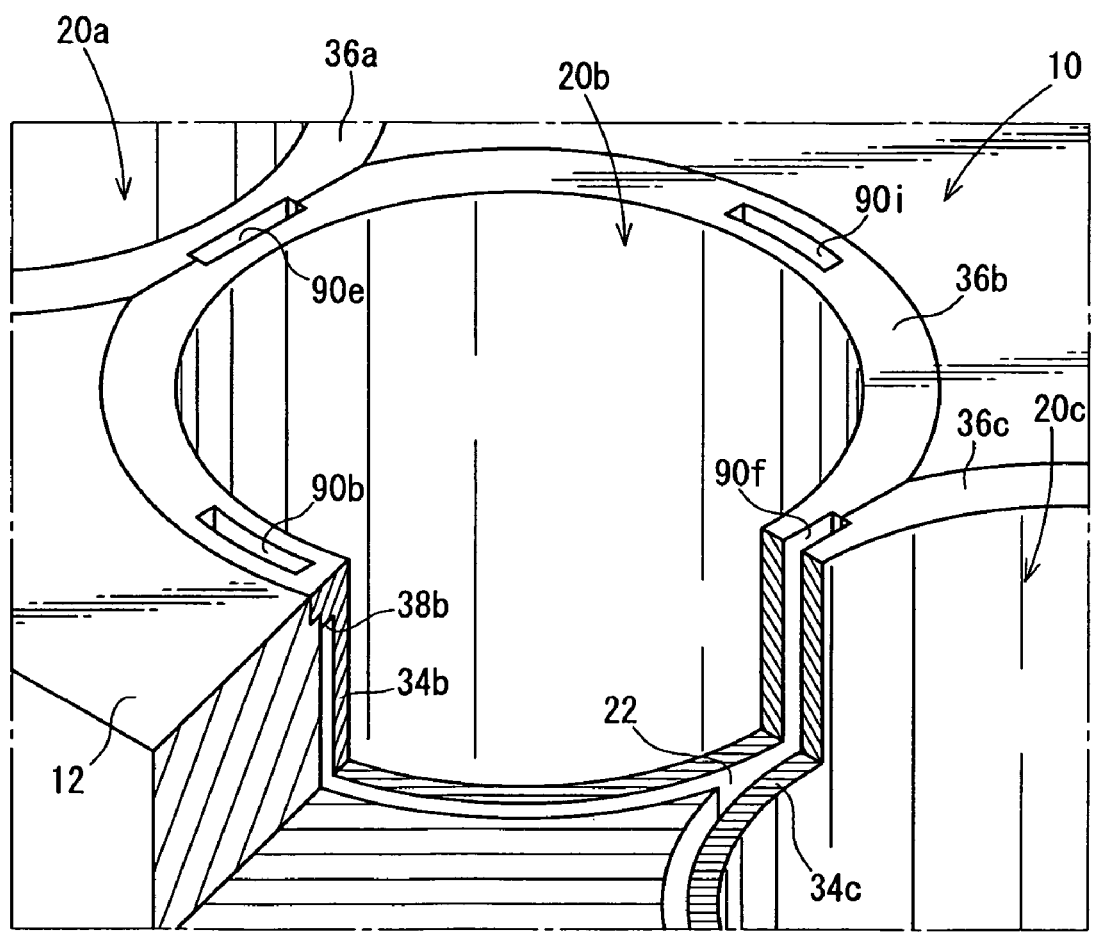
FIG. 23 is an enlarged fragmentary vertical cross-sectional view of the cylinder block shown in FIG. 22.

Thereafter, the removal hole Y1 is spread by a machining process and then finished into a water passage 90a as shown in FIG. 22. The removal hole Y1 does not remain as it is in the cylinder block 10. Then, water passages 90b through 90f are formed in the larger-diameter portions 36a through 36c. As can be seen from FIG. 23, the water passages 90a through 90f communicate with the water jacket 22.

Since the removal hole Y1 formed in the larger-diameter portion 36a is machined into the water passage 90a, the cylinder block 10 of good appearance is provided. As the removal hole Y1 does not remain as it is in the cylinder block 10, the cylinder block 10 is of excellent mechanical strength and rigidity.

No filler needs to be used, the block body 18 and the larger-diameter portions 36a through 36c do not need to be partly cut away, and the block body 18 and the larger-diameter portions 36a through 36c do not need to be large in size in advance. Therefore, the cost of the cylinder block 10 is reduced.

After the stud bolt holes 24a through 24h and the water passages 90a through 90j are formed, the reduced-diameter portions 44 of the cylinder sleeves 20a through 20c are removed as described above. The inner circumferential surfaces of the cylinder sleeves 20a through 20c are equalized in diameter (see FIG. 1), allowing pistons to be moved reciprocally in the cylinder sleeves 20a through 20c (see FIG. 16 or 17). When the reduced-diameter portions 44 are removed, the regions of the reduced-diameter portions 44 which include the removal holes from which the probe 54 was removed are also removed. Therefore, the removal holes do not remain in the inner circumferential walls of the hollow cylindrical portions 34a through 34c.

When cylinder block 10, a cylinder head (not shown), etc. are combined into an internal combustion engine, the water passages 90a through 90j communicate with a coolant passage in the cylinder head. Therefore, a coolant flowing through the coolant passage is introduced through the water passages 90a through 90j into the water jacket 22.

Figure 24:
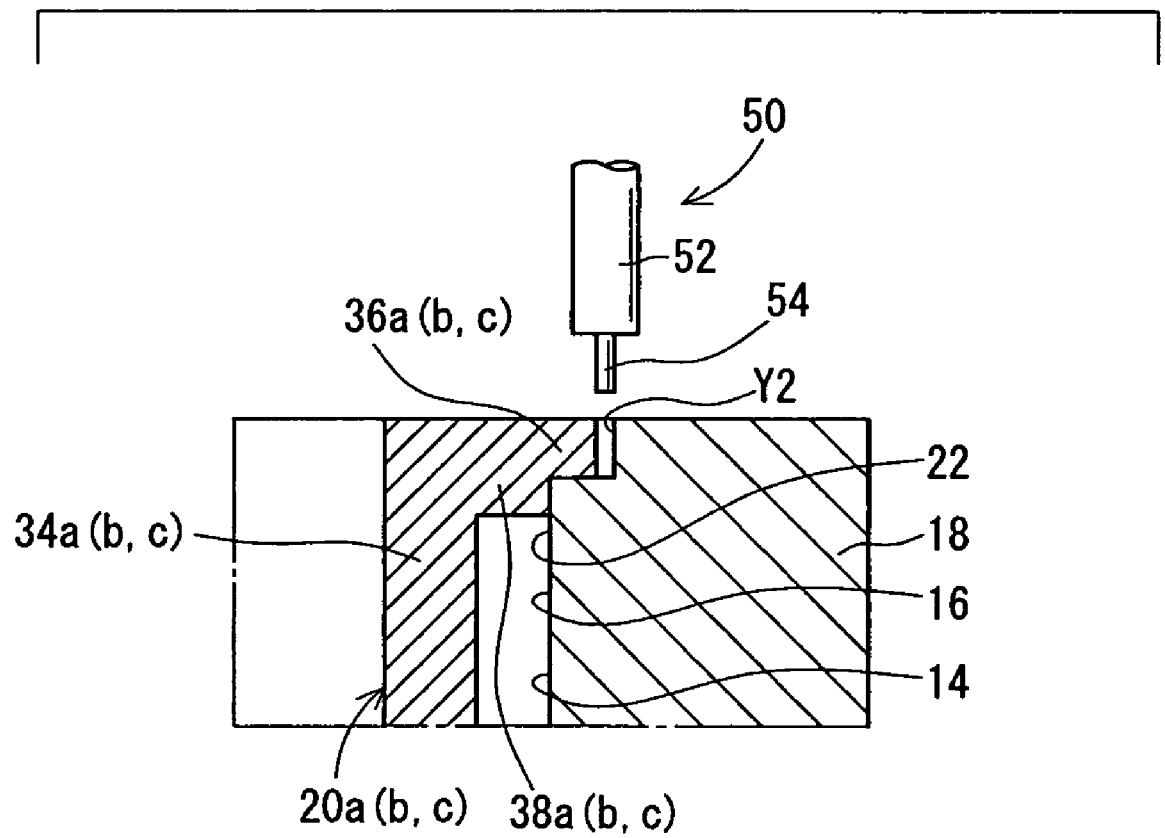
FIG. 24 is an enlarged fragmentary vertical cross-sectional view showing the manner in which a friction stir welding tool is removed from a junction between a larger-diameter portion and a gasket surface.
Figure 25:
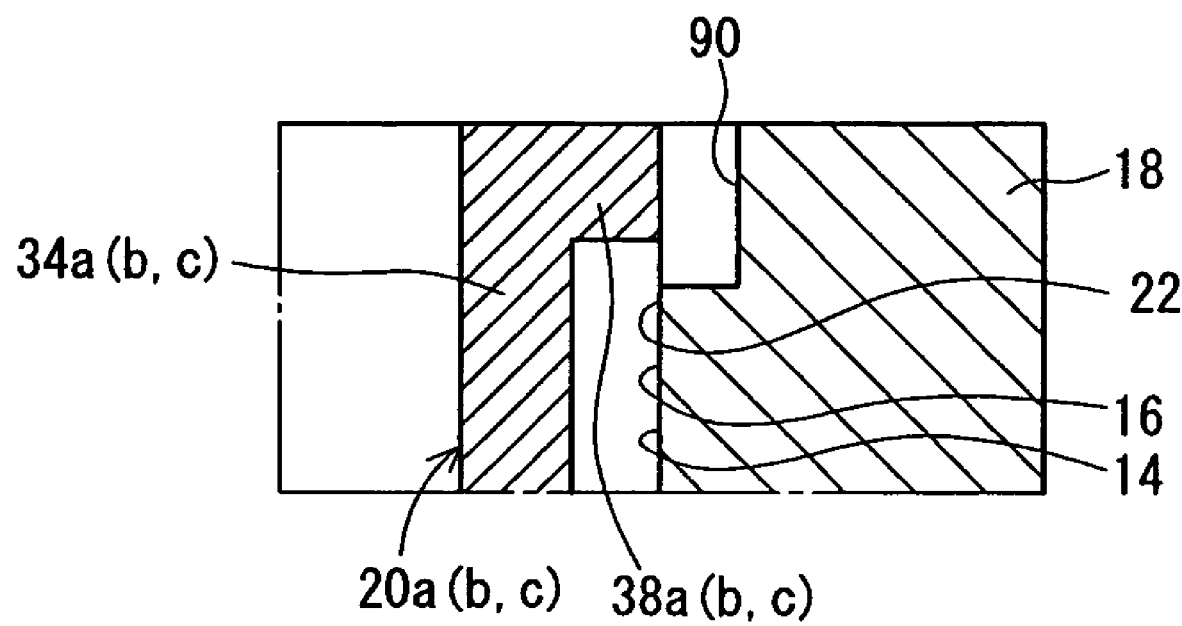
FIG. 25 is an enlarged fragmentary vertical cross-sectional view showing a bent water passage that is formed from a removal hole shown in FIG. 24.

As shown in FIG. 24, the probe 54 may be removed from a region where either one of the larger-diameter portions 36a through 36c and the gasket surface 12 are joined to each other. In this case, as shown in FIG. 25, a bent water passage 90 starting from the removal hole Y2 may be provided.

A second embodiment of the present invention for friction-stir-welding a cylinder sleeve having a hollow cylindrical shape to a block body will be described below.

Figure 26:
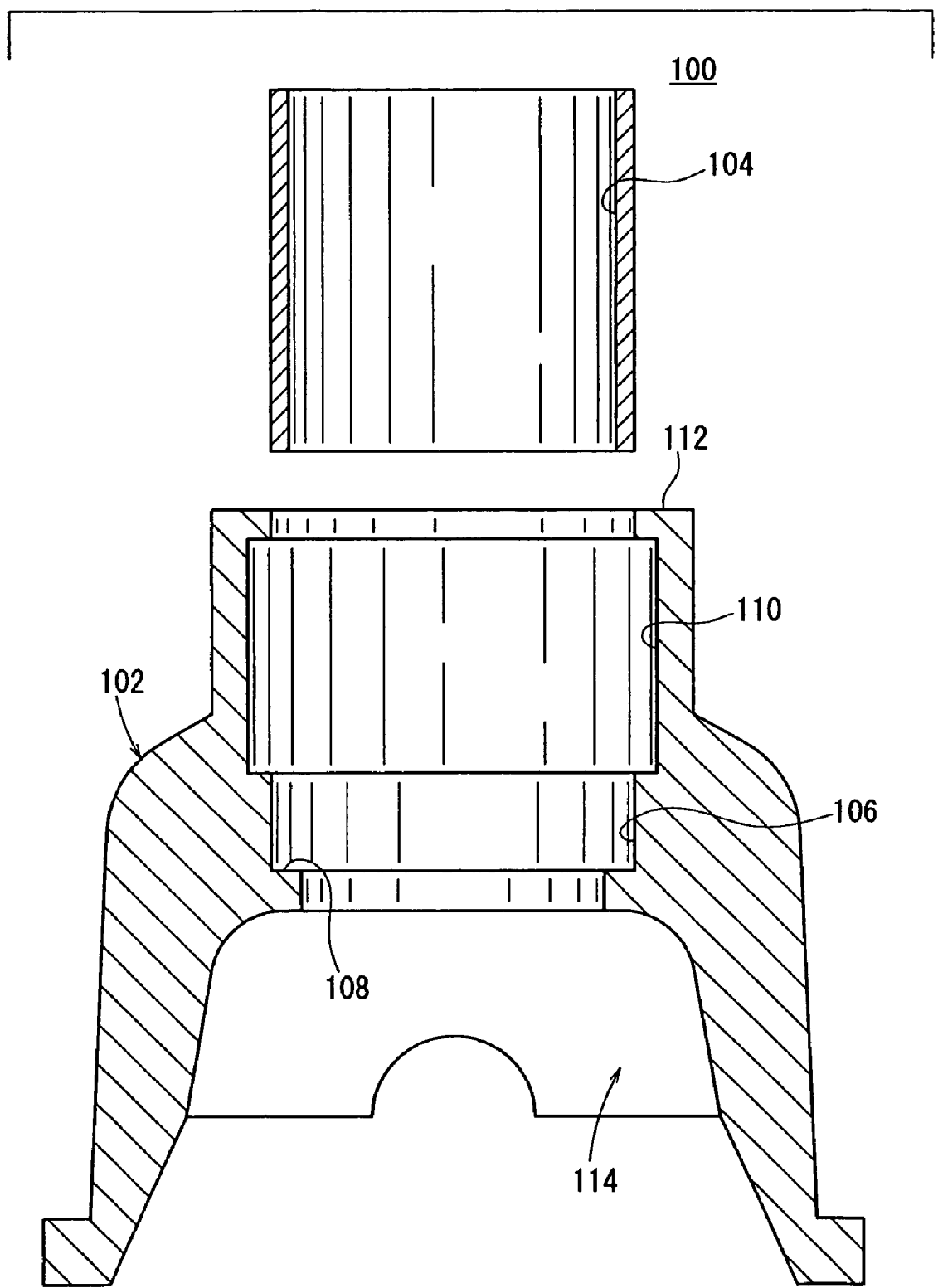
FIG. 26 is an exploded cross-sectional view of a cylinder block manufactured by a manufacturing method according to a second embodiment of the present invention.

FIG. 26 is an exploded cross-sectional view of a cylinder block 100. The cylinder block 100 comprises a block body 102 and a cylinder sleeve 104.

As can be seen from FIG. 26, the block body 102 has a communication hole 106 for inserting the cylinder sleeve 104 therethrough, and an annular step 108 disposed beneath the communication hole 106. The communication hole 106 has an annular step 110 which is diametrically dented. The communication hole 106 and the step 110 are disposed concentrically with each other. In FIG. 26, reference characters 112, 114 represent a gasket surface and a journal, respectively.

The block body 102 may be manufactured, for example, by HPDC using molten aluminum. It is not necessary to provide a collapsible core in the casting mold.

The cylinder sleeve 104 comprises a hollow cylindrical body that is manufactured from a workpiece of high-silicon-based aluminum by a known process such as an extrusion molding process, a casting process, or the like.

The block body 102 and the cylinder sleeve 104 are friction-stir-welded as follows.

As shown in FIG. 26, the cylinder sleeve 104 is inserted into the communication hole 106 in the block body 102. The inserted cylinder sleeve 104 has a lower end placed on the annular step 108. The cylinder sleeve 104 is now firmly supported from below. The opposite ends of the cylinder sleeve 104 which is inserted have respective outer circumferential walls held in abutment against the inner circumferential wall of the communication hole 106. The cylinder sleeve 104 has an intermediate portion whose outer circumferential wall is spaced from the step 110, providing a clearance therebetween as a water jacket 116.

According to the second embodiment, therefore, the water jacket 116 is formed when the cylinder sleeve 104 is inserted into the communication hole 106.

Figure 27:
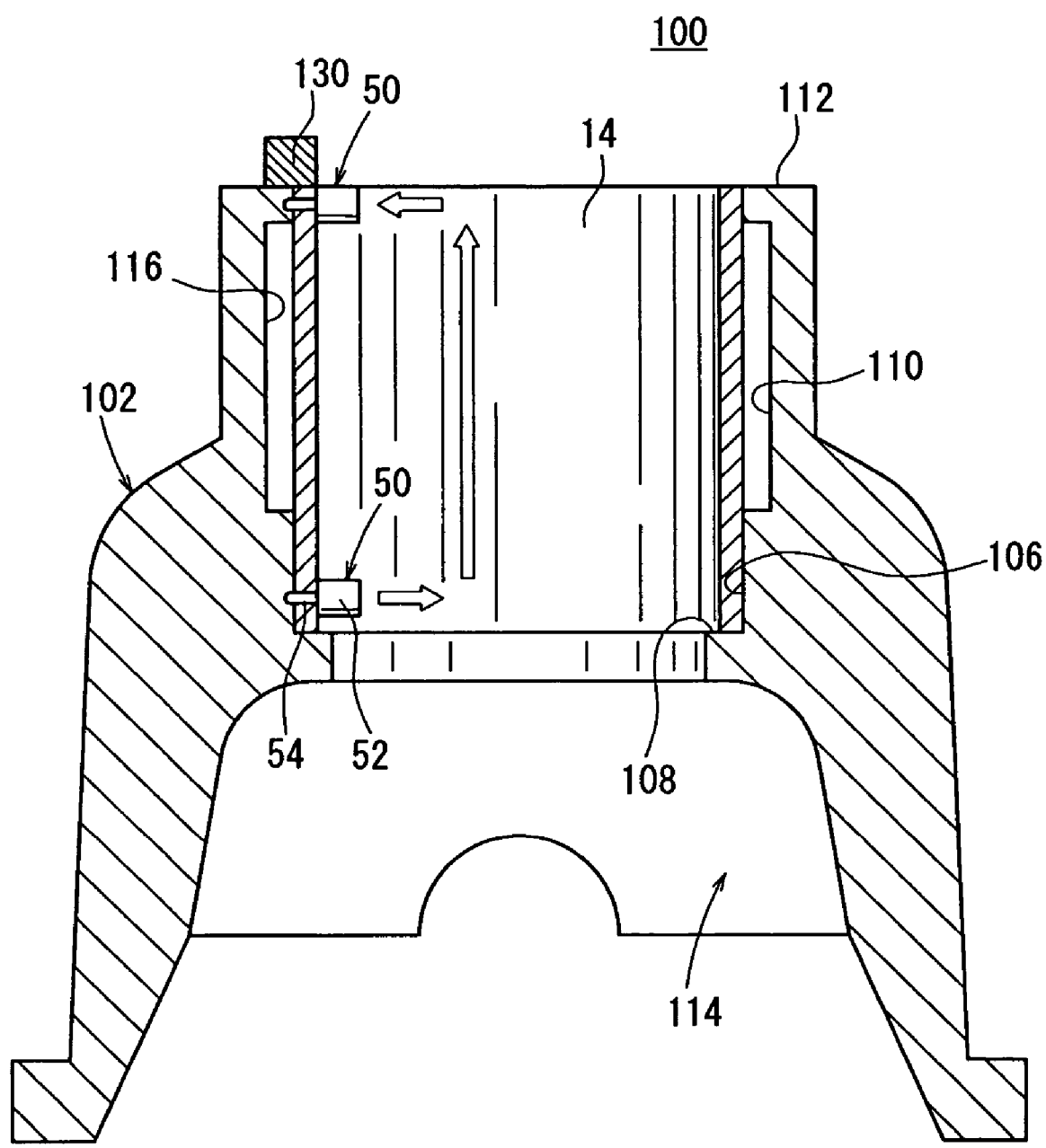
FIG. 27 is a vertical cross-sectional view showing the manner in which a cylinder sleeve is inserted into a communication hole in a block body and a probe of a friction stir welding tool is embedded.

Then, as shown in FIG. 27, a friction stir welding tool removal member 130 having a curved surface which is curved in the same manner as with the inner circumferential wall of the cylinder sleeve 104 is placed on the end face of the cylinder sleeve 104 at the gasket surface 112 and the gasket surface 112. The friction stir welding tool removal member 130 is made of aluminum. The friction stir welding tool removal member 130 is rigidly fixed in position by a jig (not shown).

Then, the inner circumferential wall of the communication hole 106 and the outer circumferential surface of the cylinder sleeve 104 are integrally joined by friction stir welding.

As described above, the friction stir welding tool 50 comprises the cylindrical rotor 52 and the probe 54 which is smaller in diameter than the rotor 52 and has the conical tip end. In the present embodiment, the friction stir welding tool 50 as it is held substantially horizontally is inserted into the communication hole 106 until the probe 54 is brought into abutment against the cylinder sleeve 104 near its lower end.

Then, the rotor 52 is rotated to cause the probe 54 to slide against the cylinder sleeve 104, generating frictional heat to soften the region of the cylinder sleeve 104 which is contacted by the probe 54. The tip end of the probe 54 is embedded in the softened region.

The embedded probe 54 passes through the cylinder sleeve 104 and finally reaches the inner circumferential wall of the communication hole 106, whereupon the outer circumferential wall of the cylinder sleeve 104 and the inner circumferential wall of the communication hole 106 are softened by frictional heat.

Then, the friction stir welding tool 50 is turned in the circumferential direction of the cylinder sleeve 104. The softened material is stirred by the probe 54 and plastically flows. Thereafter, the softened material is joined in a solid state when the probe 54 is removed therefrom. The above phenomenon is sequentially repeated as the friction stir welding tool 50 is turned until the outer circumferential wall of the cylinder sleeve 104 and the inner circumferential wall of the communication hole 106 are integrally joined to each other.

As shown in FIG. 27, the cylinder sleeve 104 is rigidly supported by being placed on the annular step 108. Therefore, the friction stir welding process can easily be performed.

After the friction stir welding tool 50 is turned, the probe 54 is temporarily removed from the cylinder sleeve 104.

At this time, a removal hole is formed in the inner circumferential wall of the cylinder sleeve 104. As with the first embodiment, the removal hole is positioned below the bottom dead center of the piston 80, or below the bottom dead center of the piston ring 86a and above the bottom dead center of the skirt 82, in a region which is not held in sliding contact with the skirt 82. Therefore, a mixture of air and gasoline does not enter into the removal hole, so that the output power of the internal combustion engine will not be adversely affected.

Thereafter, the rotating probe 54 is embedded into a region where an upper inner circumferential wall of the communication hole 106 and the outer circumferential wall of the cylinder sleeve 104 abut against each other, and the friction stir welding tool 50 is turned again in the circumferential direction of the cylinder sleeve 104. When the friction stir welding tool 50 is turned, the outer circumferential wall of the cylinder sleeve 104 and the inner circumferential wall of the communication hole 106 are softened and stirred by the probe 54, and plastically flow until they are finally integrally joined to each other. The cylinder block 100 constructed of the block body 102 and the cylinder sleeve 104 which are integrally combined with each other is now produced.

As can be seen from FIG. 27, the cylinder block 100 is a so-called closed-deck cylinder block wherein the end of the water jacket 116 at the gasket surface 112 is closed. There are no visible boundary lines existing between the block body 102 and the cylinder sleeve 104 that have been joined to each other.

Figure 28:
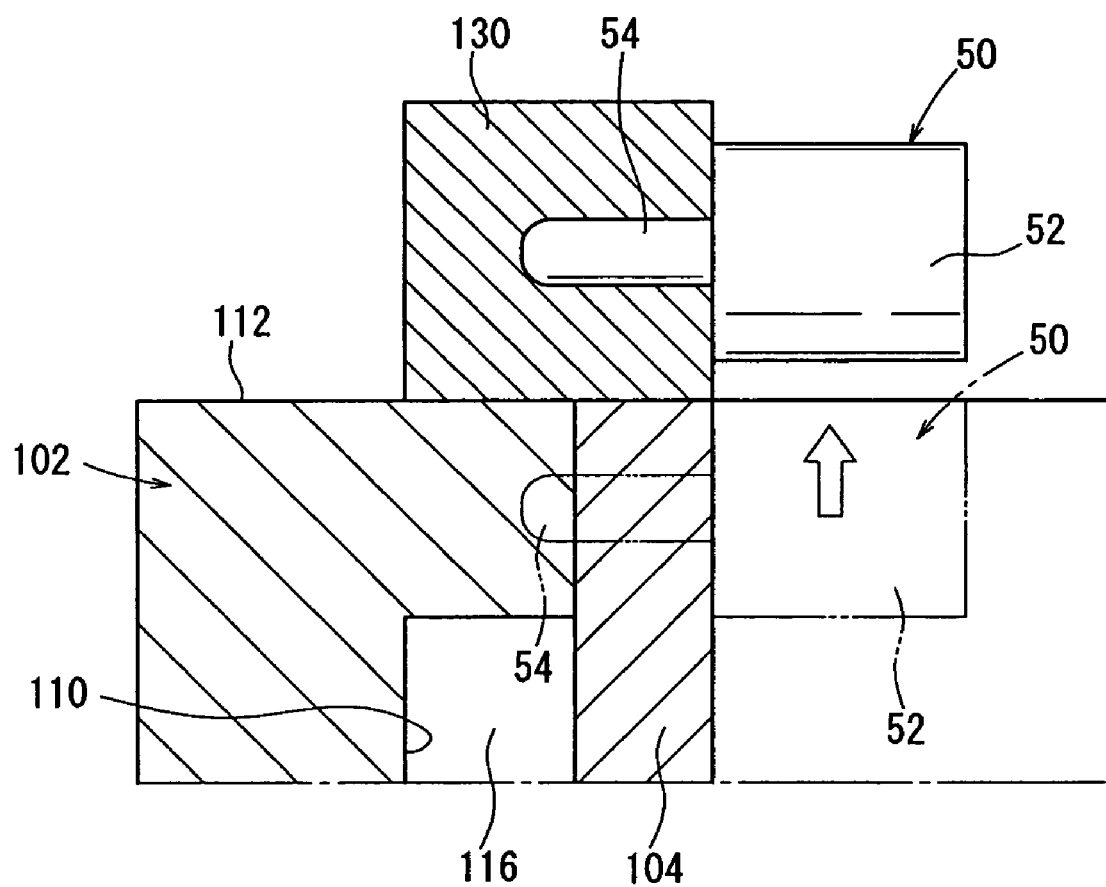
FIG. 28 is an enlarged fragmentary vertical cross-sectional view showing the manner in which after a friction stir welding process is performed, the friction stir welding tool is moved to a friction stir welding tool removal member.

After the friction stir welding process is finished, the friction stir welding tool 50 is moved upwardly. As shown at an enlarged scale in FIG. 28, the probe 54 is removed from the cylinder sleeve 104 and the block body 102, and embedded into the friction stir welding tool removal member 130.

Thereafter, the probe 54 is removed from the friction stir welding tool removal member 130, leaving a removal hole in the friction stir welding tool removal member 130, but not in the cylinder sleeve 104 or the block body 102.

By thus placing the friction stir welding tool removal member 130 at the opening of the communication hole 106 and removing the probe 54 from the friction stir welding tool removal member 130, the cylinder block 100 free of a removal hole is produced. The cylinder block 100 is thus of excellent appearance.

As no removal hole is left in the cylinder block 100, the cylinder block 100 is of excellent mechanical strength and rigidity.

According to the second embodiment, no filler needs to be used, and the block body 102 and the cylinder sleeve 104 do not need to be partly cut away. Therefore, the cost of the cylinder block 100 is reduced.

The block body 102 of the cylinder block 100 has a small wall thickness as it is cast by HPDC. As with the first embodiment, the clearance between the step 110 of the block body 102 and the cylinder sleeve 104 serves as the water jacket 116. Consequently, it is not necessary to provide the water jacket 2 as a space in the block body 5 in the general closed-deck cylinder block 1 (see FIG. 58).

For the above reasons, the wall thickness of the block body 102 can be reduced, the volume of the cylinder block 100 can be reduced. Therefore, the cylinder block 100 can be reduced in size and volume.

Figure 29:
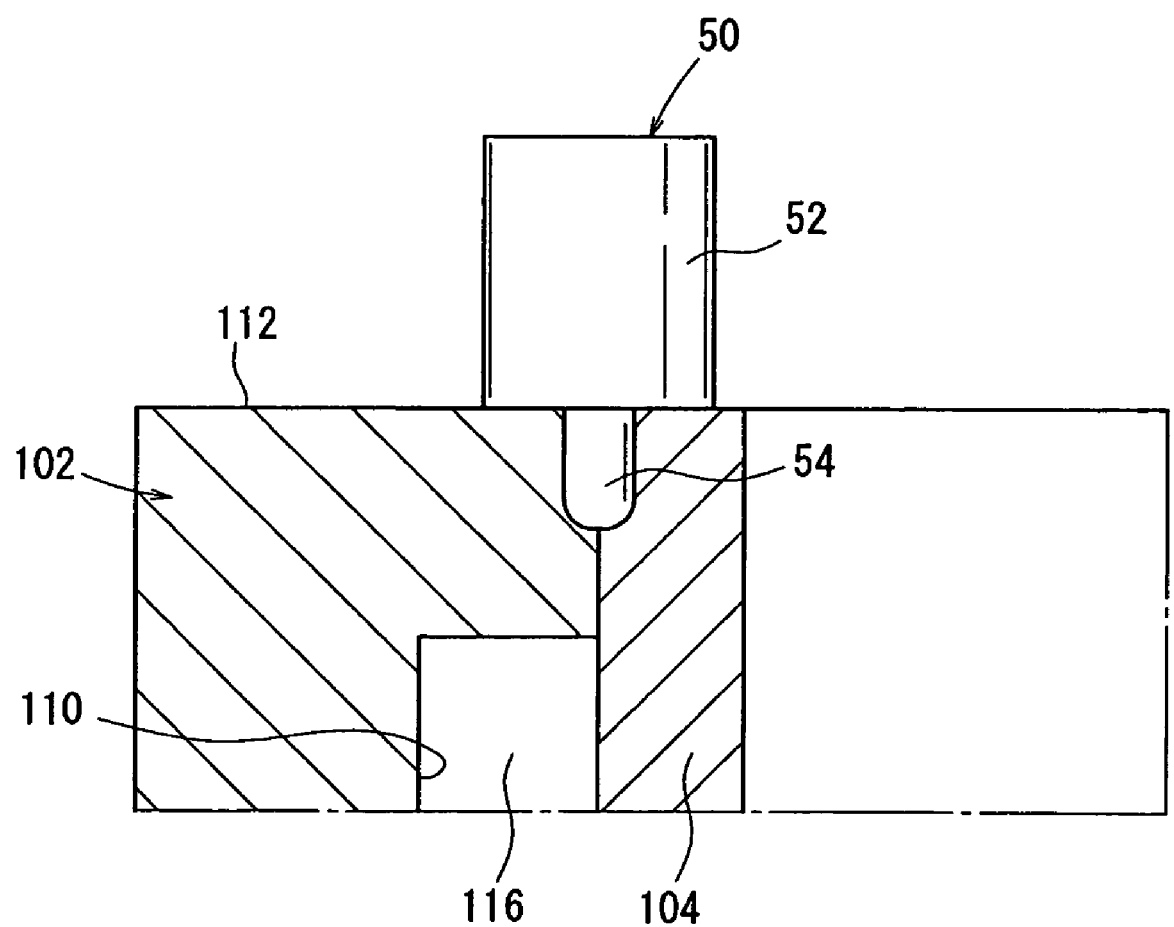
FIG. 29 is an enlarged fragmentary vertical cross-sectional view showing the manner in which a gasket surface of the block body and an end of a cylinder sleeve which is close to the gasket surface are friction-stir-welded.

For making the gasket surface 112 of the cylinder block 100 flat, the friction stir welding tool removal member 130 is released from the jig and removed. Thereafter, as shown in FIG. 29, the end of the cylinder sleeve 104 at the gasket surface 112 and the gasket surface 112 may be integrally joined by friction stir welding. The rigidity of the cylinder block 100 is thus further increased.

Figure 30:
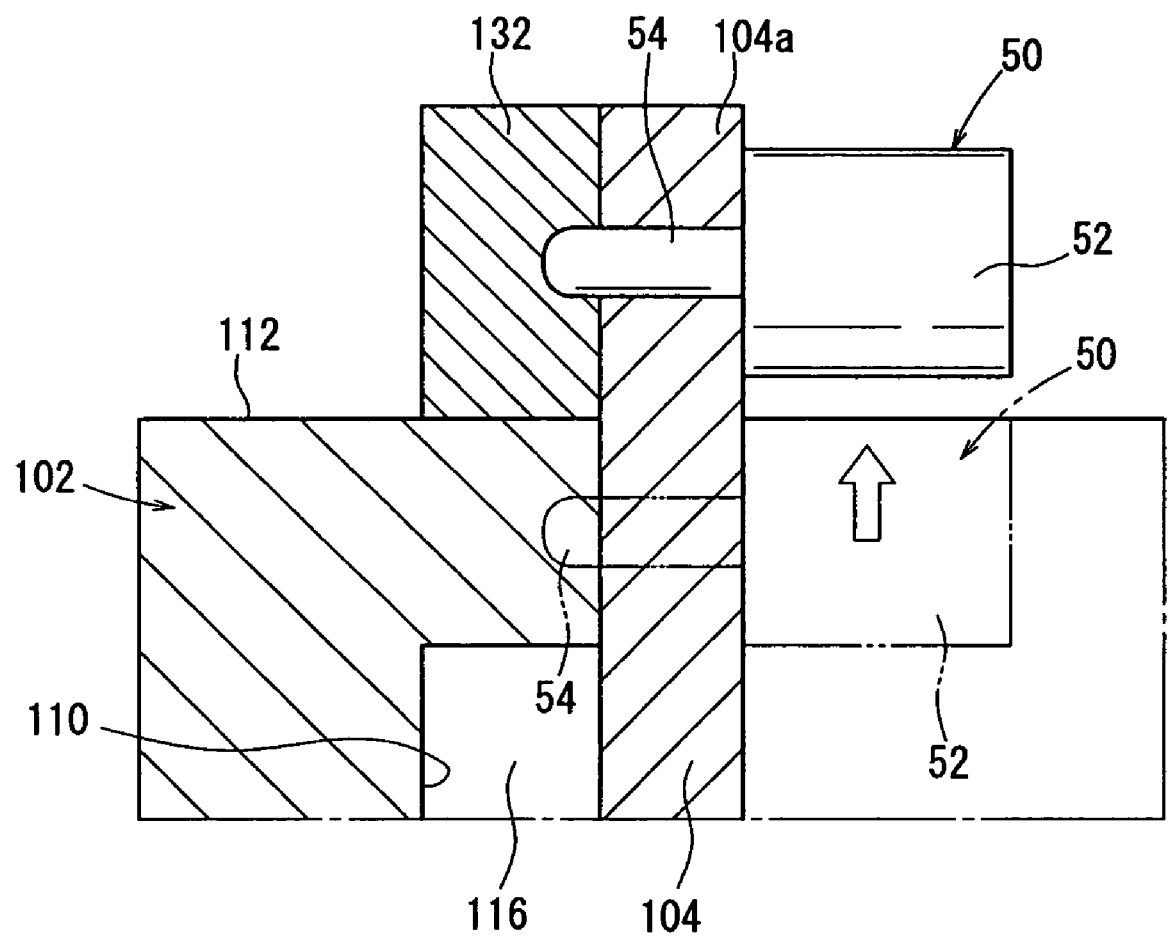
FIG. 30 is an enlarged fragmentary vertical cross-sectional view showing the manner in which after a friction stir welding process is performed, the friction stir welding tool is moved to an end projecting from a hole and surrounded by a friction stir welding tool removal member.

As shown in FIG. 30, the cylinder sleeve 104 may have an end 104a projecting from the communication hole 106. In this case, a friction stir welding tool removal member 132 may be used for supporting the outer circumferential surface of the projecting end 104a.

After the friction stir welding process is performed, the friction stir welding tool 50 is moved to the end 104a. As shown in FIG. 30, the probe 54 is removed from the block body 102 and embedded into the end 104a and the friction stir welding tool removal member 132.

Thereafter, the probe 54 is removed from the friction stir welding tool removal member 132 through the end 104a, leaving a removal hole in the friction stir welding tool removal member 132 and the end 104a, but not in the block body 102.

Figure 31:
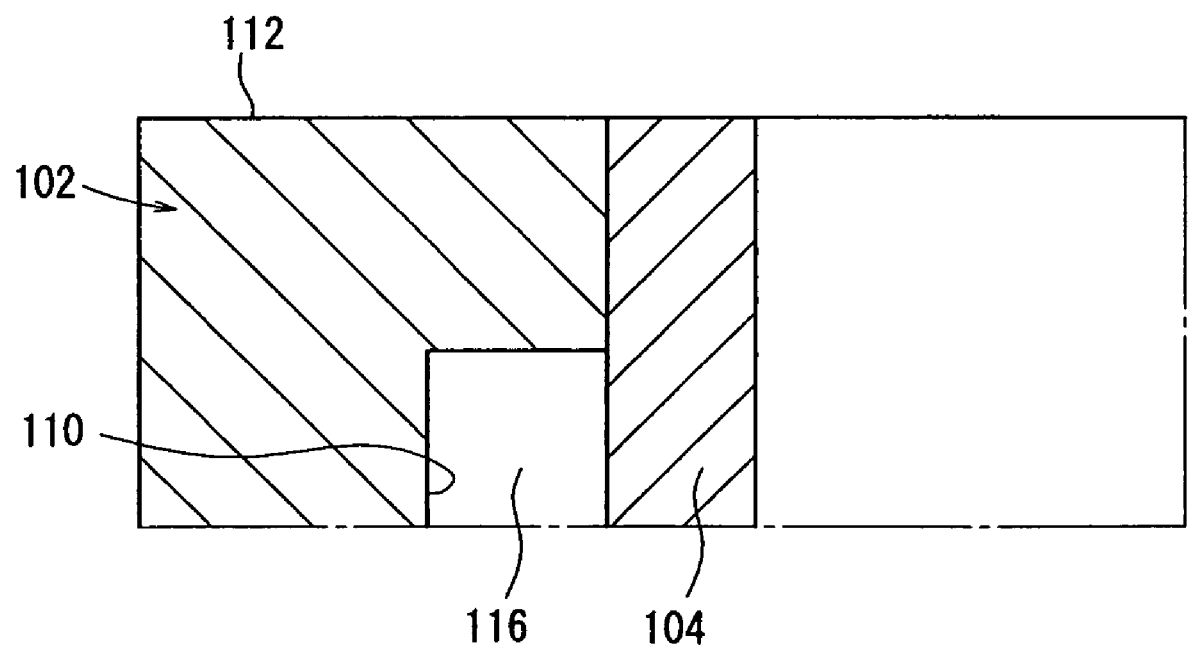
FIG. 31 is an enlarged fragmentary vertical cross-sectional view showing the manner in which after the friction stir welding tool is removed from the friction stir welding tool removal member through the end, the end is cut off.

The end 104a projecting from the communication hole 106 is then cut and removed together with the friction stir welding tool removal member 132, as shown in FIG. 31, making the upper end of the cylinder sleeve 104 and the gasket surface 112 lie flush with each other. When the projecting end 104a and the friction stir welding tool removal member 132 are removed, the region of the end 104a where the removal hole is formed is simultaneously removed. Therefore, no removal hole remains in the produced cylinder block 100.

By thus having the end 104a of the cylinder sleeve 104 project from the communication hole 106 and removing the probe 54 from the friction stir welding tool removal member 132 which surrounds the outer circumferential wall of the end 104a, the cylinder block 100 is produced free of removal holes.

The friction stir welding tool remover is not limited to the members 130,132 that are separate from the block body 102, but may be a member integrally projecting from the gasket surface 112 of the block body 102. In this case, the friction stir welding tool remover may be removed after the friction stir welding process.

The friction stir welding tool remover is not limited to a plate shape having a curved surface that is curved along the circumference of the cylinder sleeve 104, but may be of an annular shape covering the end face of the cylinder sleeve 104 at the gasket surface 112 or an annular shape surrounding the end 104a of the cylinder sleeve 104 which projects from the communication hole 106.

The friction stir welding tool removal members 130, 132 are not limited to being made of aluminum, but may be made of a material which allows the probe 54 to move easily therein.

According to the second embodiment, a cylinder sleeve in the form of a hollow cylindrical body may be joined to a block body as follows.

Figure 32:
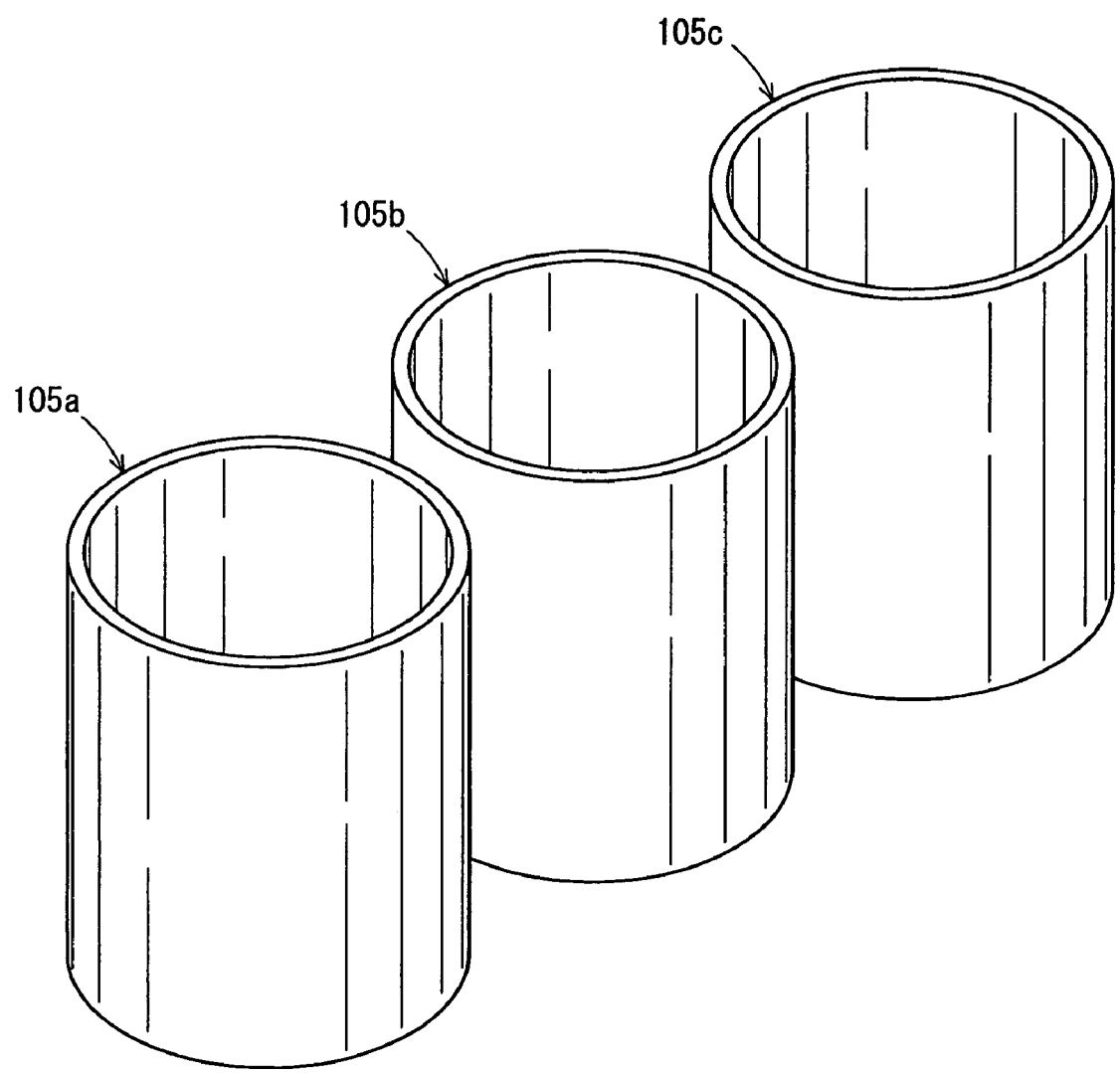
FIG. 32 is a perspective view of cylinder sleeves on which a friction stir welding method according to the second embodiment of the present invention is performed.
Figure 33:
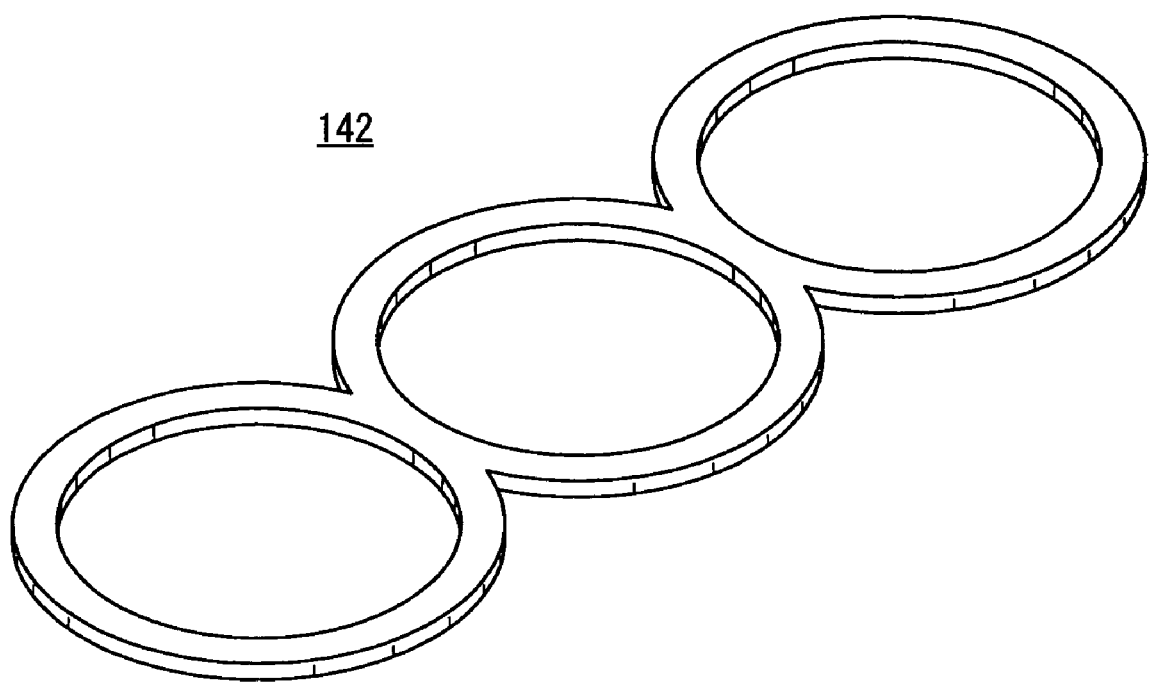
FIG. 33 is a perspective view of a closure member on which the friction stir welding method according to the second embodiment of the present invention is performed.

A block body 140 (see FIG. 37) is manufactured by HPDC using molten aluminum in the same manner as described above. Cylinder sleeves 105a through 105c shown in FIG. 32 which are in the form of hollow cylindrical bodies made of high-silicon-based aluminum are manufactured, and the upper ends of the outer circumferential walls of the cylinder sleeves 105a through 105c are linearly joined by a closure member 142 shown in FIG. 33. As can be seen from FIG. 33, the closure member 142 is in the form of a linear assembly of three annular members.

Figure 34:
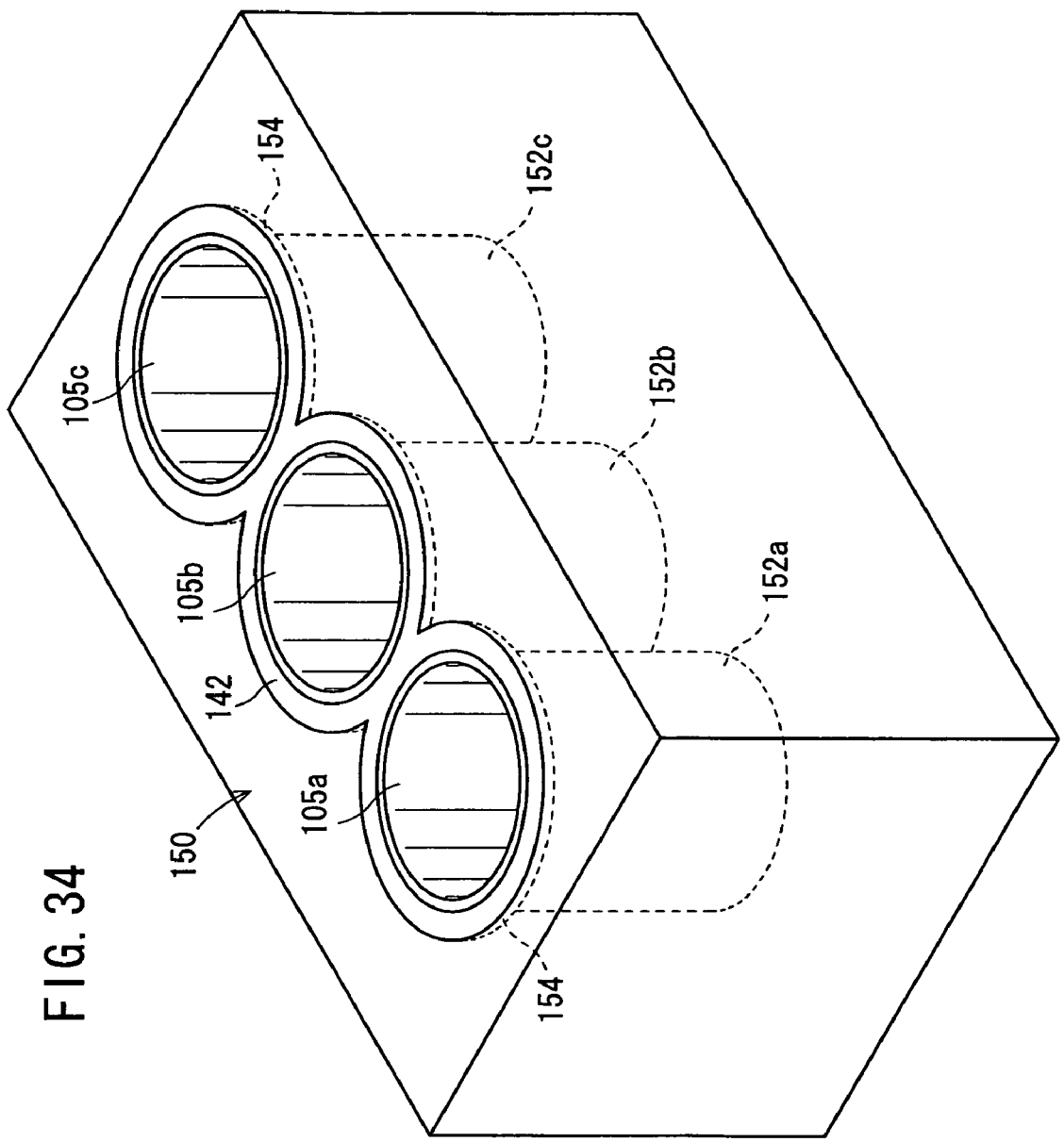
FIG. 34 is a perspective view of a jig for friction-stir-welding the cylinder sleeves and the closure member.

An embodiment in which the cylinder sleeves 105a through 105c and the closure member 142 are joined to each other using a jig 150 shown in FIG. 34, and the cylinder sleeves 105a through 105c that are linearly joined by the closure member 142 are joined to the block body 140 will be described below.

Figure 35:
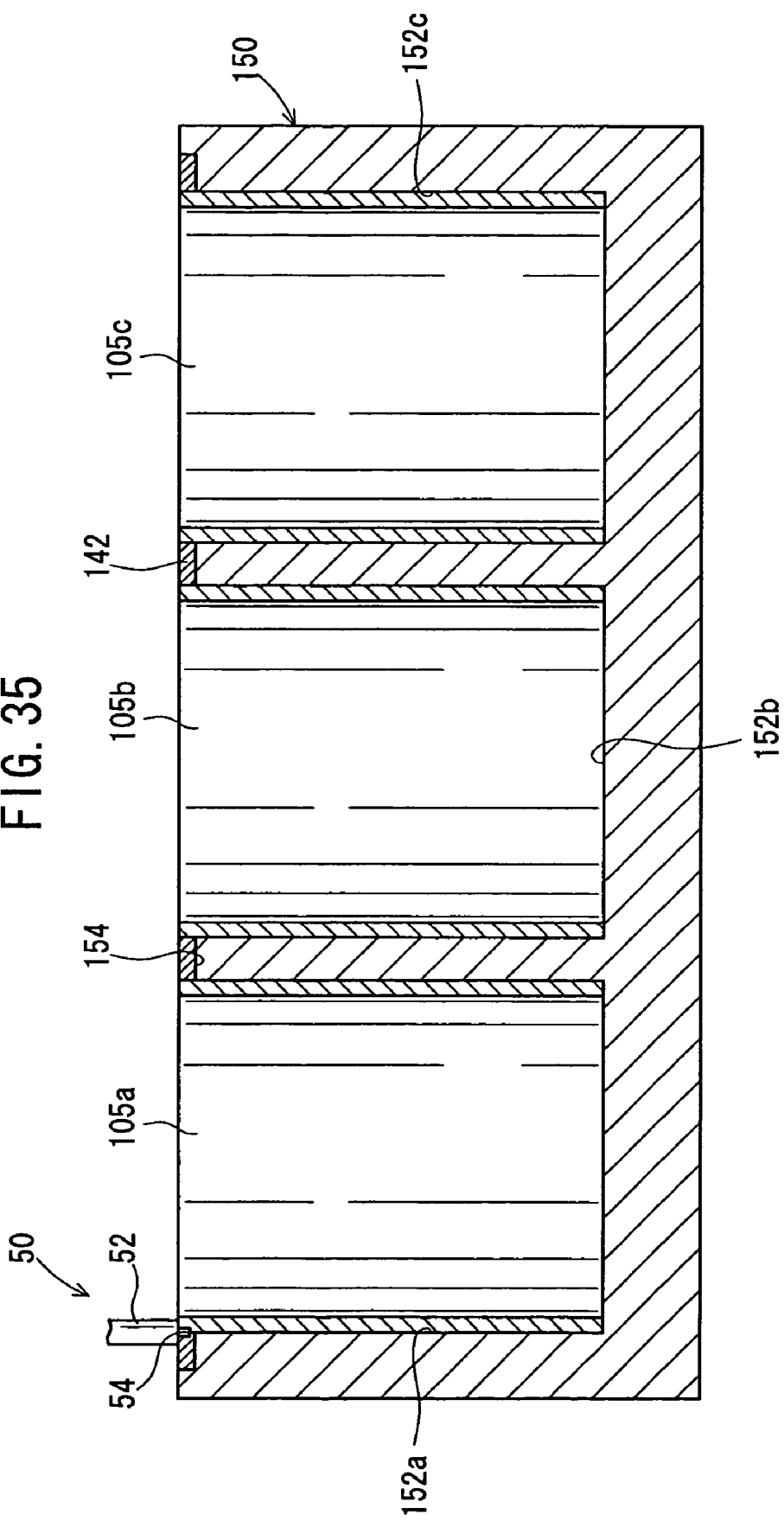
FIG. 35 is a vertical cross-sectional view showing the manner in which the cylinder sleeves and the closure member are joined by friction stir welding, using the jig shown in FIG. 34.

The jig 150 is in the form of a rectangular parallelepiped having first insertion units 152a through 152c that are formed by removing cylindrical forms of the material of the jig 150, and a second insertion unit 154 disposed in surrounding relation to the openings of the first insertion units 152a through 152c. As shown in FIGS. 34 and 35, the cylinder sleeves 105a through 105c are inserted respectively into the first insertion units 152a through 152c, and the closure member 142 is inserted into the second insertion unit 154. The friction stir welding tool 50 then operates to join the cylinder sleeves 105a through 105c and the closure member 142 to each other.

Figure 36:
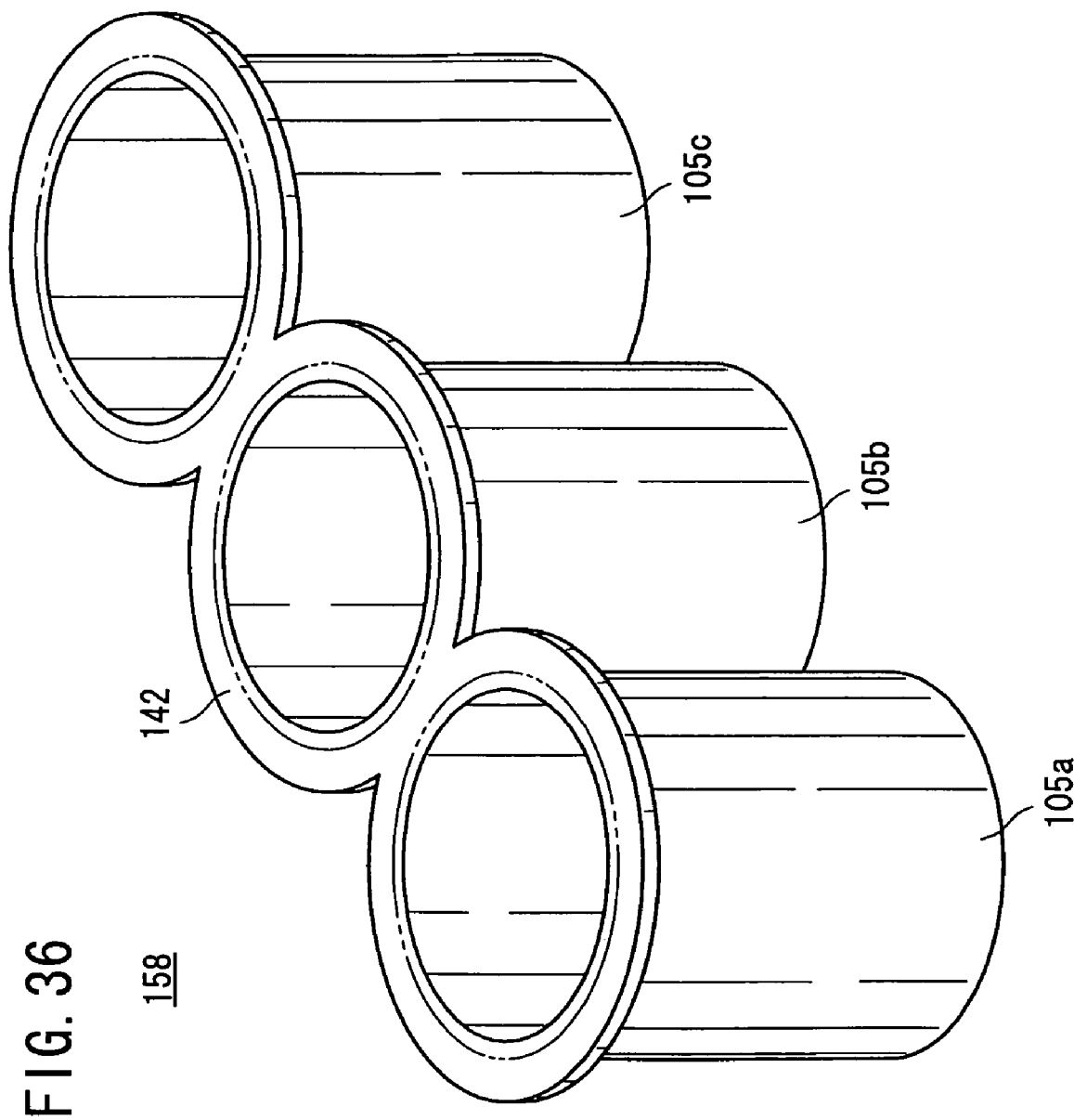
FIG. 36 is a perspective view of a joined sleeve assembly manufactured when the cylinder sleeves and the closure member are joined together.

Specifically, the probe 54 of the friction stir welding tool 50 is brought into abutment against any desired position in a region where the cylinder sleeves 105a through 105c and the closure member 142 abut against each other, and then the rotor 52 is rotated. When the rotor 52 is rotated, the material of the abutting region plastically flows, allowing the probe 54 to be embedded in the abutting region. Then, the friction stir welding tool 50 is displaced along the abutting region, whereupon the material of the closure member 142 and the material of the block body 140 are friction-stir-welded, joining the inner circumferential edge of the closure member 142 and the upper ends of the outer circumferential walls of the cylinder sleeves 105a through 105c. As shown in FIG. 36, a joined sleeve assembly 158 as closed-deck cylinder sleeves is now produced.

Figure 37:
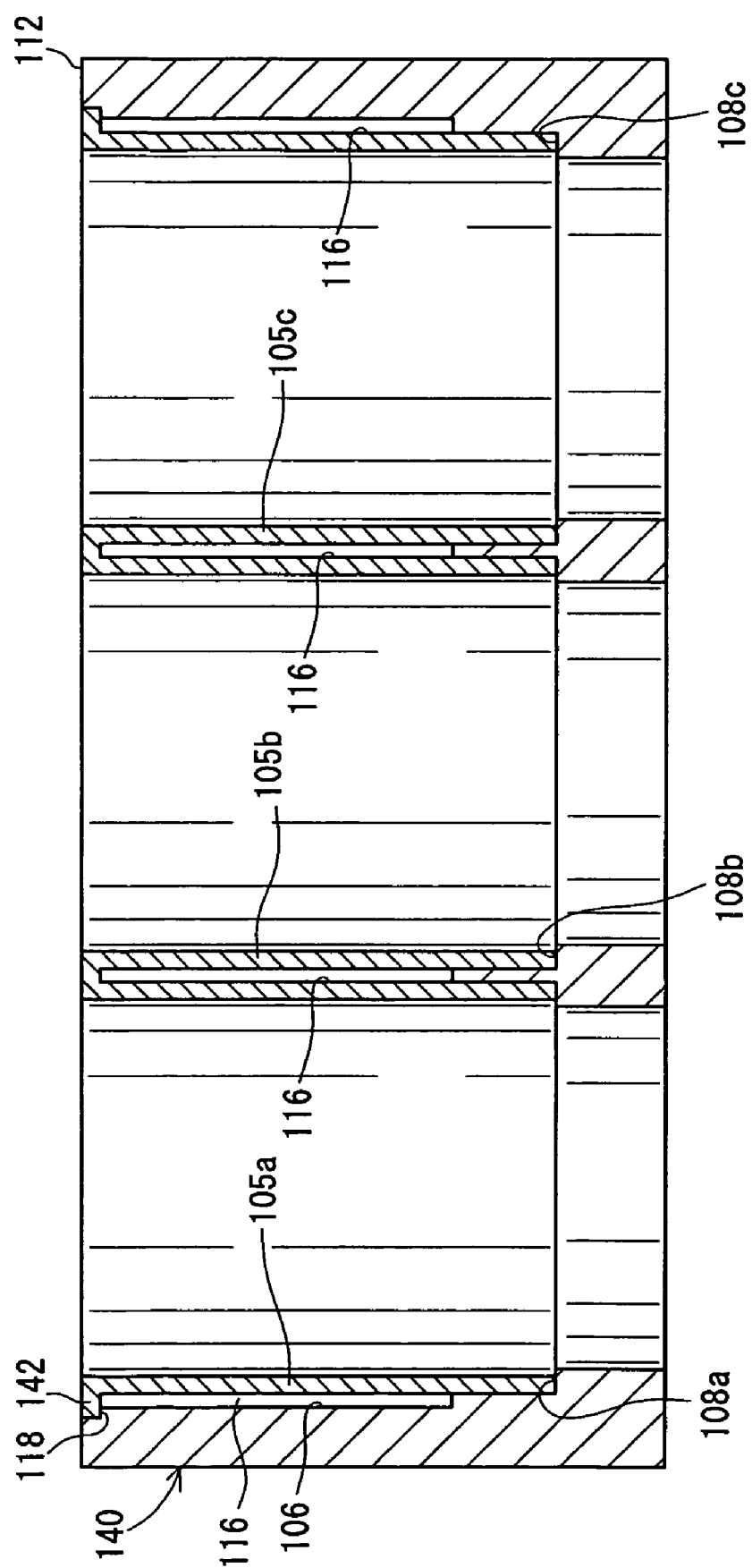
FIG. 37 is a perspective view showing the manner in which the joined sleeve assembly shown in FIG. 36 is inserted in communication holes in a block body.

Then, as shown in FIG. 37, the joined sleeve assembly 158 is inserted into the communication hole 106 in the block body 140. The lower ends of the inserted cylinder sleeves 105a through 105c are placed respectively on the annular steps 108a through 108c, and the closure member 142 is placed in a recess 118 defined in the gasket surface 112 of the block body 140.

As the joined sleeve assembly 158 is inserted into the communication hole 106, a clearance is created between the inner circumferential walls of a second annular recess 120 and the cylinder sleeves 105a through 105c. This clearance communicates with a clearance created between the cylinder sleeves 105a, 105b and a clearance created between the cylinder sleeves 105b, 105c, providing a water jacket 116.

Then, the closure member 142 and the gasket surface 112 of the block body 140 are friction-stir-welded. Specifically, the rotor 52 of the friction stir welding tool 50 (see FIG. 39) is rotated, and the rotating probe 54 is embedded in the block body 140 at any desired position thereon.

Figure 38:
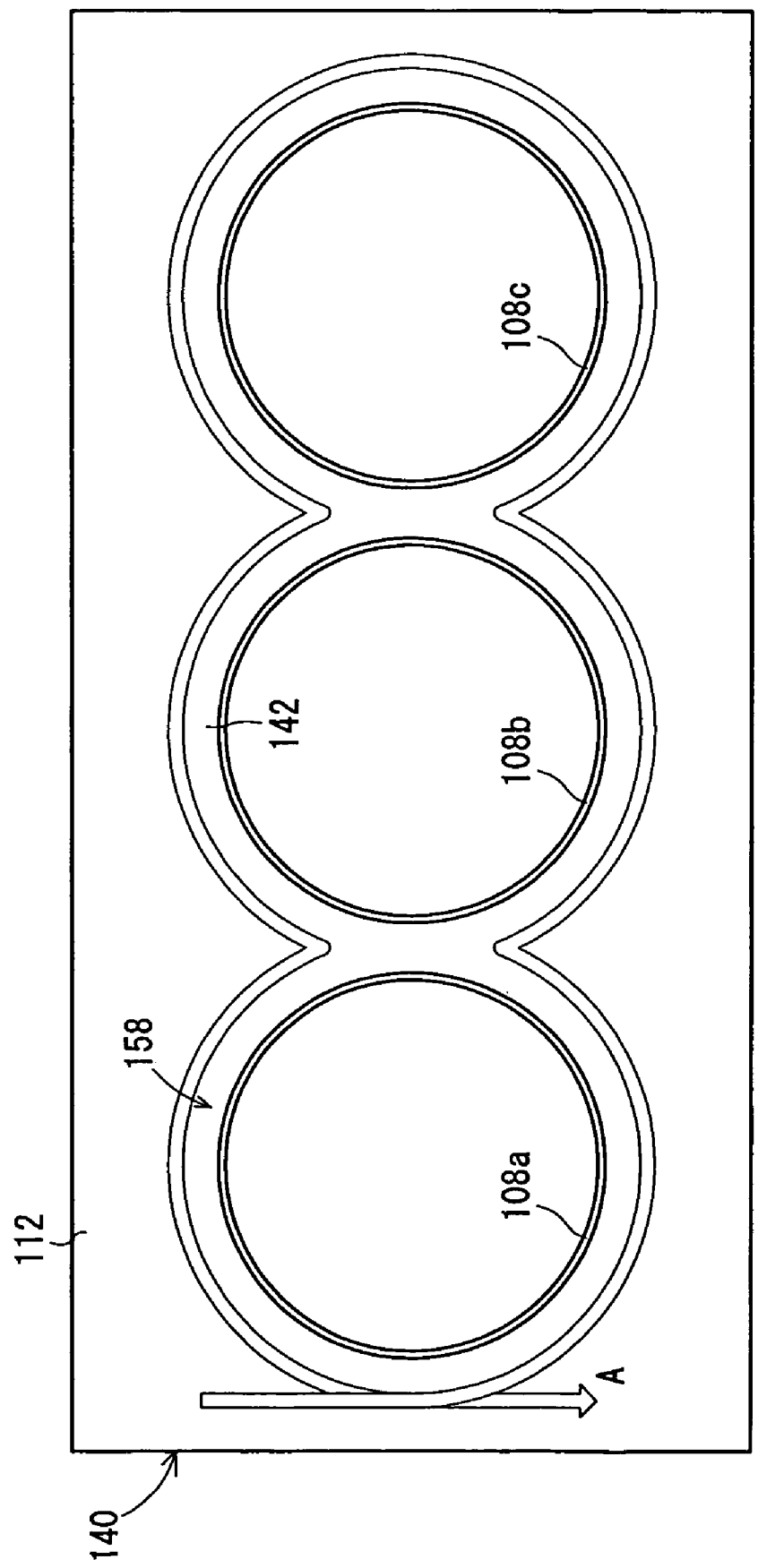
FIG. 38 is a plan view of a block body as viewed from a gasket surface, showing the direction in which a friction stir welding tool is displaced to join an outer edge of the closure member to the block body.

Then, the probe 54 is displaced along the abutting region of the closure member 142 and the block body 140 in the direction indicated by the arrow A in FIG. 38. When the probe 54 is thus displaced, the material of the outer circumferential edge of the closure member 142 and the material of the gasket surface 112 of the block body 140 are softened by frictional heat, and stirred by the probe 54. As a result, these materials are joined in a solid state.

Figure 39:
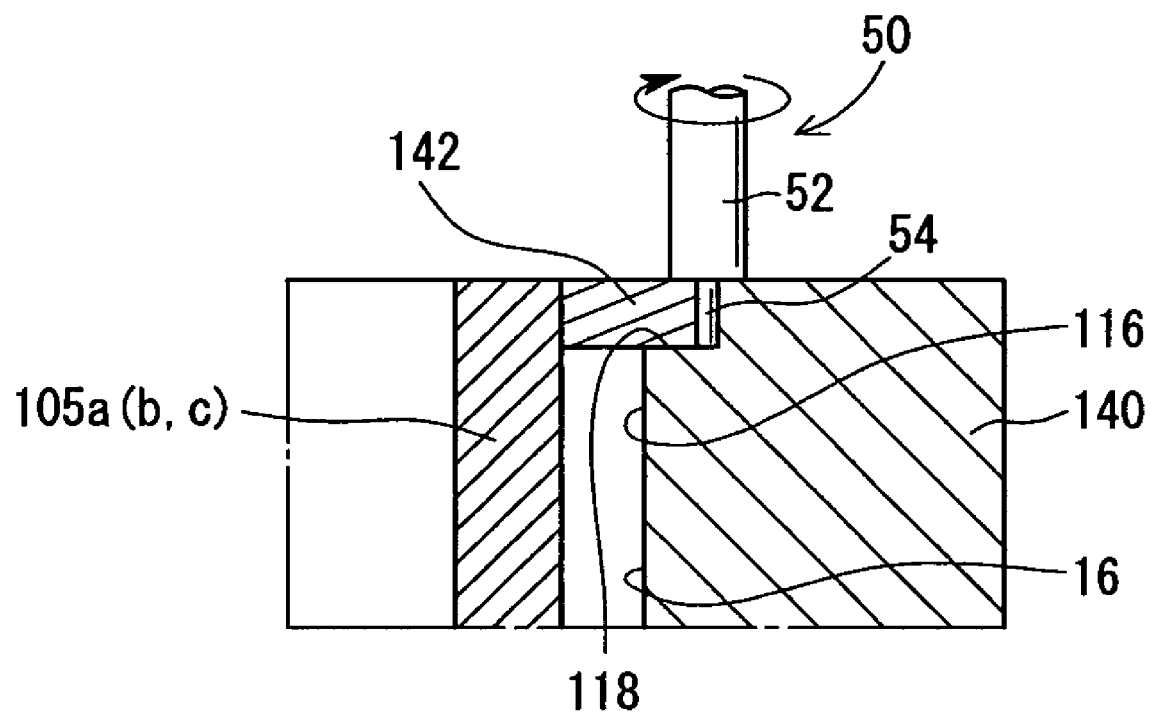
FIG. 39 is an enlarged fragmentary vertical cross-sectional view showing the manner in which the closure member and the block body are friction-stir-welded.

At this time, as shown at an enlarged scale in FIG. 39, since the closure member 142 is rigidly supported by being placed in the recess 118, the closure member 142 is not easily separated from the block body 140. As with the first embodiment, the friction stir welding process can easily be performed without the need for a clamping jig for preventing the block body 140 and the closure member 142 from being separated from each other. Furthermore, since the closure member 142 closes the water jacket 116, the softened material is prevented from flowing into the water jacket 116.

The cylinder sleeves 105a through 105c and the block body 140 are joined to each other through the closure member 142 by the above operation.

Finally, a removal hole that is formed in the gasket surface 112 when the probe 54 is removed is enlarged in diameter and thereafter finished into a stud bolt hole having a predetermined dimensional accuracy.

A closed-deck cylinder block is now produced in which the end of the water jacket 116 at the gasket surface 112 is closed by the closure member 142 placed in the recess 118.

As described above, after the closure member 142 is joined to the cylinder sleeves 105a through 105c using the jig 150, the cylinder sleeves 105a through 105c are inserted into the communication hole 106 in the block body 140, and the closure member 142 is joined to the block body 140, thereby closing the water jacket 116 that is provided between the block body 140 and the cylinder sleeves 105a through 105c.

Specifically, even with the water jacket 116 provided between the block body 140 and the cylinder sleeves 105a through 105c, the block body 140 and the cylinder sleeves 105a through 105c can be joined by friction stir welding through the closure member 142. Consequently, it is possible to produce a closed-deck cylinder block which has a small wall thickness and lightweight.

Figure 40:
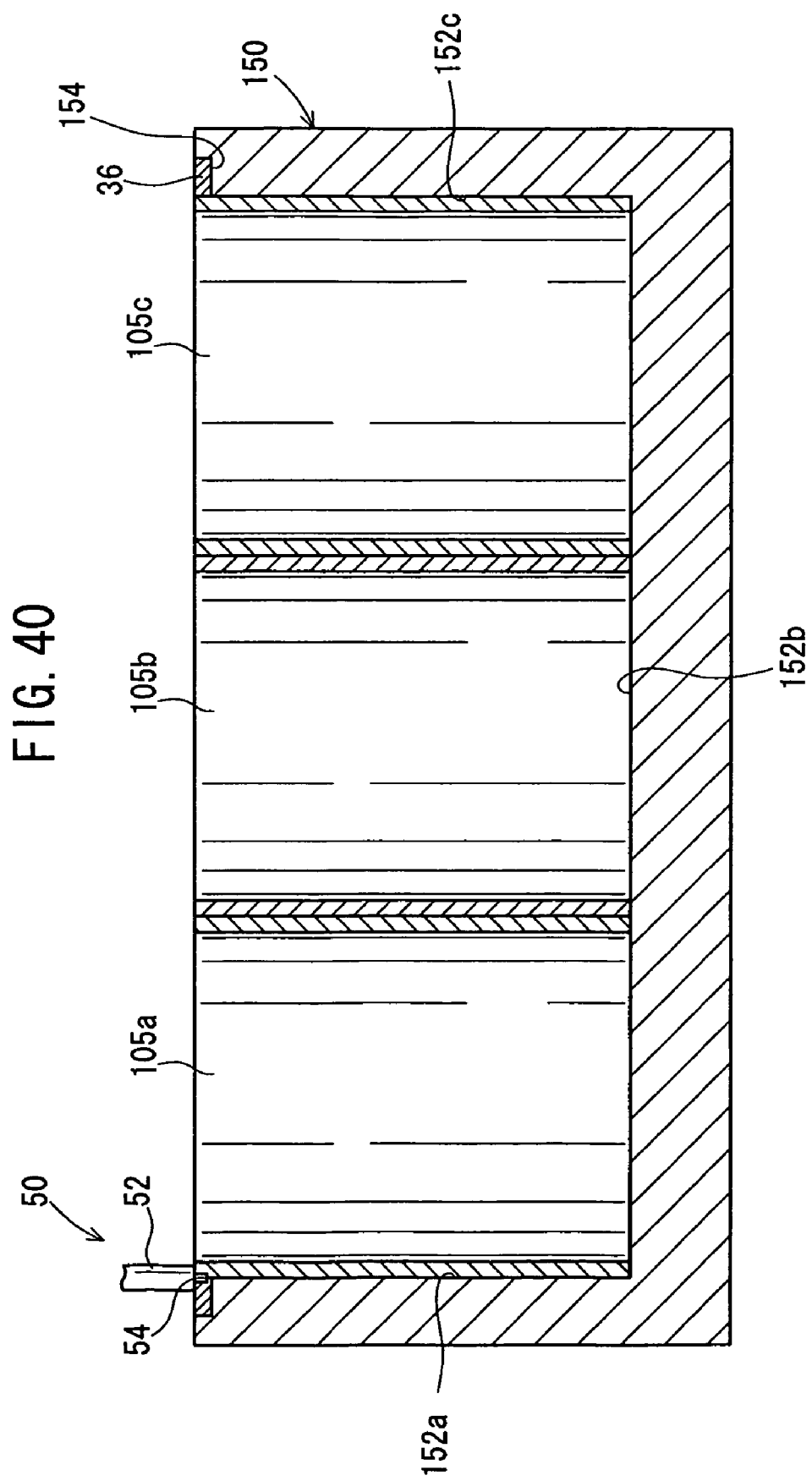
FIG. 40 is a vertical cross-sectional view showing the manner in which cylinder sleeves and a closure member are friction-stir-welded using the jig shown in FIG. 5 to manufacture a cylinder block having another shape.

It is not necessary to provide a clearance between the cylinder sleeves 105a, 105b and a clearance between the cylinder sleeves 105b, 105c. As shown in FIG. 40, for example, the first insertion units 152a through 152c of the jig 150 are held in communication with each other, predetermined regions of the outer circumferential walls of the cylinder sleeves 105a through 105c may be linearly cut away and joined together, and the cylinder sleeves 105a through 105c may be inserted into the first insertion units 152a through 152c of the jig 150 that are held in communication with each other. Thereafter, the closure member 142 and the cylinder sleeves 105a through 105c may be joined by friction stir welding, after which the outer circumferential edge of the closure member 142 and the gasket surface 112 of the block body 140 may be joined by friction stir welding in the manner described above. In this case, the water jacket 116 is formed only between the joined sleeve assembly 158 and the block body 140.

Figure 41:
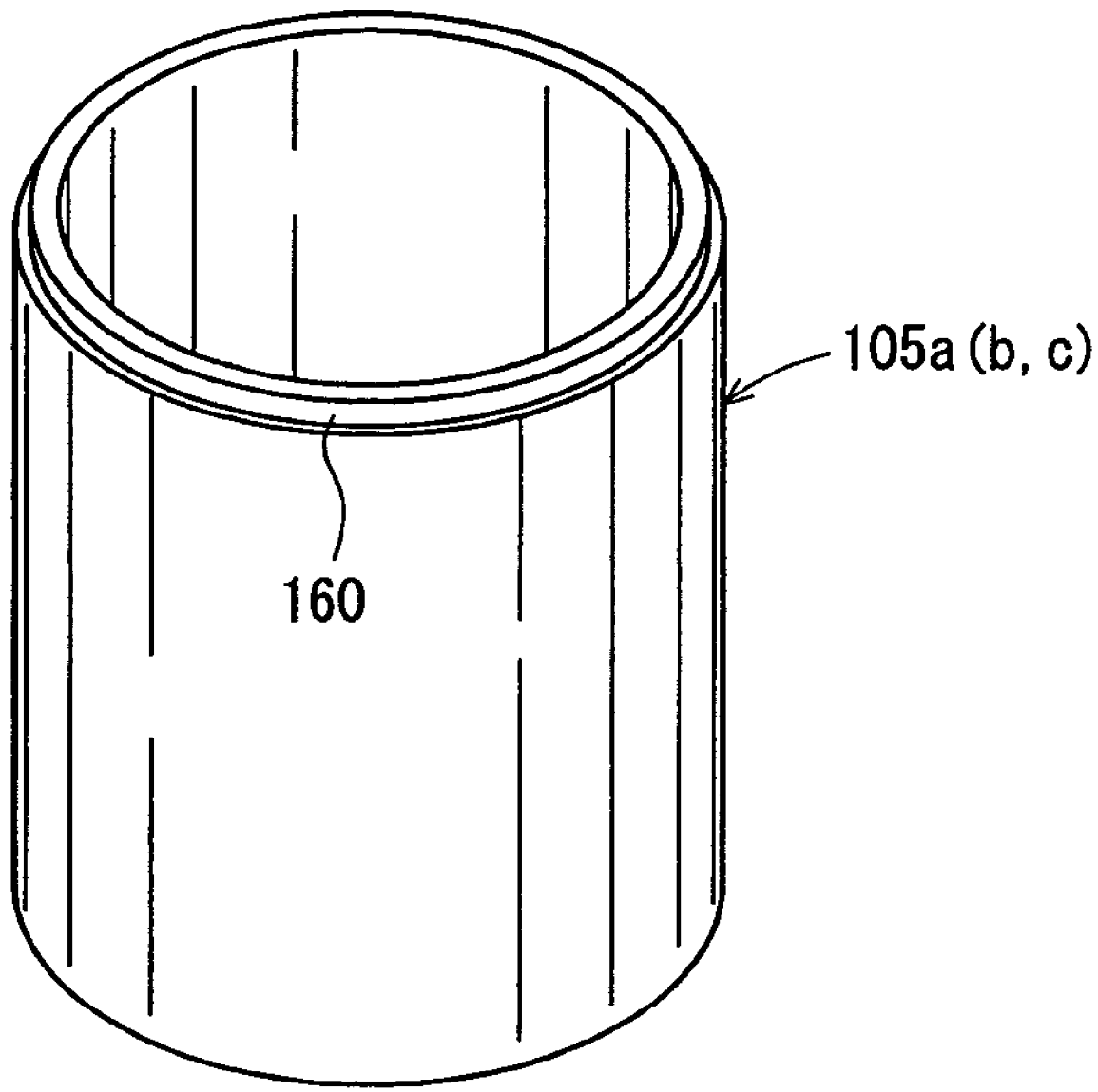
FIG. 41 is a perspective view of a cylinder sleeve on which the friction stir welding method according to the second embodiment of the present invention is performed.
Figure 42:
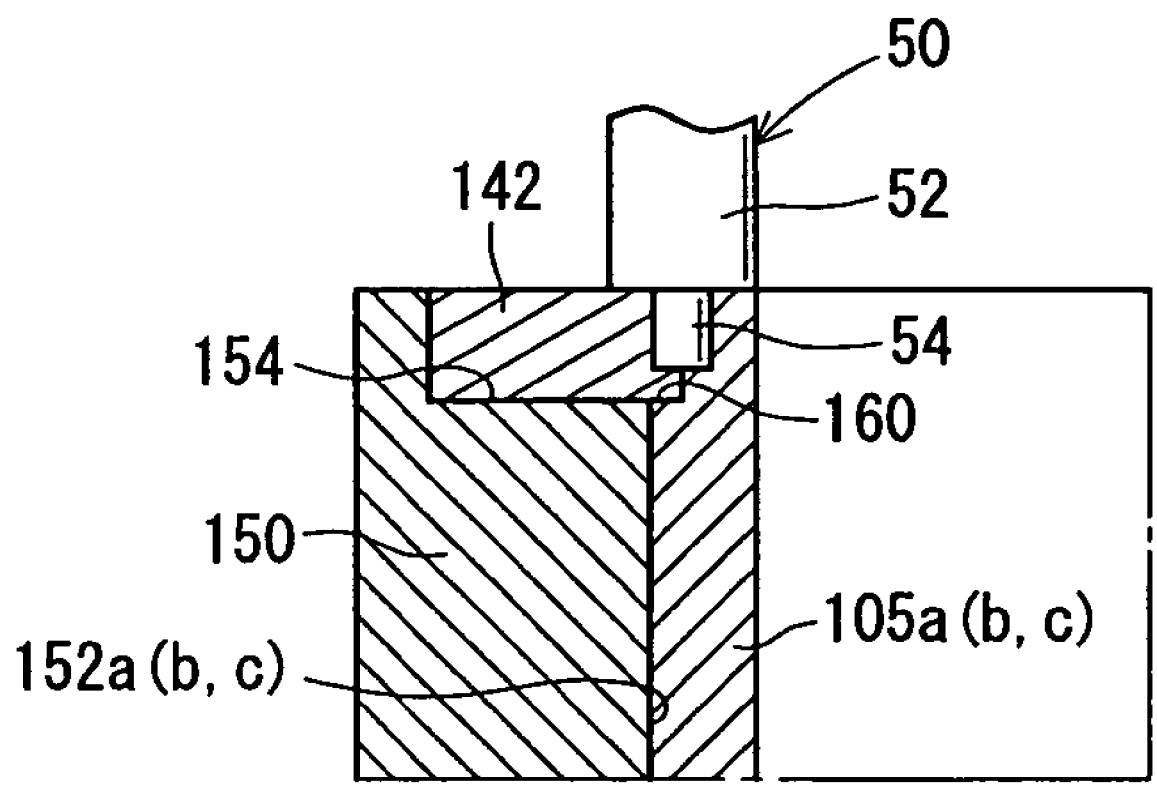
FIG. 42 is an enlarged fragmentary vertical cross-sectional view showing the manner in which the cylinder sleeve and the closure member are joined by friction stir welding, using the jig shown in FIG. 34.

Alternatively, as shown in FIG. 41, the upper ends of the outer circumferential walls of the cylinder sleeves 105a through 105c may be cut away circumferentially, providing a support step 160. As shown in FIG. 42, the closure member 142 may be placed on the support steps 160 of the cylinder sleeves 105a through 105c inserted in the first insertion units 152a through 152c and the second insertion unit 154 of the jig 150, and the cylinder sleeves 105a through 105c and the closure member 142 may be friction-stir-welded. In this case, inasmuch as the closure member 142 is rigidly supported by the support steps 160, the cylinder sleeves 105a through 105c and the closure member 142 can reliably be joined to each other.

Figure 43:
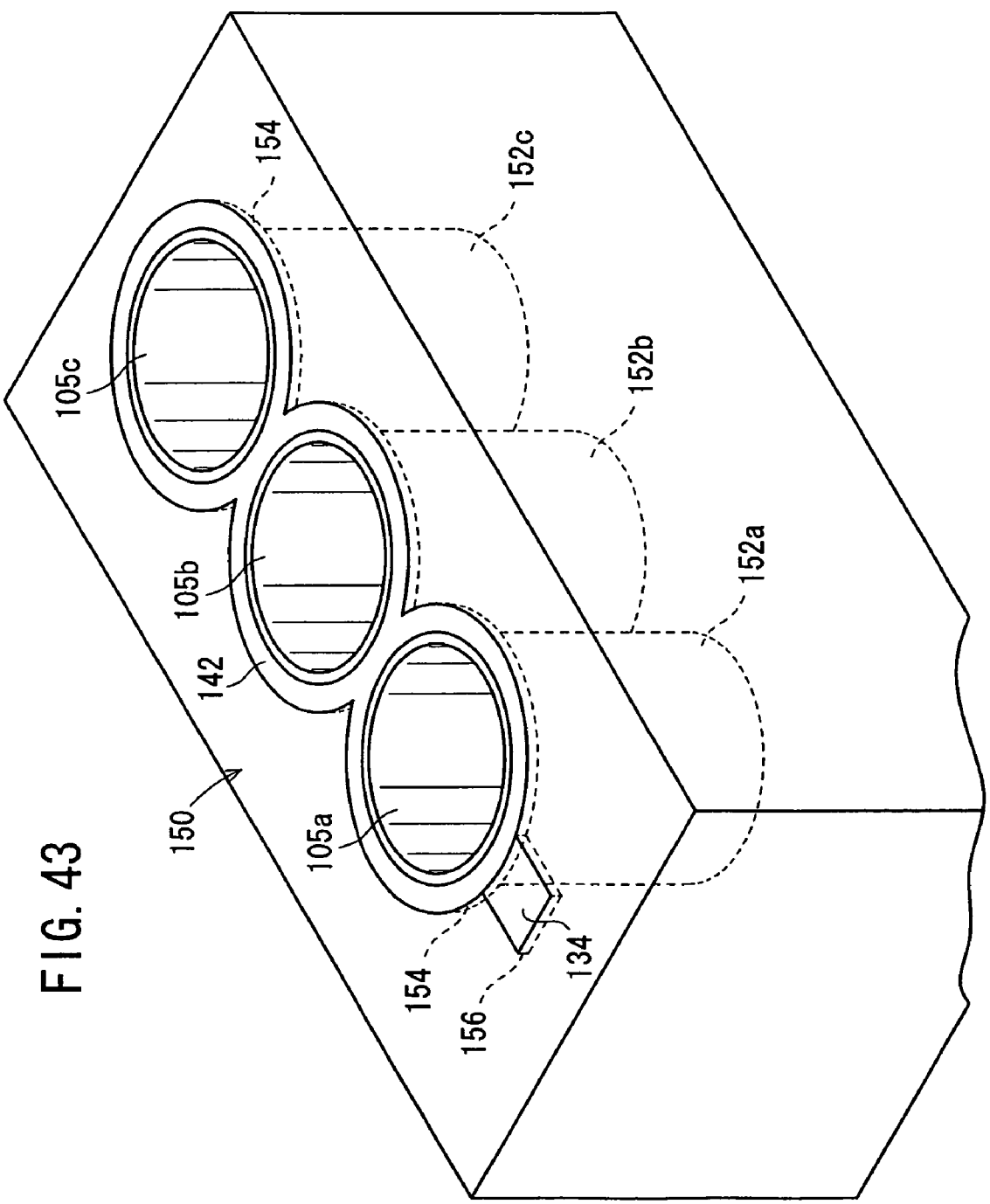
FIG. 43 is a perspective view of a jig having a friction stir welding tool removal member.

If the jig 150 is used, then the jig 150 may have a third insertion unit 156 as shown in FIG. 43. The third insertion unit 156 projects from an outer circumferential edge of the second insertion unit 154, and a friction stir welding tool removal member 134 for removing the probe 54 of the friction stir welding tool 50 is inserted in the third insertion unit 156.

Figure 44:
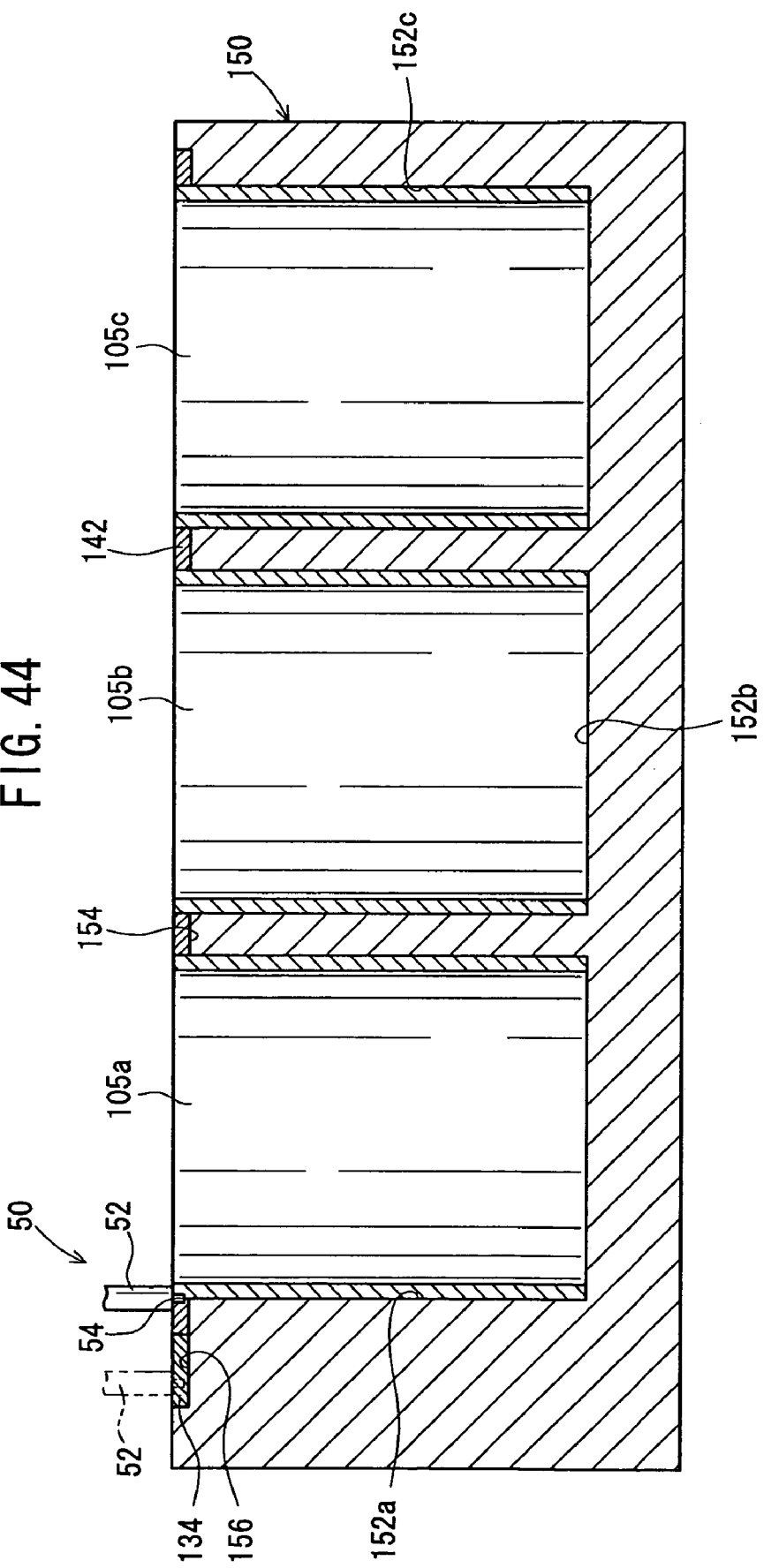
FIG. 44 is a vertical cross-sectional view showing the manner in which the cylinder sleeve and the closure member are joined by friction stir welding, using the jig shown in FIG. 43.

The friction stir welding tool removal member 134 is inserted in the third insertion unit 156 in advance. Then, as shown in FIGS. 43 and 44, the cylinder sleeves 105a through 105c are inserted respectively into the first insertion units 152a through 152c, after which the closure member 142 is inserted into the second insertion unit 154. Then, the cylinder sleeves 105a through 105c and the closure member 142 (see FIG. 33) are joined by the friction stir welding tool 50 in the same manner as described above.

After the closure member 142 and the cylinder sleeves 105a through 105c have been joined, the friction stir welding tool 50 is moved from the abutting region toward the friction stir welding tool removal member 134, as indicated by the broken lines in FIG. 44. After the probe 54 is removed, the friction stir welding tool removal member 134 is removed, producing a joined sleeve assembly 158 as cylinder sleeves for a closed-deck cylinder block in the same manner as shown in FIG. 36. The joined sleeve assembly 158 is free of a removal hole from which the probe 54 would be removed. Therefore, the joined sleeve assembly 158 exhibits excellent rigidity.

Subsequently, the same operation as described above is performed. Now, a closed-deck cylinder block is produced in which the end of the water jacket 116 at the gasket surface 112 is closed by the closure member 142 placed in the recess 118 (see FIG. 37).

Figure 45:
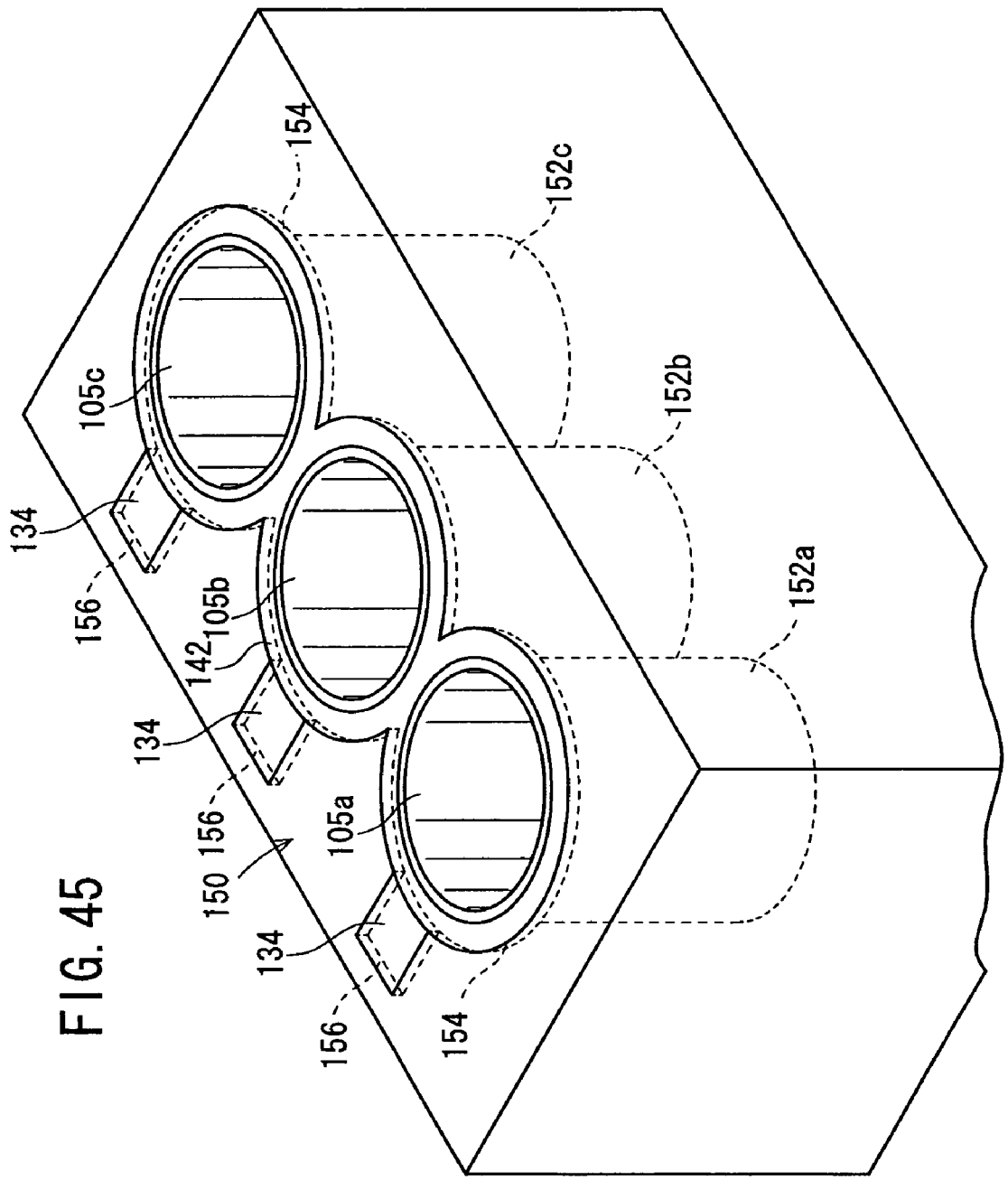
FIG. 45 is a perspective view of a jig having a plurality of friction stir welding tool removal members.

As shown in FIG. 45, the jig 150 may have a plurality of third insertion units 156, and friction stir welding tool removal members 134 may be inserted respectively in the third insertion units 156. Since the probe 54 can be removed from an increased number of locations, it is easy to perform the friction stir welding process. As can be seen from FIGS. 43 and 45, the friction stir welding tool removal members 134 are not limited to any particular locations.

An embodiment in which the block body 140 and the cylinder sleeves 105a through 105c are joined to each other through the closure member 142 without using the jig 150 will be described below.

In this case, support steps 160 are provided on the upper ends of the outer circumferential walls of the cylinder sleeves 105a through 105c (see FIG. 41). Then, the cylinder sleeves 105a through 105c are inserted into the communication hole 106 in the block body 140 so as to expose the support steps 160.

Figure 46:
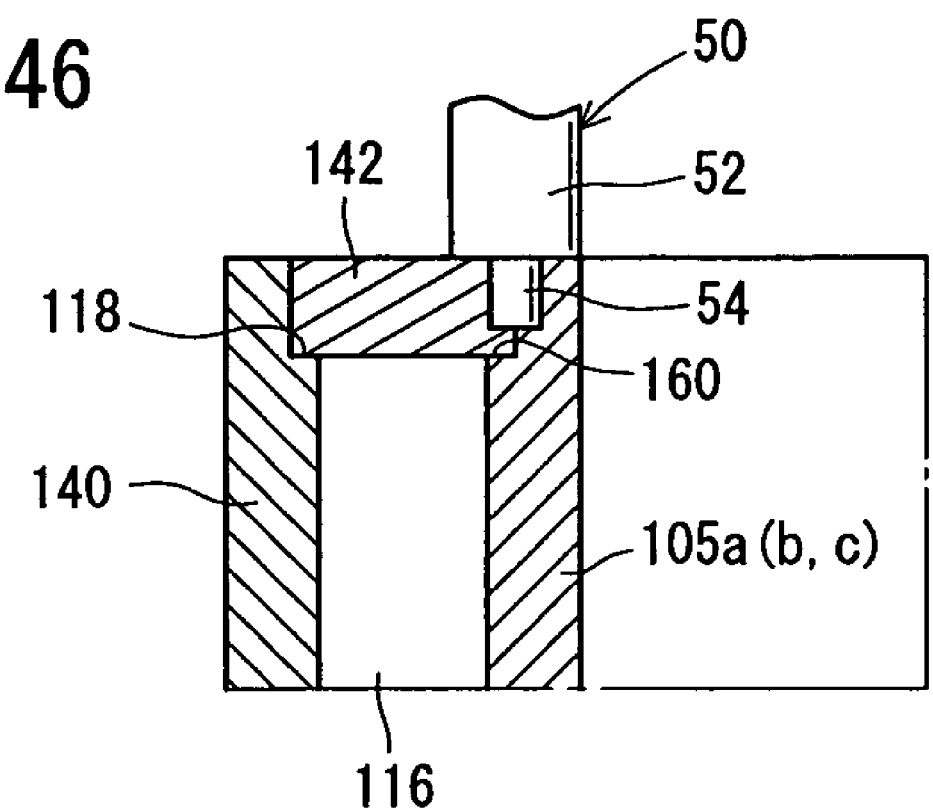
FIG. 46 is an enlarged fragmentary vertical cross-sectional view showing the manner in which a cylinder sleeve and a closure member are friction-stir-welded.

Then, as shown at an enlarged scale in FIG. 46, the closure member 142 is placed in the recess 118 in the block body 140 and on the support steps 160.

When the inner circumferential edge of the closure member 142 and the upper end faces of the cylinder sleeves 105a through 105c, and the outer circumferential edge of the closure member 142 and the gasket surface 112 of the block body 140 are joined by the friction stir welding tool 50, a closed-deck cylinder block is produced. Since it is not necessary to use the jig 150, the closed-deck cylinder block is produced easily.

Figure 47:
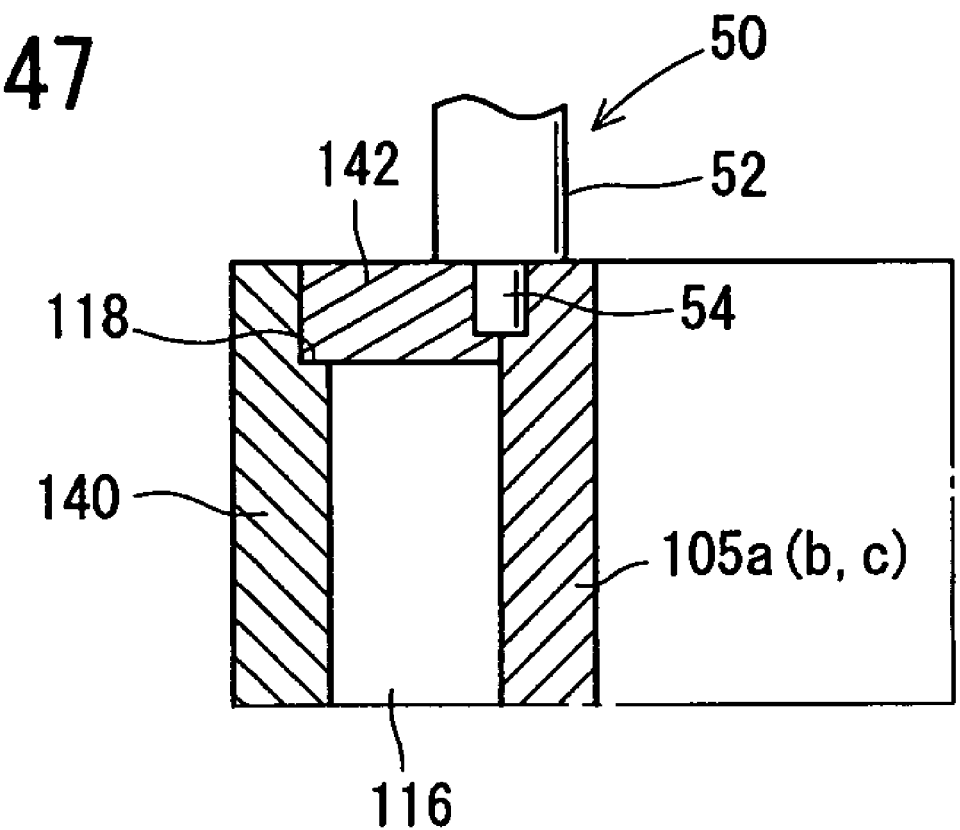
FIG. 47 is an enlarged fragmentary vertical cross-sectional view showing the manner in which a cylinder sleeve and a closure member are friction-stir-welded.
Figure 48:
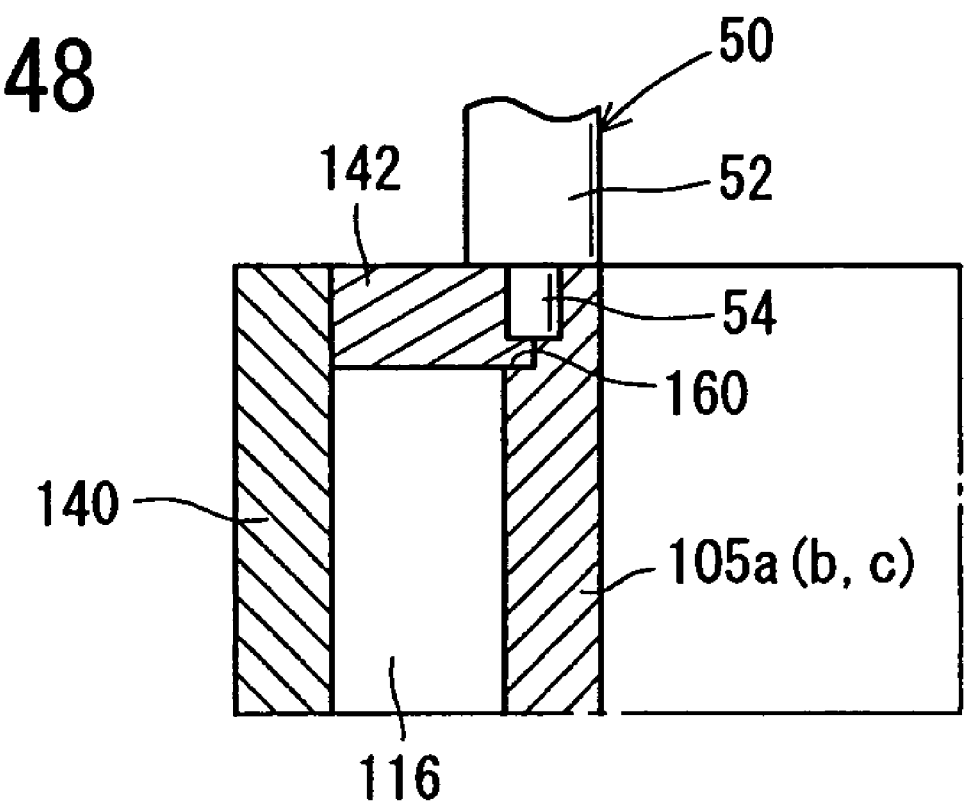
FIG. 48 is an enlarged fragmentary vertical cross-sectional view showing the manner in which a cylinder sleeve and a closure member are friction-stir-welded.

At least one of the recess 118 and the support steps 160 may be present. For example, as shown in FIG. 47, the support steps 160 may not be provided on the upper ends of the cylinder sleeves 105a through 105c, and the closure member 142 may be placed only in the recess 118, when the friction stir welding process is performed. Alternatively, as shown in FIG. 48, the recess 118 may not be provided in the block body 140, and the closure member 142 may be placed only on the support steps 160 provided on the upper ends of the cylinder sleeves 105a through 105c, when the friction stir welding process is performed.

The inner circumferential edge of the closure member 142 and the upper end faces of the cylinder sleeves 105a through 105c may be friction-stir-welded first, or the outer circumferential edge of the closure member 142 and the gasket surface 112 of the block body 140 may be friction-stir-welded first.

Figure 49:
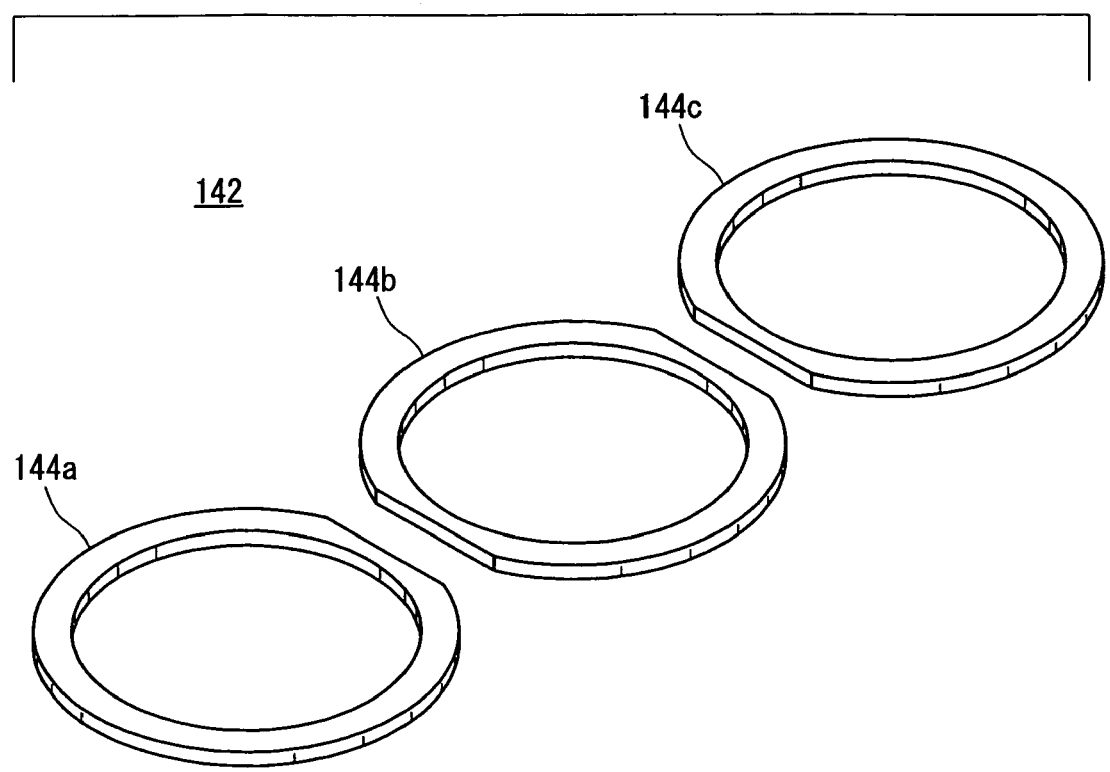
FIG. 49 is a perspective view of a closure member comprising three annular members.

As shown in FIG. 49, the closure member 142 may be produced by forming three annular members 72a through 72c individually, thereafter cutting off portions of ends of the annular members 72a through 72c, placing the annular members 72a through 72c in the second insertion unit 154 and the recess 118 or on the support steps 160, and then joining the ends of the annular members 72a through 72c by friction stir welding. Of course, the cut-off ends of the annular members 72a through 72c may be joined in advance to produce the closure member 142.

Figure 50:
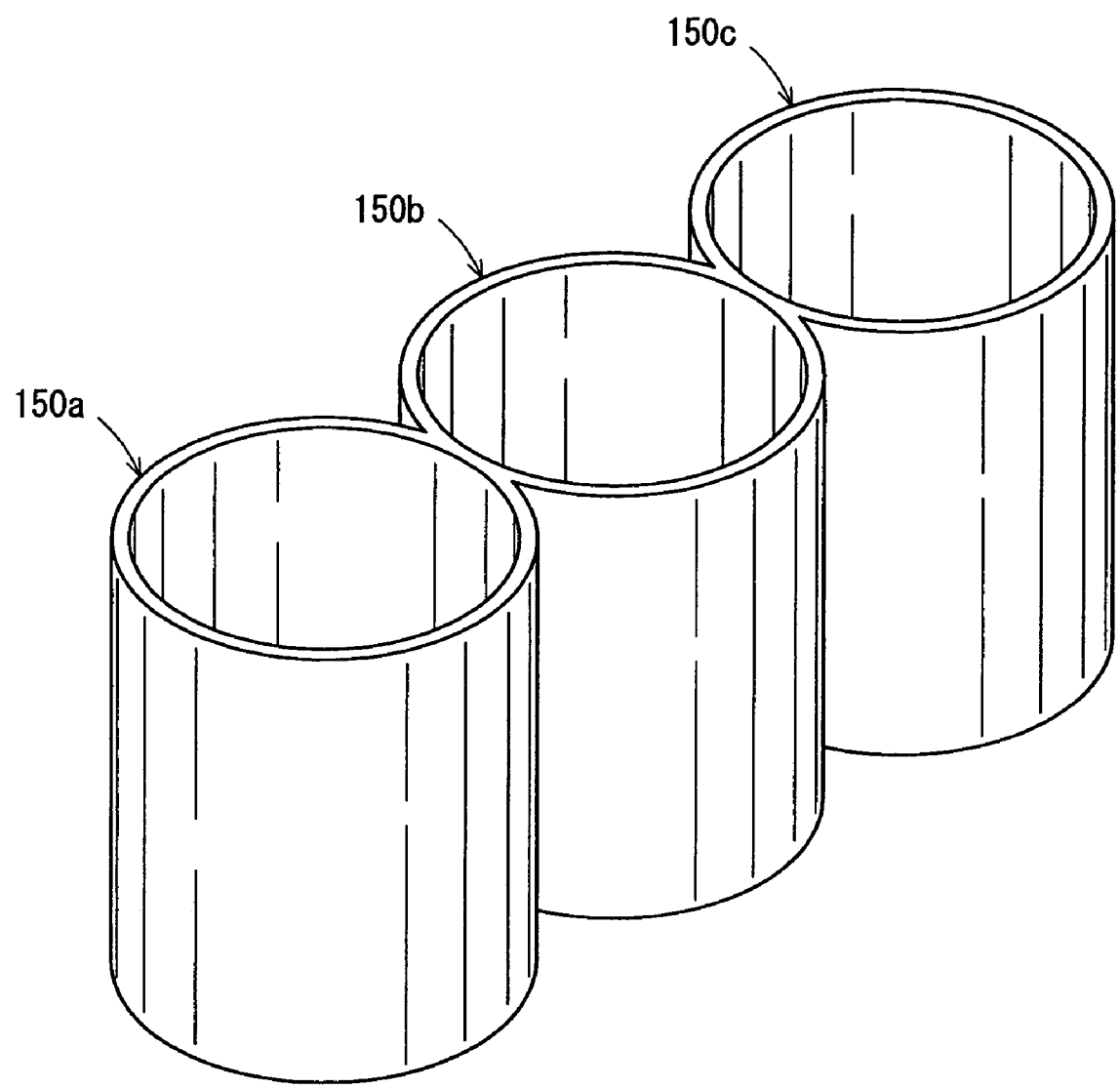
FIG. 50 is a perspective view of a linear joined assembly of three cylinder sleeves.

As shown in FIG. 50, the cylinder sleeves 105a through 105c may be joined linearly. In this case, the closure member 142 shown in FIG. 33 or the closure member 142 made up of the joined annular members 144a through 144c shown in FIG. 49 may be employed.

Cylinder sleeves having hollow cylindrical shapes may be joined to a block body as follows.

Figure 51:
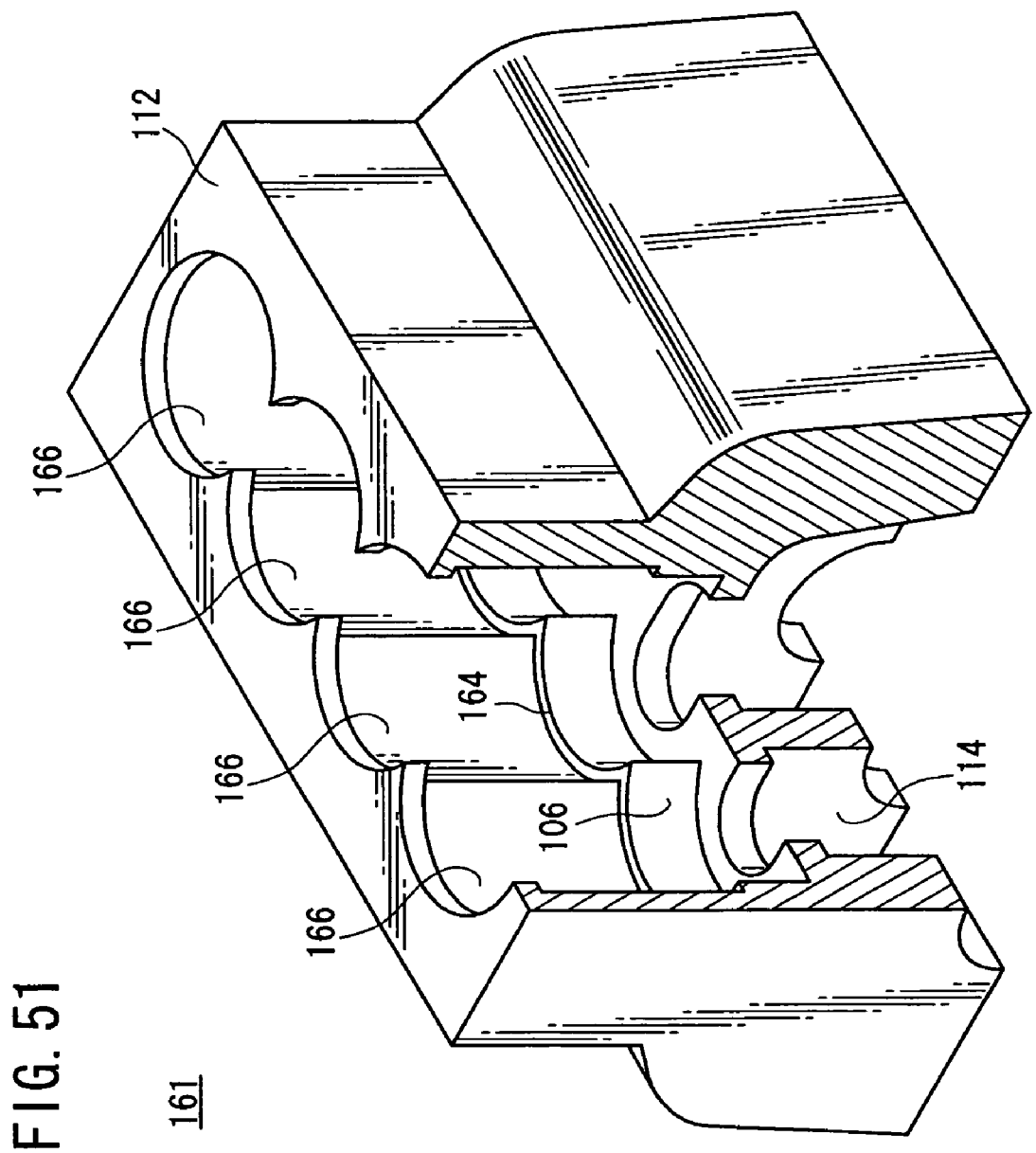
FIG. 51 is a perspective view of a block body of a closed-deck cylinder block.

A block body 161, which is shown in partly cut away perspective in FIG. 51, is manufactured by HPDC using molten aluminum.

Figure 52:
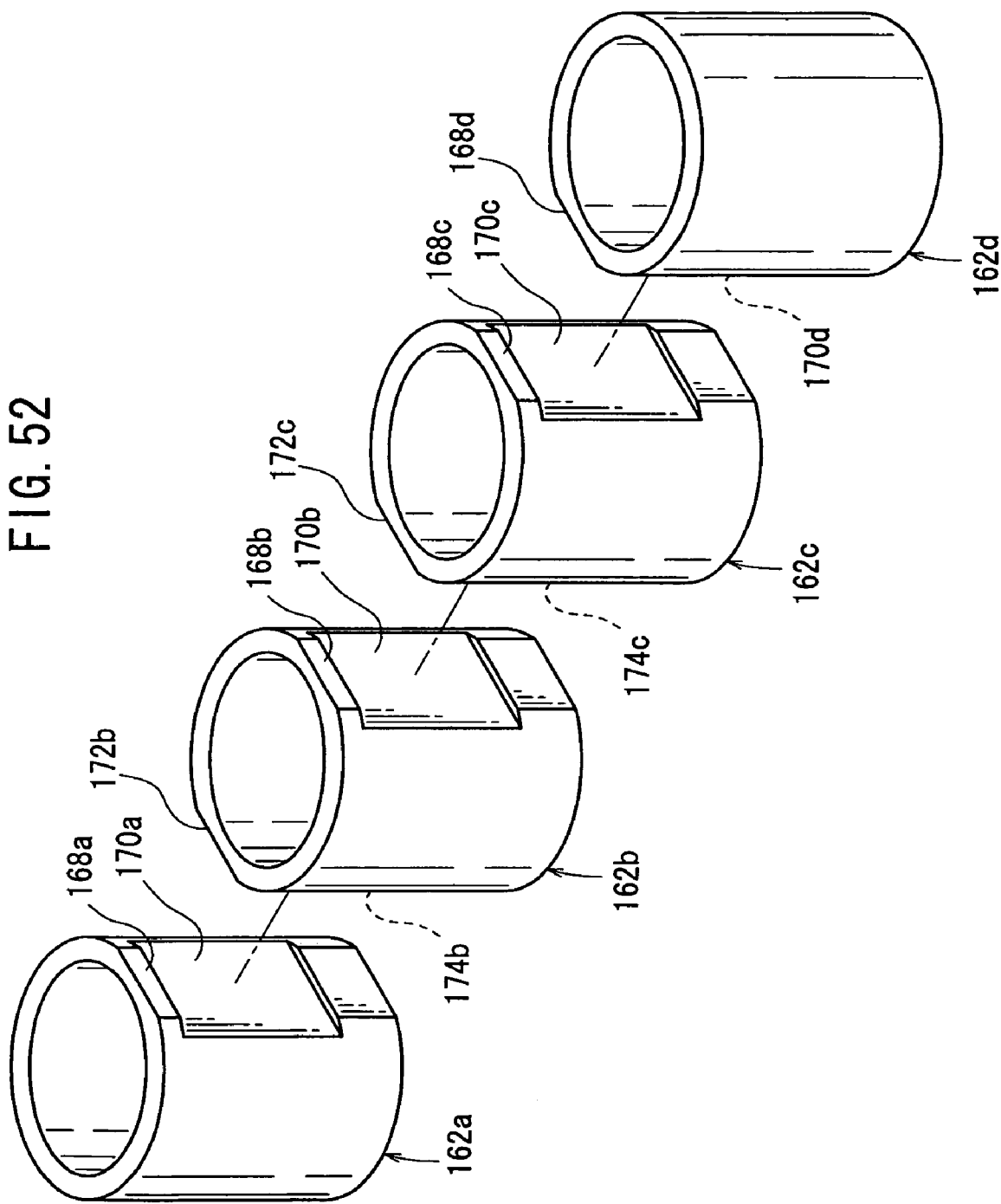
FIG. 52 is a perspective view of cylinder sleeves of the closed-deck cylinder block.

As can be seen from FIG. 51, the block body 161 has a communication hole 106 for inserting therein cylinder sleeves 162a through 162c shown in FIG. 52, with a joined annular step 164 disposed in a lower portion of the communication hole 106. The communication hole 106 has diametrally dented steps 166. The communication hole 106 and the step 166 are disposed concentrically with each other. In FIG. 51, reference characters 112, 114 represent a gasket surface and a journal, respectively.

The steps 166 may be produced simultaneously with the communication hole 106 by the HPDC process. Alternatively, after the communication hole 106 is produced by the HPDC process, the steps 166 may be produced by cutting off portions of the inner circumferential walls of the communication hole 106.

The cylinder sleeves 162a through 162d shown in FIG. 52 are manufactured. Each of the cylinder sleeves 162a and 162d may be manufactured by producing a hollow cylindrical body from a workpiece of high-silicon-based aluminum by a known process such as an extrusion molding process, a casting process, or the like, and then cutting off a portion of the circumferential side wall of the hollow cylindrical body to form flat surfaces 168a, 168d.

Then, recesses 170a, 170d that are dented diametrally of the cylinder sleeves 162a, 162d are formed in the flat surfaces 168a, 168d.

The remaining cylinder sleeves 162b, 162c are produced as follows. After flat surfaces 168b, 168c, which are the same as the flat surfaces 168a, 168d of the cylinder sleeves 162a, 162d, are formed on the hollow cylindrical bodies, flat surfaces 172b, 172c are formed on the hollow cylindrical bodies at positions that are 180° spaced from the flat surfaces 168b, 168c. Recesses 170b, 170c, 174b, 174c are also formed in the flat surfaces 168b, 168c, 172b, 172c.

Figure 53:
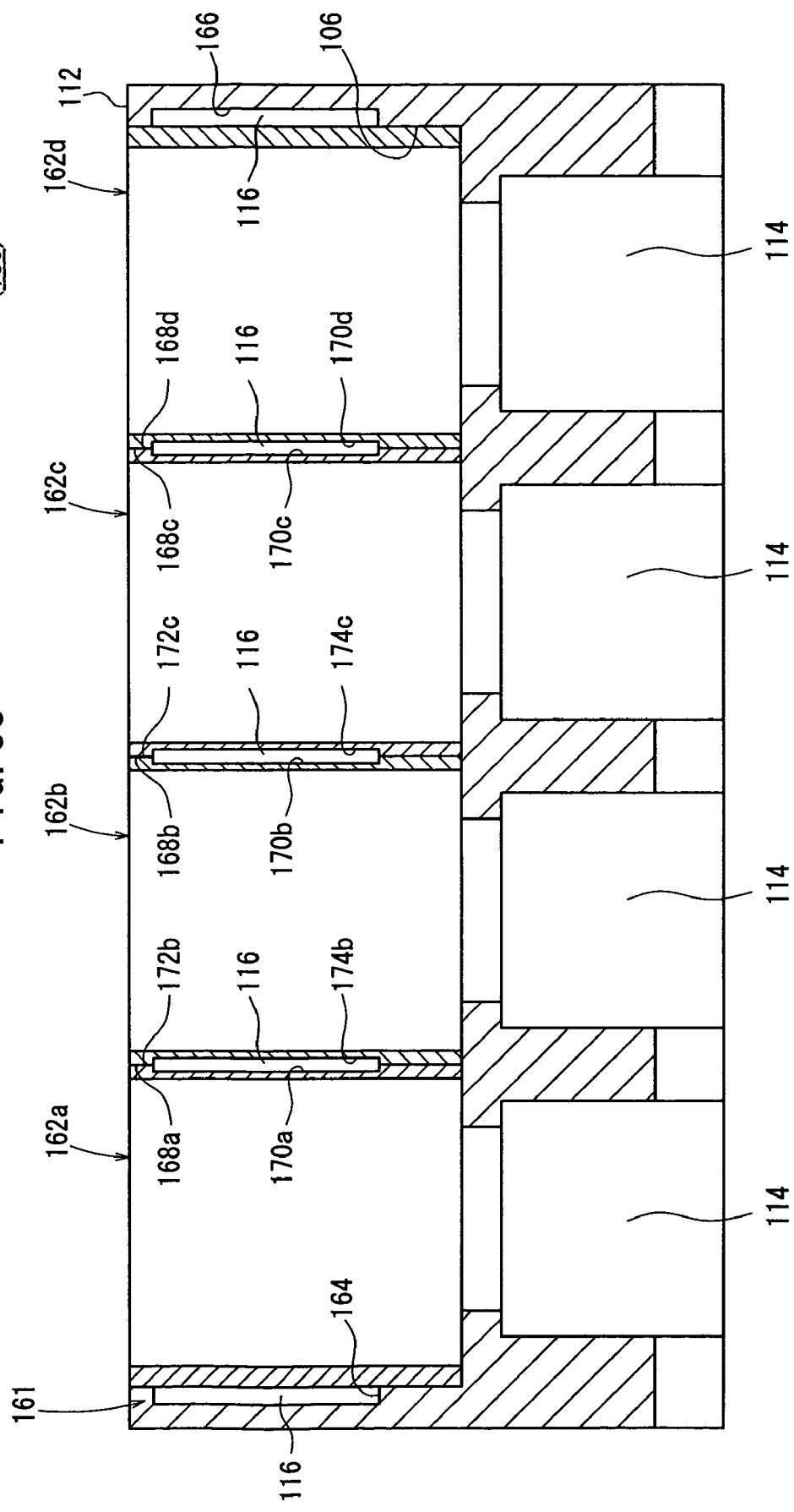
FIG. 53 is a vertical cross-sectional view of the cylinder sleeves inserted in holes in the block body.

Then, as shown in FIG. 53, the cylinder sleeves 162a through 162d are inserted into the communication hole 106 in the block body 161. The inserted cylinder sleeves 162a through 162d have respective lower ends placed on the joined annular steps 164. The cylinder sleeves 162a through 162d are now firmly supported from below.

The outer circumferential walls of the longitudinal ends of the cylinder sleeves 162a through 162d that are inserted in the communication hole 106 are held against the inner circumferential wall of the communication hole 106. The flat surface 172b of the cylinder sleeve 162b is held against the flat surface 168a of the cylinder sleeve 162a. Similarly, the flat surface 172c of the cylinder sleeve 162c is held against the flat surface 168b of the cylinder sleeve 162b, and the flat surface 168d of the cylinder sleeve 162d is held against the flat surface 168c of the cylinder sleeve 162c.

The cylinder sleeves 162a, 162d have intermediate portions whose outer circumferential walls are spaced from the steps 166, and the recesses 170a and 174b, 170b and 174c, 170c and 170d are spaced between the adjacent cylinder sleeves 162a and 162b, 162b and 162c, 162c and 162d, providing clearances that communicate with each other as a water jacket 116.

According to the present embodiment, therefore, the water jacket 116 is formed when the cylinder sleeves 162a through 162d are inserted into the communication hole 106.

Then, the block body 161 and the cylinder sleeves 162a through 162d inserted in the communication hole 106 are friction-stir-welded to integrally join these members 161, 162a through 162d. Specifically, the inner circumferential wall of the communication hole 106 and the outer circumferential walls of the cylinder sleeves 162a through 162d are friction-stir-welded to each other.

Figure 54:
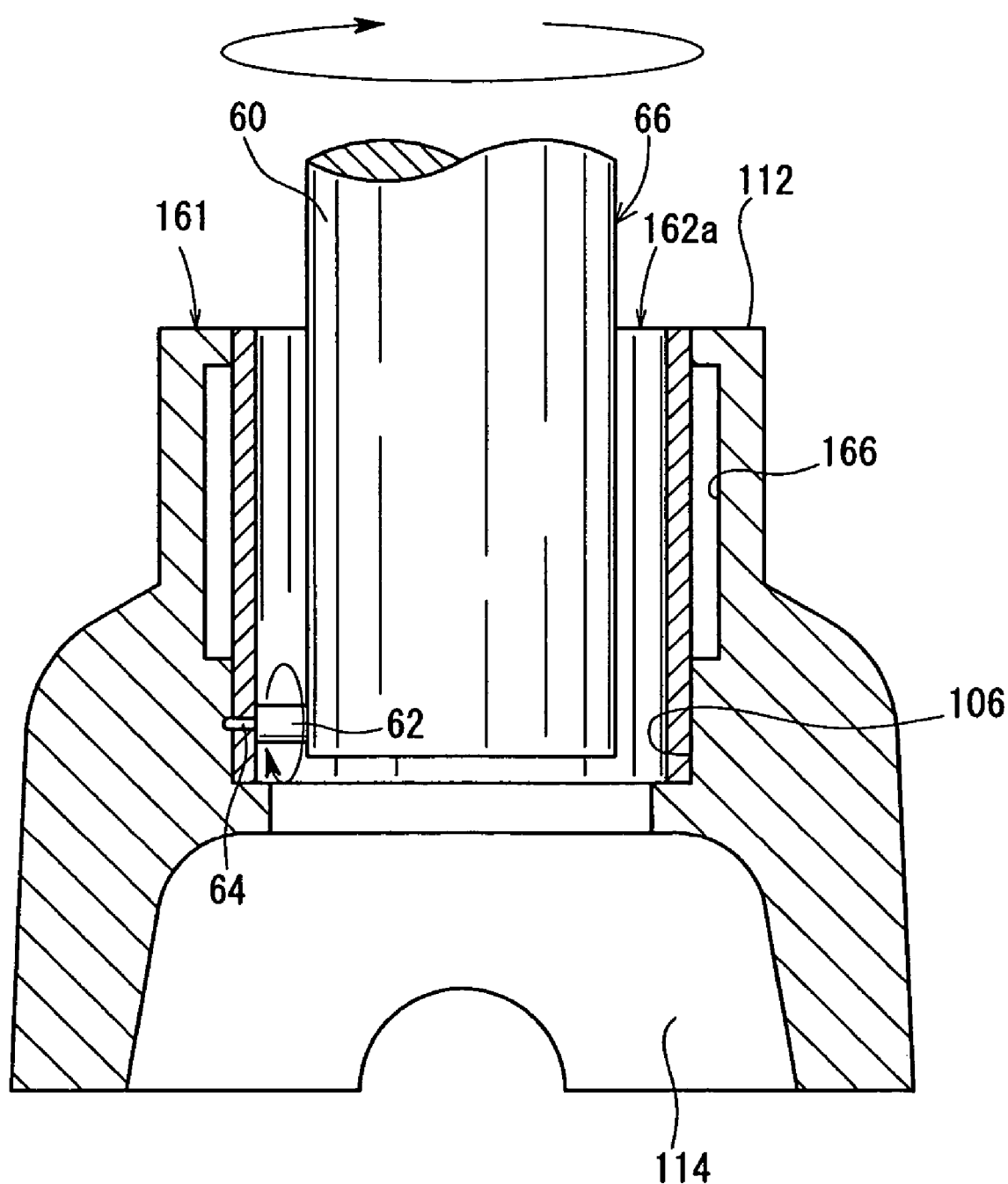
FIG. 54 is a vertical cross-sectional view showing the manner in which a probe of a friction stir welding tool which is embedded in a cylinder sleeve.

At this time, as shown in FIG. 54, a friction stir welding tool 66 is used which comprises a first rotor 60, a second rotor 62 mounted on a circumferential side wall of the first rotor 60 and rotatable independently of the first rotor 60, and a probe 64 which is smaller in diameter than the second rotor 62 and has a conical tip end. The friction stir welding tool 66 is inserted into the cylinder sleeve 162a until the probe 64 abuts against the inner circumferential wall of the cylinder sleeve 162a. At this time, the probe 64 is positioned below the water jacket 116.

Then, the second rotor 62 is rotated to embed the tip end of the probe 64 into the cylinder sleeve 162a in the same manner as described above.

The embedded probe 64 passes through the cylinder sleeve 162a and finally reaches the inner circumferential wall of the communication hole 106, whereupon the outer circumferential wall of the cylinder sleeve 162a and the inner circumferential wall of the communication hole 106 are softened by frictional heat.

Then, the first rotor 60 is rotated to displace the embedded probe 64 in the circumferential direction of the cylinder sleeve 162a. When the probe 64 is thus displaced, the softened material is stirred by the probe 64 and plastically flows. Thereafter, the softened material is joined in a solid state when the probe 64 is removed therefrom. The above phenomenon is sequentially repeated until the outer circumferential wall of the cylinder sleeve 162a and the inner circumferential wall of the communication hole 106 are integrally joined to each other. At the same time, the flat surface 168a of the cylinder sleeve 162a and the flat surface 172b of the cylinder sleeve 162b are integrally joined to each other.

At this time, as shown in FIG. 53, the cylinder sleeves 162a, 162b are rigidly supported by being placed on the joined annular steps 164. Therefore, the friction stir welding process can easily be performed.

The remaining cylinder sleeves 162b through 162d are similarly worked upon to produce a four-cylinder closed-deck cylinder block 180 (see FIG. 53) in which the adjacent cylinder sleeves 162a and 162b, 162b and 162c, 162c and 162d are joined to each other and the inner circumferential wall of the communication hole 106 in the block body 161 and the outer circumferential walls of the cylinder sleeves 162a through 162d are joined to each other. As can be seen from FIG. 53, the closed-deck cylinder block 180 has the end of the water jacket 116 at the gasket surface 112 closed.

Figure 55:
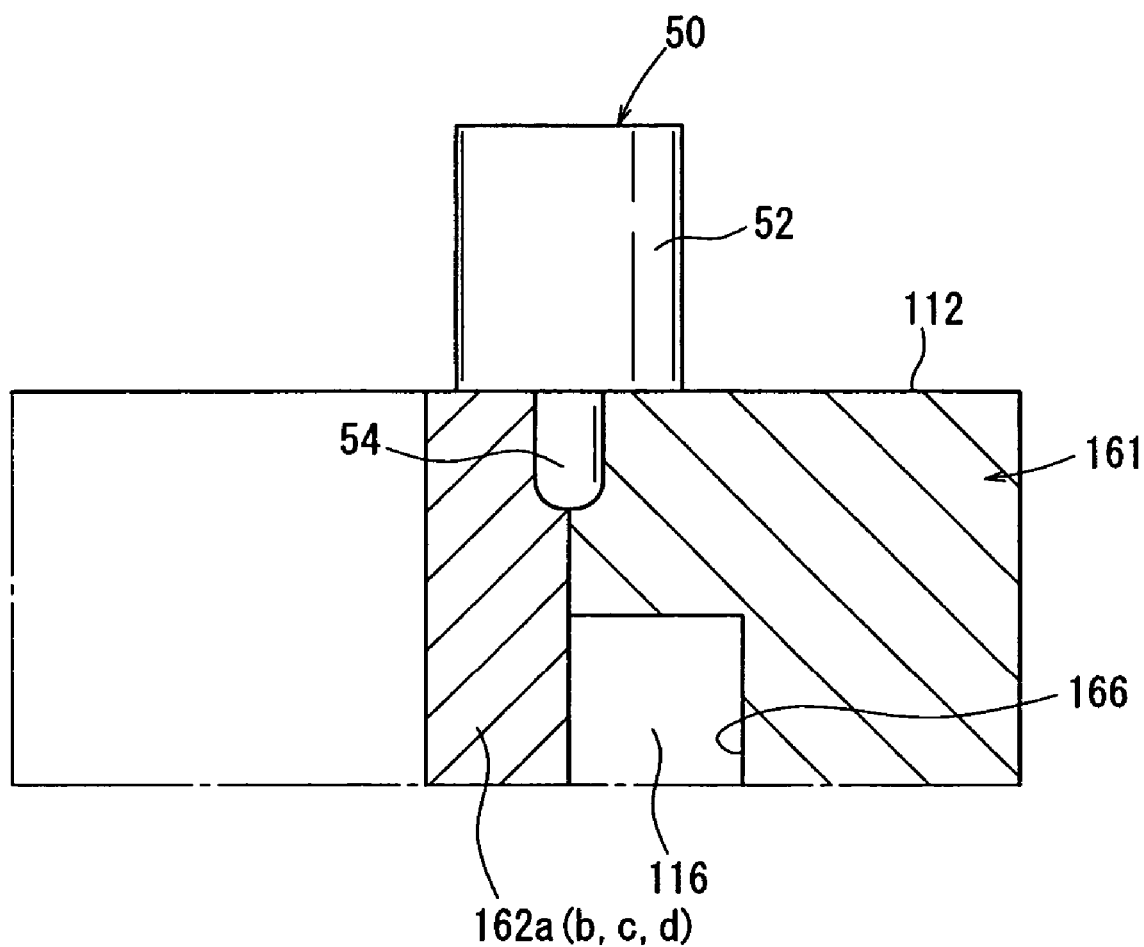
FIG. 55 is an enlarged fragmentary vertical cross-sectional view showing the manner in which a gasket surface of the block body and an end of a cylinder sleeve which is close to the gasket surface are friction-stir-welded.
Figure 56:
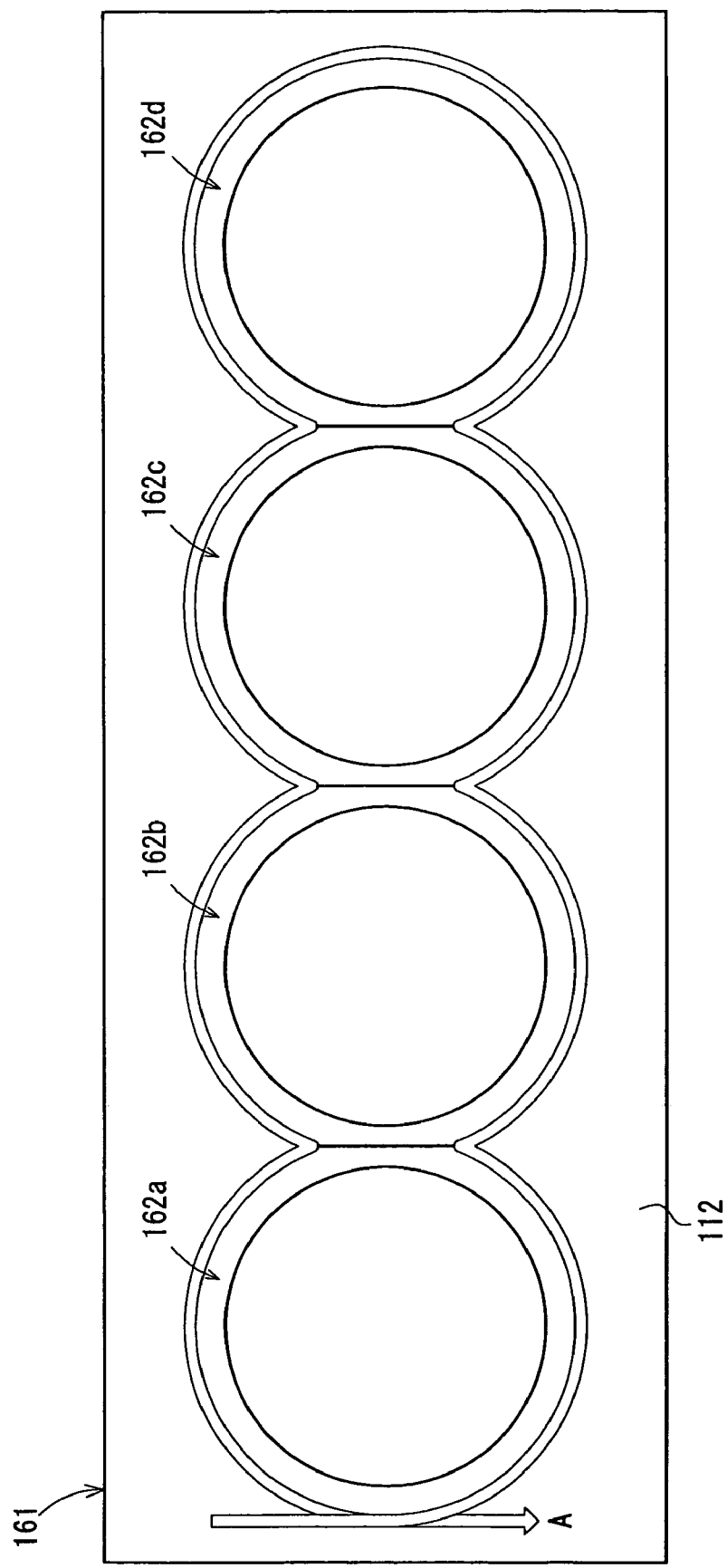
FIG. 56 is a plan view of the block body as viewed from the gasket surface, illustrating the direction in which the friction stir welding tool is displaced to join end faces of the cylinder sleeves which are close to the gasket surface to the block body (gasket surface)

The end faces of the cylinder sleeves 162a through 162d at the gasket surface 112 and the gasket surface 112 may be integrally joined by friction stir welding. At this time, as shown in FIG. 55, the friction stir welding tool 50 having the rotor 52 and the probe 54 is used, and the probe 54 is displaced along a region where the outer circumferential edges of the end faces of the cylinder sleeves 162a through 162d at the gasket surface 112 and the block body 161 abut against each other, in the direction indicated by the arrow A in FIG. 56. The material of these outer circumferential edges and the material of the gasket surface 112 of the block body 161 are softened by frictional heat, and are stirred by the probe 54. As a result, these materials are joined in a solid state.

Figure 57:
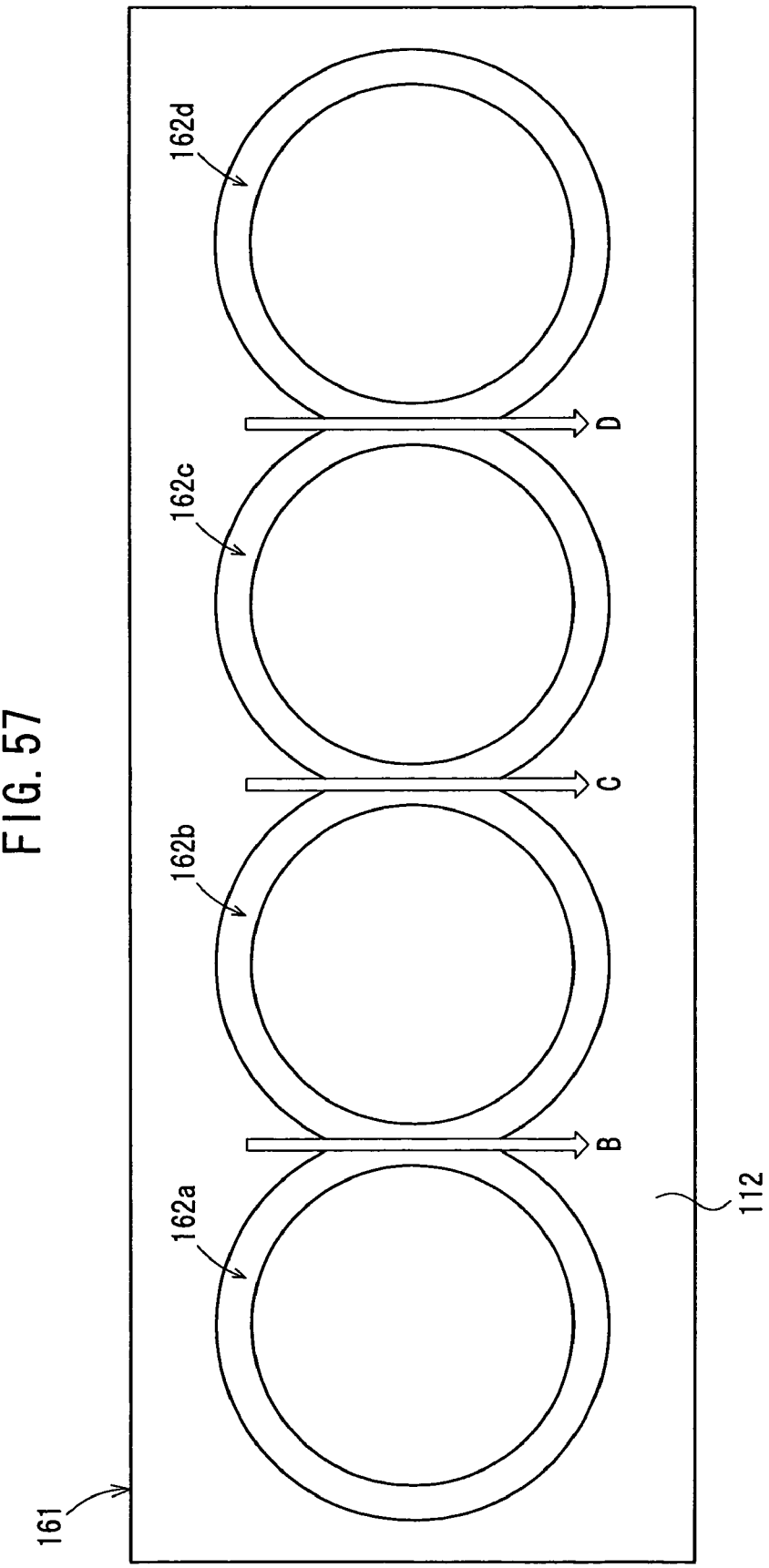
FIG. 57 is a plan view of the block body as viewed from the gasket surface, illustrating the direction in which the friction stir welding tool is displaced to join end faces of the cylinder sleeves which are close to the gasket surface to each other.

Then, the end faces of the adjacent cylinder sleeves 162a and 162b, 162b and 162c, 162c and 162d at the gasket surface 112 are friction-stir-welded to each other. At this time, the probe 54 may be displaced in the directions indicated by the arrows B through D in FIG. 57.

As described above, since the material of the block body 161 and the material of the cylinder sleeves 162a through 162d, and the material of the adjacent cylinder sleeves are integrally joined, the rigidity of the closed-deck cylinder block 180 is further increased.

Only portions of the outer circumferential walls of the cylinder sleeves 162a through 162d are cut away, and the block body 161 and the cylinder sleeves 162a through 162d do not need to be largely cut away. Accordingly, the amount of waste material is quite small.

The water jacket 116 is not required to be provided between the adjacent ones of the cylinder sleeves 162a through 162d, but may be provided only between the block body 161 and each of the cylinder sleeves 162a through 162d.

The cylinder sleeves 162a through 162d may be joined in advance by welding or the like to produce a joined cylinder sleeve assembly, and thereafter the joined cylinder sleeve assembly may be inserted into the communication hole 106.

In the second embodiment, as with the first embodiment, a removal hole which is formed in the gasket surface 112 when the probe 54 of the friction stir welding tool 50 may be machined into a stud bolt hole, a water passage, or the like.

In either of the first embodiment and the second embodiment, the cylinder sleeves 20a through 20c are not limited to being made of high-silicon-based aluminum, but may be made of another aluminum alloy or aluminum. Other preferable examples include cylinder sleeves made of magnesium or magnesium alloy, MMC sleeves, etc.

The invention claimed is:

1. A cylinder sleeve for being inserted in a cylinder bore defined in a block body of a cylinder block for an internal combustion engine, said cylinder bore having therein a first annular recess and a second annular recess, and projecting walls, said cylinder bore communicating with a water jacket, comprising:

a hollow cylindrical body that is inserted into the cylinder bore with at least part of an outer circumferential wall thereof adjacent to an inner circumferential wall of the protecting walls of the cylinder bore;
a larger-diameter portion projecting diametrally outwardly from an upper end of the outer circumferential wall of said hollow cylindrical body, and closing an end of said water jacket at a gasket surface;
a step disposed on an outer circumferential wall of said larger-diameter portion, and
a reduced-diameter portion provided by reducing a diameter of an inner circumferential wall of said hollow cylindrical body, said reduced-diameter portion being located at a position adjacent to the projecting walls of the cylinder bore;
wherein said larger-diameter portions of said adjacent cylinder sleeves are stacked through said step.

2. A method for manufacturing a cylinder sleeve for being inserted in a cylinder bore defined in a block body of a cylinder block for an internal combustion engine, said cylinder bore having therein a first annular recess and a second annular recess, and projecting walls, said cylinder bore communicating with a water jacket, comprising:
forming a hollow cylindrical body for insertion into the cylinder block with at least part of an outer circumferential wall thereof adjacent to an inner circumferential wall of the protecting walls of the cylinder bore;
reducing a diameter of an inner circumferential wall of said hollow cylindrical body at a position adjacent to the protecting walls of the cylinder bore, to form a reduced-diameter potion; and
forming a larger-diameter portion projecting diametrically outwardly from an upper end of the outer circumferential wall of said hollow cylindrical body,
wherein the reduced-diameter portion is removed after the cylinder sleeve is inserted into the cylinder bore and is integrally joined with the cylinder bore.

3. The method according to claim 2, further comprising circumferentially cutting off the larger-diameter portion to form a step on an outer circumferential wall of said larger-diameter portion.

4. The method according to claim 2, wherein said reduced-diameter portion has a tapered surface which is reduced in diameter in a tapered fashion.

5. A friction stir welding method of joining an inner wall of an insertion hole defined in a first member and an outer wall of a hollow second member inserted in said insertion hole, by friction stir welding, comprising the steps of
providing, on an inner wall of said second member, a reduced-width portion having a tapered surface which is progressively reduced in width away from an open end of said insertion hole;
bringing a probe of a friction stir welding tool into abutment against said tapered surface, and thereafter moving said friction stir welding tool along said tapered surface;
softening and stirring each material of said tapered surface and an outer wall of said second member and the material of an inner wall of said insertion hole in said first member, with friction heat produced when said probe is rotated, thereby friction-stir-welding said materials; and
removing said probe from said tapered surface, and thereafter removing said reduced-width portion,
wherein said probe is removed from said tapered surface after said probe is separated from said inner wall of said insertion hole, and a removal hole formed by removing said probe from said tapered surface is removed together with said reduced-width portion.

6. A friction stir welding method according to claim 5, wherein a block body of a cylinder block for an internal combustion engine is used as said first member, and a cylinder sleeve as said second member is inserted into a cylinder bore as said insertion hole, with said friction stir welding being performed on said block body and said cylinder sleeve.

7. A friction stir welding method comprising the steps of:
embedding a friction stir welding tool which is rotating into a cylinder block having an abutting region;
moving at least one of said friction stir welding tool and said cylinder block to displace said friction stir welding tool along said abutting region for softening the material of said abutting region with frictional heat and stirring the material of said abutting region with said friction stir welding tool to join said material of said abutting region; and
removing said friction stir welding tool from a gasket surface of said cylinder block after said material of said abutting region is joined;
wherein a removal hole formed by removing at least said friction stir welding tool is machined into a stud bolt hole.

8. A friction stir welding method comprising:
embedding a friction stir welding tool which is rotating into a cylinder block having an abutting region;
moving at least one of said friction stir welding tool and said cylinder block to displace said friction stir welding tool along said abutting region for softening the material of said abutting region with frictional heat and stirring the material of said abutting region with said friction stir welding tool to join said material of said abutting region; and
removing said friction stir welding tool from a gasket surface of said cylinder block after said material of said abutting region is joined;
wherein a removal hole formed by removing at least said friction stir welding tool is machined into an oil hole, a knock hole, or a dowel pin hole.

9. A friction stir welding method of friction-stir-welding an abutting region of a block body and a cylinder sleeve inserted in a cylinder bore in said block body, with a friction stir welding tool which is rotating, thereby producing a cylinder block, comprising the steps of:
embedding said friction stir welding tool into at least one of said block body and said cylinder sleeve;
displacing said friction stir welding tool along said abutting region for softening the material of said abutting region with frictional heat and stirring said material of said abutting region with said friction stir welding tool to join said abutting region; and
removing said friction stir welding tool from said abutting region or said cylinder sleeve after said abutting region is joined;
wherein said friction stir welding tool is removed from a region in which a water passage is to be formed in communication with a water jacket between said block body and said cylinder sleeve.

10. A friction stir welding method according to claim 9, wherein said cylinder sleeve has a hollow cylindrical portion and a larger-diameter portion, said larger-diameter portion is placed on a placement area in said block body to allow a clearance formed between said hollow cylindrical portion and said cylinder bore to serve as a water jacket, and a gasket surface of said block body and said larger-diameter portion are friction-stir-welded to provide said water passage in at least said larger-diameter portion.

11. A method of manufacturing a cylinder block by friction-stir-welding a block body having a cylinder bore and a cylinder sleeve inserted in said cylinder bore, comprising the steps of:

embedding a friction stir welding tool which is rotating into said cylinder sleeve from an inner circumferential wall thereof until said friction stir welding tool reaches an inner circumferential wall of said cylinder bore;

moving said friction stir welding tool to soften the material of said cylinder sleeve and the material of said block body with frictional heat and stir said materials with said friction stir welding tool, thereby joining said cylinder sleeve and said block body to each other; and removing said friction stir welding tool after said cylinder sleeve and said block body are joined to each other;

wherein said friction stir welding tool is removed from said cylinder sleeve at a position below a bottom dead center of a piston ring fitted over a circumferential side wall of a piston inserted in said cylinder bore.

12. A method according to claim 11, wherein said friction stir welding tool is removed from said cylinder sleeve at a position below said bottom dead center of a skirt of said piston.

13. A method according to claim 11, further comprising the step of friction-stir-welding a gasket surface of said block body and an end face of said cylinder sleeve at said gasket surface.

14. A method of manufacturing a cylinder block by friction-stir-welding a block body having a cylinder bore having a diametrally dented step and a friction stir welding tool removal member mounted on a gasket surface, and a cylinder sleeve inserted in said cylinder bore, comprising the steps of:

embedding a friction stir welding tool which is rotating into said cylinder sleeve from an inner circumferential wall thereof until said friction stir welding tool reaches an inner circumferential wall of said cylinder bore;

moving said friction stir welding tool to soften the material of said cylinder sleeve and the material of said block body with frictional heat and stir said materials with said friction stir welding tool, thereby joining said cylinder sleeve and said block body to each other; and removing said friction stir welding tool after said cylinder sleeve and said block body are joined to each other;

wherein said friction stir welding tool is removed from said friction stir welding tool removal member after said friction stir welding tool is moved from said inner circumferential wall of said cylinder sleeve to said friction stir welding tool removal member.

15. A method according to claim 14, further comprising the steps of:

having an end of said cylinder sleeve project from said cylinder bore when said cylinder sleeve is inserted in said cylinder bore, and bringing said end of said cylinder sleeve into abutment against said friction stir welding tool removal member;

after said cylinder sleeve and said block body are joined to each other, moving said friction stir welding tool to said projecting end and removing said friction stir welding tool from said friction stir welding tool removal member through said end; and removing said end from which said friction stir welding tool removal member is removed, to positionally align an upper end face of said cylinder sleeve with said gasket surface.

16. A method according to claim 14, further comprising the step of friction-stir-welding said gasket surface of said block body and an end face of said cylinder sleeve at said gasket surface.

17. A method of manufacturing a cylinder sleeve for use in a closed-deck cylinder block, said cylinder sleeve having a hollow cylindrical member and a closure member joined to an outer circumferential wall of said hollow cylindrical member, wherein when said cylinder sleeve is inserted into a cylinder bore defined in a block body, said closure member closes an opening of a water jacket in said block body at a gasket surface, comprising the steps of:

using a jig having a first insertion unit into which said hollow cylindrical member is insertable and a second insertion unit into which said closure member is insertable, inserting said hollow cylindrical member into said first insertion unit, and inserting said closure member into said second insertion unit; and joining said hollow cylindrical member and said closure member by friction stir welding.

18. A method according to claim 17, wherein said hollow cylindrical member has a support step on an outer circumferential wall thereof, said support step is exposed when said hollow cylindrical member is inserted into said first insertion unit of said jig, said closure member is placed on said support step, and said hollow cylindrical member and said closure member are friction-stir-welded.

19. A method of manufacturing a closed-deck cylinder block having a block body, a hollow cylindrical member inserted in a cylinder bore defined in said block body, a water jacket provided between said block body and said hollow cylindrical member, and a closure member closing an end of said water jacket at a gasket surface of said block body, comprising the steps of:

joining said hollow cylindrical member and said closure member to each other by friction stir welding; and joining said block body and said closure member to each other by friction stir welding.

20. A method according to claim 19, wherein said hollow cylindrical member and said closure member friction-stir-welded by using a jig having a first insertion unit into which said hollow cylindrical member is insertable and a second insertion unit into which said closure member is insertable, said hollow cylindrical member is inserted into said first insertion unit, said closure member inserted into said second insertion unit, and thereafter said hollow cylindrical member to which said closure member is joined is inserted into said cylinder bore in said block body, and said block body and said closure member are friction-stir-welded.

21. A method according to claim 20, wherein said hollow cylindrical member has a support step on an outer circumferential wall thereof, said support step is exposed when said hollow cylindrical member is inserted into said first insertion unit of said jig, said closure member is placed on said support step, and said hollow cylindrical member and said closure member are friction-stir-welded.

22. A method according to claim 20, wherein at least one of said block body and an outer circumferential wall of said hollow cylindrical member has a support step, said closure member is placed on said support step, said hollow cylindrical member and said closure member are friction-stir-welded, and said block body and said closure member are friction-stir-welded.

23. A method of manufacturing a cylinder sleeve for use in a closed-deck cylinder block, said cylinder sleeve having a hollow cylindrical member and a closure member joined to an outer circumferential wall of said hollow cylindrical member, wherein when said cylinder sleeve is inserted into a cylinder bore defined in a block body, said closure member closes an opening of a water jacket in said block body at a gasket surface, comprising the steps of:

using a jig having a first insertion unit, a second insertion unit, and a third insertion unit, inserting said hollow cylindrical member into said first insertion unit, inserting said closure member into said second insertion unit, inserting a friction stir welding tool removal member into said third insertion unit, and thereafter joining said hollow cylindrical member and said closure member by friction stir welding; and removing a friction stir welding tool from said friction stir welding tool removal member after said friction stir welding is finished.

24. A method according to claim 23, wherein said hollow cylindrical member has a support step on an outer circumferential wall thereof, said support step is exposed when said hollow cylindrical member is inserted into said first insertion unit of said jig, said closure member is placed on said support step, and said hollow cylindrical member and said closure member are friction-stir-welded.

25. A method according to claim 23, wherein a plurality of said hollow cylindrical members are joined in advance.

26. Method of manufacturing a closed-deck cylinder block in which a water jacket is formed in a clearance between a block body and a cylinder sleeve, and an end of said water jacket at a gasket surface is closed, comprising the steps of:

producing a block body having a cylinder bore having a diametrally dented step and a placement area for placing an end face of said cylinder sleeve thereon;

inserting said cylinder sleeve into said cylinder bore, placing said end face of said cylinder sleeve on said placement area, and forming said water jacket between an outer circumferential wall of said cylinder sleeve and said step; and friction-stir-welding said cylinder sleeve and an inner circumferential wall of said cylinder bore to produce a cylinder block.

27. A method according to claim 26, further comprising the step of friction-stir-welding said gasket surface of said block body and an end face of said cylinder sleeve inserted in said cylinder bore at said gasket surface.

28. A method according to claim 26, wherein said cylinder sleeve has a flat surface on said outer circumferential wall thereof, and adjacent ones of said cylinder sleeve are held in abutment against each other through said flat surface in said cylinder bore.

29. A method according to claim 28, wherein a recess which is dented diametrally of said cylinder sleeve and functions as said water jacket is formed in said flat surface.

30. An assembly for an internal combustion engine, comprising:

a cylinder block for receiving at least one cylinder sleeve, having:
  at least one communication hole each including a first annular recess having a first diameter and a second annular recess having a second diameter larger than the first diameter; and
  projecting walls projecting from a lower end of the cylinder block toward an upper end of the sleeve block and forming an inner wall of the first annual recess, wherein an inner circumferential wall of the communication hole and the projecting walls having annular steps;

at least one cylinder sleeve for being inserted in the cylinder block, each having:
  a hollow cylindrical body;
  a larger-diameter portion projecting diametrally outwardly from an outer circumferential wall of the hollow cylindrical body; and
  a step disposed on an outer circumferential wall of said larger-diameter portion, and wherein the larger-diameter portions of adjacent cylinder sleeves are stacked through the step, and a lower end of the each cylinder sleeve is placed on the annular step of the lower end of the cylinder block and is joint to the inner wall of the first annular recess of the cylinder block.

31. The assembly of claim 30, wherein a water jacket is formed between the outer circumferential wall of the cylinder sleeve and an inner circumferential wall of the second recess of the cylinder block and is closed by a top of one of the projecting walls and the lager-diameter portion of the cylinder sleeve.

32. The assembly of claim 31, wherein the cylinder sleeve further comprises a reduced-diameter portion provided by reducing a diameter of an inner circumferential wall of said hollow cylindrical body; and wherein the reduced-diameter portion is removed after the cylinder sleeve is inserted into the cylinder bore and is integrally bonded with the cylinder bore.

* * * * *